United States Patent
Sekido

(10) Patent No.: US 9,858,963 B2
(45) Date of Patent: Jan. 2, 2018

(54) STORAGE DEVICE, COMPUTER-READABLE NONVOLATILE STORAGE MEDIUM TO STORE CONTROL PROGRAM OF STORAGE DEVICE, AND CONTROL METHOD OF STORAGE DEVICE

(71) Applicants: KABUSHIKI KAISHA TOSHIBA, Minato-ku (JP); TOSHIBA SOLUTIONS CORPORATION, Kawasaki-shi (JP)

(72) Inventor: Kazunori Sekido, Kunitachi (JP)

(73) Assignees: KABUSHIKI KAISHA TOSHIBA, Minato-ku (JP); TOSHIBA SOLUTIONS CORPORATION, Kawasaki-shi (JP)

( * ) Notice: Subject to any disclaimer, the term of this patent is extended or adjusted under 35 U.S.C. 154(b) by 0 days.

(21) Appl. No.: 15/450,776

(22) Filed: Mar. 6, 2017

(65) Prior Publication Data

US 2017/0178683 A1    Jun. 22, 2017

Related U.S. Application Data

(63) Continuation of application No. PCT/JP2015/081058, filed on Nov. 4, 2015.

(51) Int. Cl.
    *G11B 15/18*      (2006.01)
    *G11B 20/12*      (2006.01)
    (Continued)

(52) U.S. Cl.
CPC .......... *G11B 20/1217* (2013.01); *G11B 5/012* (2013.01); *G11B 5/024* (2013.01);
(Continued)

(58) Field of Classification Search
CPC .. G11B 5/09; G11B 5/11; G11B 5/012; G11B 5/1278; G11B 20/1217; G11B 2220/90; G11B 27/107; G11B 27/34
(Continued)

(56) References Cited

U.S. PATENT DOCUMENTS 8,638,514 B2 *   1/2014   Sato ..................... G11B 5/012
                                                                                                                 360/48
8,832,409 B2 *   9/2014   Feldman ............... G11B 5/012
                                                                                                                711/173

(Continued)

FOREIGN PATENT DOCUMENTS

EP        2 498 254 A2    9/2012
JP         2009-59234      3/2009
(Continued)

OTHER PUBLICATIONS

International Search Report dated Jan. 19, 2016 in PCT/JP2015/081058.
(Continued)

*Primary Examiner* — Nabil Hindi
(74) *Attorney, Agent, or Firm* — Oblon, McClelland, Maier & Neustadt, L.L.P.

(57) ABSTRACT

In an embodiment, a storage device includes a shingled magnetic recording device, a management unit, selection unit, and execution unit. The shingled magnetic recording device performs writing in unit of a band including tracks being adjacent to and partially overlapping with each other. The management unit manages management information mutually associating band identifier of the band, characteristic information indicating a possibility that data stored in the band is not referred to, and data identifier of the data in a case where the data is stored in the band. The selection unit selects the band of the shingled magnetic recording device storing the data based on the data and the characteristic information in a case where the shingled magnetic recording device is requested to store the data. The execution unit stores the data to the selected band.

12 Claims, 46 Drawing Sheets

(51) Int. Cl.
  *G11B 5/012* (2006.01)
  *G11B 5/09* (2006.01)
  *G11B 5/024* (2006.01)
  *G11B 20/18* (2006.01)

(52) U.S. Cl.
  CPC ............ *G11B 5/09* (2013.01); *G11B 20/1803* (2013.01); *G11B 2020/1238* (2013.01)

(58) Field of Classification Search
  USPC ....... 360/97.1, 75, 48, 60, 71, 58, 72.1, 72.2
  See application file for complete search history.

(56) References Cited

U.S. PATENT DOCUMENTS

| | | | | |
|---|---|---|---|---|
| 9,201,783 | B2 * | 12/2015 | Song | ................. G06F 12/0246 |
| 2011/0292538 | A1 | 12/2011 | Haga et al. | |
| 2012/0233432 | A1 | 9/2012 | Feldman et al. | |
| 2015/0228294 | A1 | 8/2015 | Ito et al. | |

FOREIGN PATENT DOCUMENTS

| | | |
|---|---|---|
| JP | 2011-253576 | 12/2011 |
| JP | 4886877 | 2/2012 |
| JP | 2012-190532 | 10/2012 |
| JP | 2012-191499 | 10/2012 |
| JP | 2015-149114 | 8/2015 |
| JP | 2016-75984 | 5/2016 |
| WO | WO 2014/118822 A1 | 8/2014 |

OTHER PUBLICATIONS

Dennis Colarelli et al., "Massive Arrays of Idle Disks for Storage Archives," SC '02: Proceedings of the 2002 ACM/IEEE Conference on Supercomputing, Jul. 26, 2002, pp. 1-11.

* cited by examiner

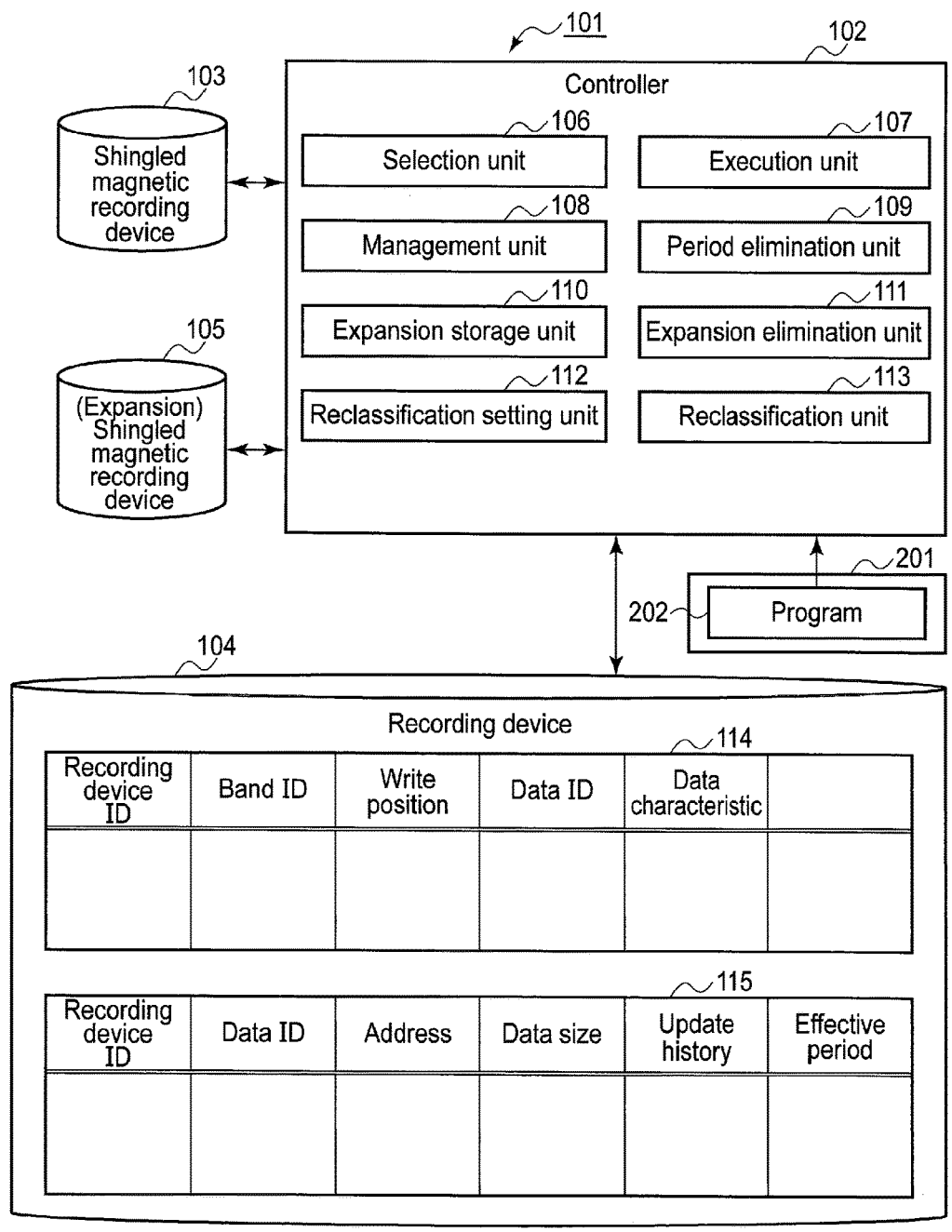
F I G. 1

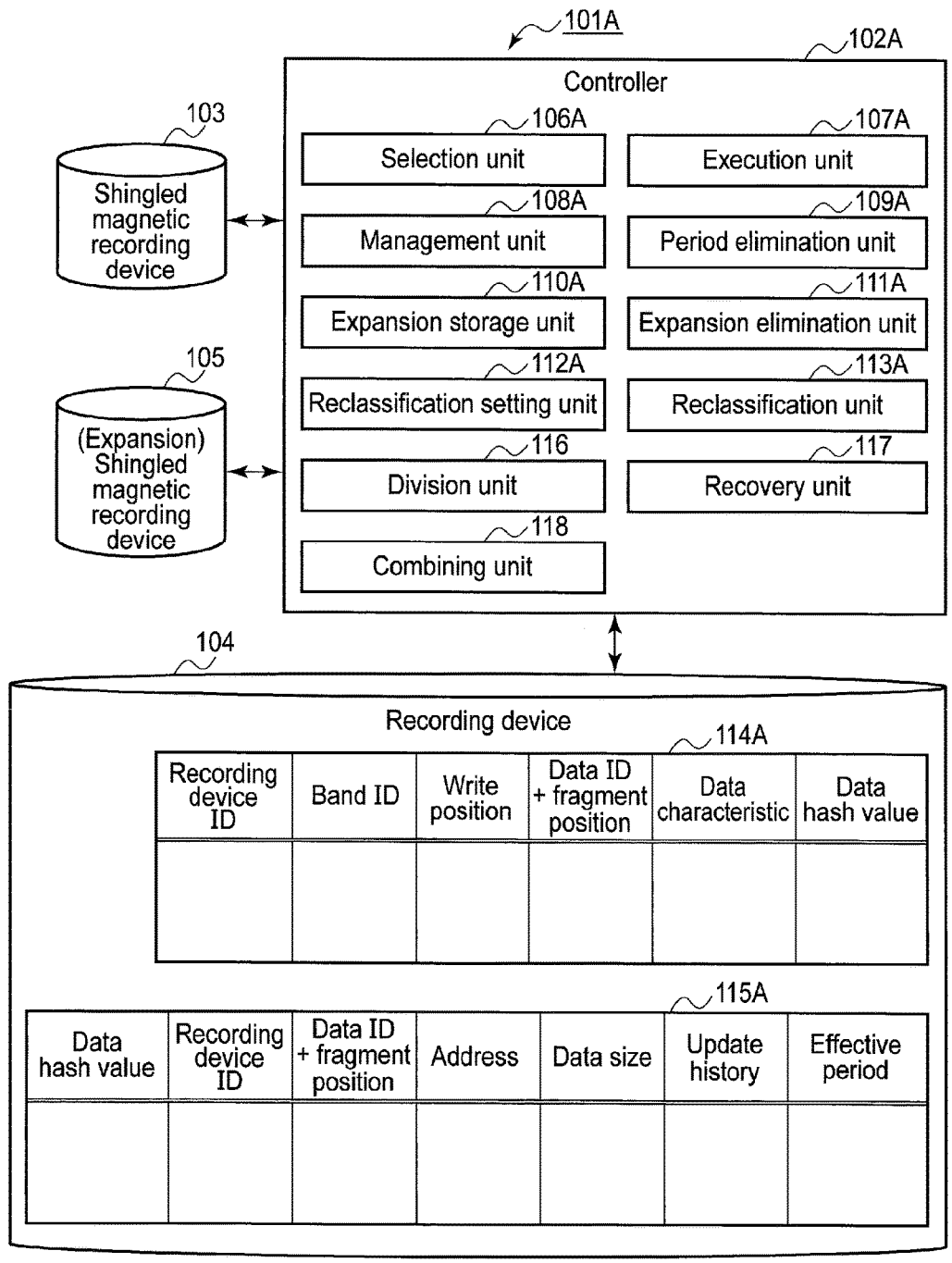
F I G. 2

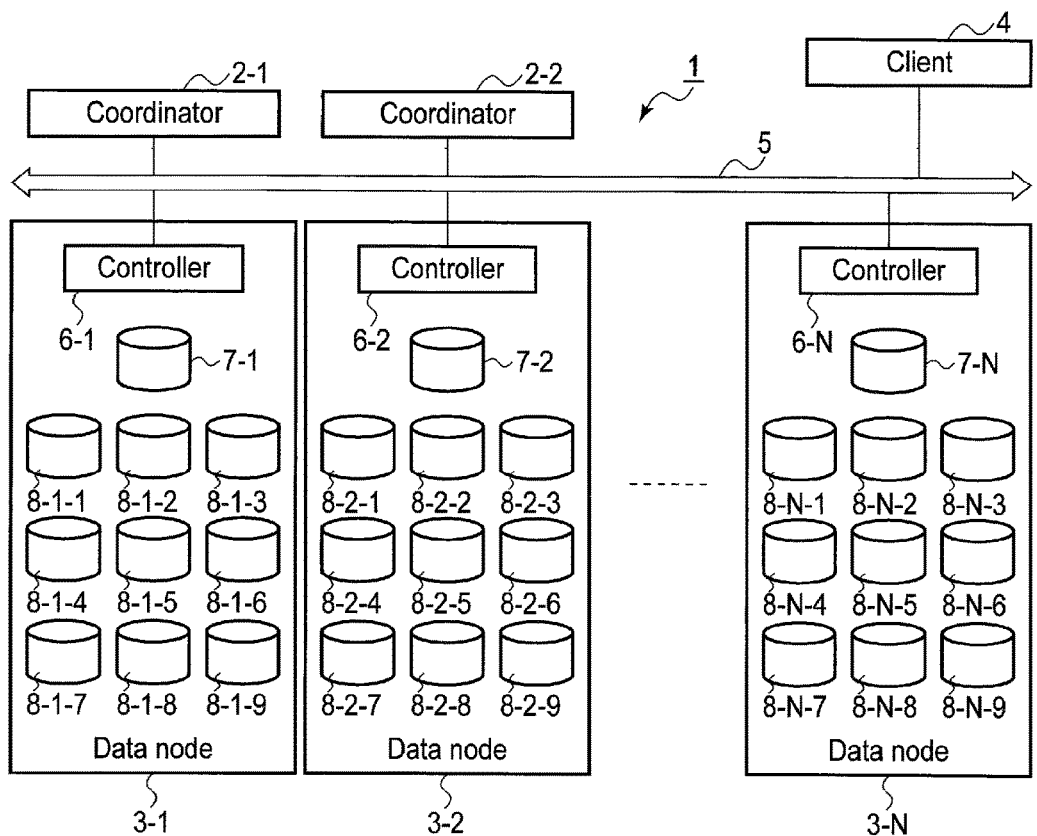
F I G. 3
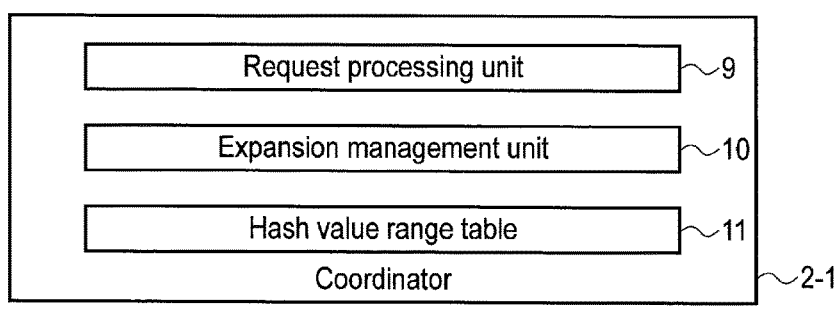
F I G. 4

Hash value range table — 11
| Hash value range | Recording device ID |
|---|---|
| 1 ~ 10000 | 8-1-1, 8-2-1, 8-3-1 |
| 10001 ~ 20000 | 8-4-1, 8-5-1, 8-6-1 |
| 20001 ~ 30000 | 8-7-1, 8-8-1, 8-9-1 |
| ⋮ | ⋮ |
| 980001 ~ 990000 | 8-(N-5)-8, 8-(N-4)-8, 8-(N-3)-8 |
| 990001 ~ 1000000 | 8-(N-2)-8, 8-(N-1)-8, 8-N-8 |
F I G. 5
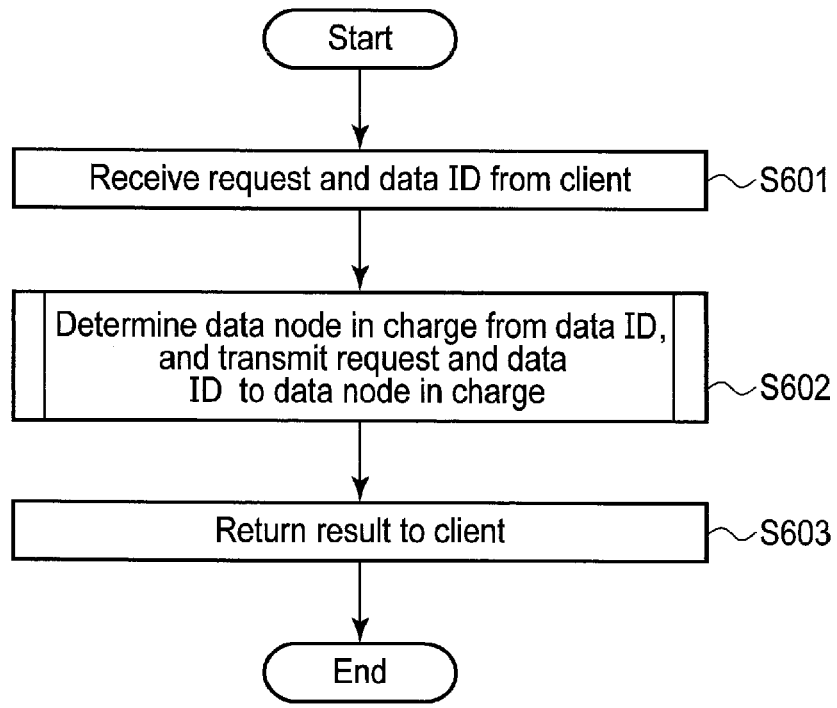
F I G. 6

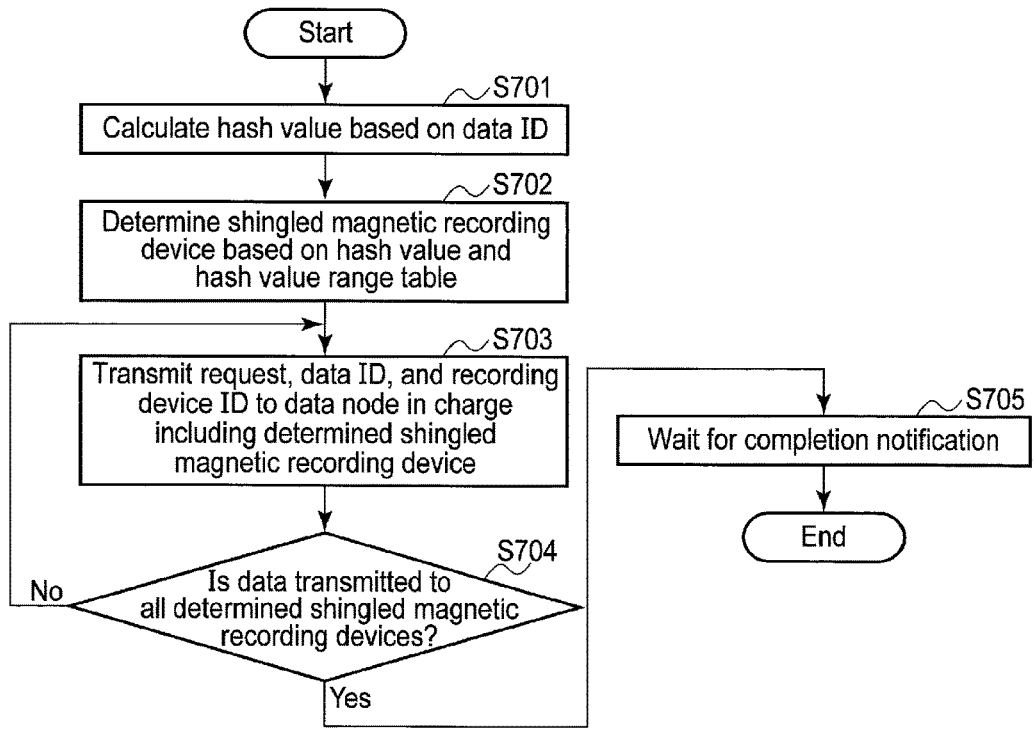
F I G. 7
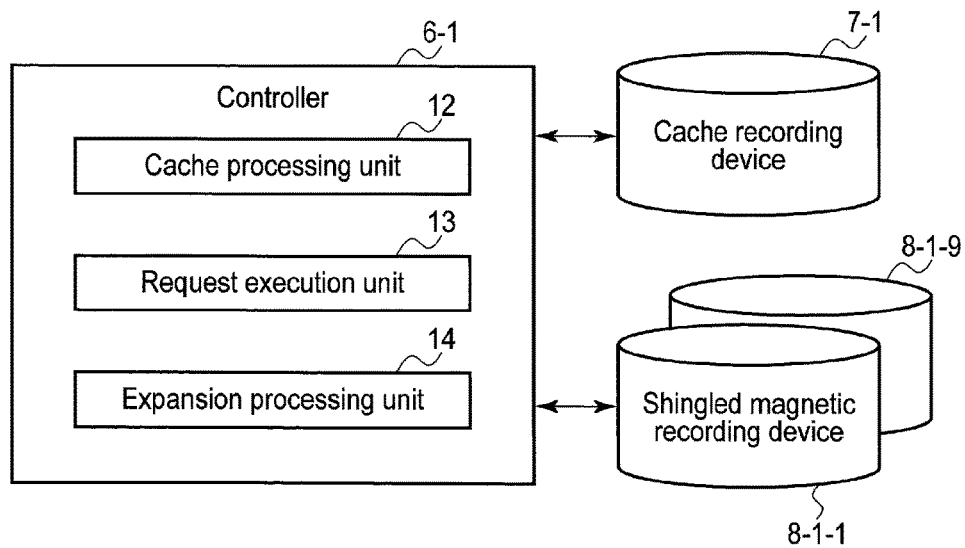
F I G. 8

| Cache information ||
|---|---|
| Recording device ID | Request |
| 7-1-1 | (POST,data ID0,data A), (PUT,data ID1,data B), (DELETE, data ID2), (POST,data ID3,data C), (DELETE,data ID4),... |
| 7-1-2 | (PUT,data ID5,data D), (PUT,data ID6,data E), (POST, data ID7,data F), (POST,data ID8,data G), (DELETE, data ID5),(POST,data ID9,data H), ... |
| 7-1-3 | (POST,data ID10,data I), (POST,data ID11,data J), (POST, data ID13,data K), (POST,data ID14,data L), (PUT,data ID15, data M), (POST,data ID16,data N), (GET,data ID17),... |
| ... | ...... |
F I G. 9
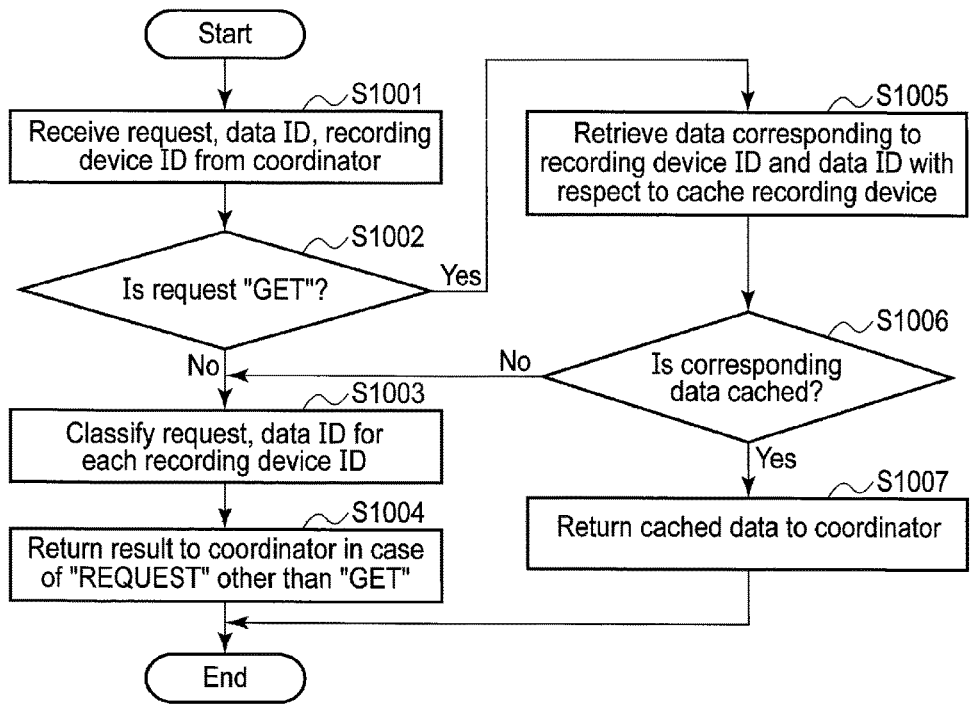
F I G. 10

| Data band table ||||| 
|---|---|---|---|---|
| Band ID | Storage capacity | Write head position | Data ID | Data characteristic |
| 1 | 400000 | -1 | 123, 456, 88686, ... | Delete in future |
| 2 | 135678 | 164580 | 5589, 4321, 1235, ... | Expansion/moving |
| 3 | 0 | 0 | Absent | Absent |
| ... | ... | ... | ...... | |

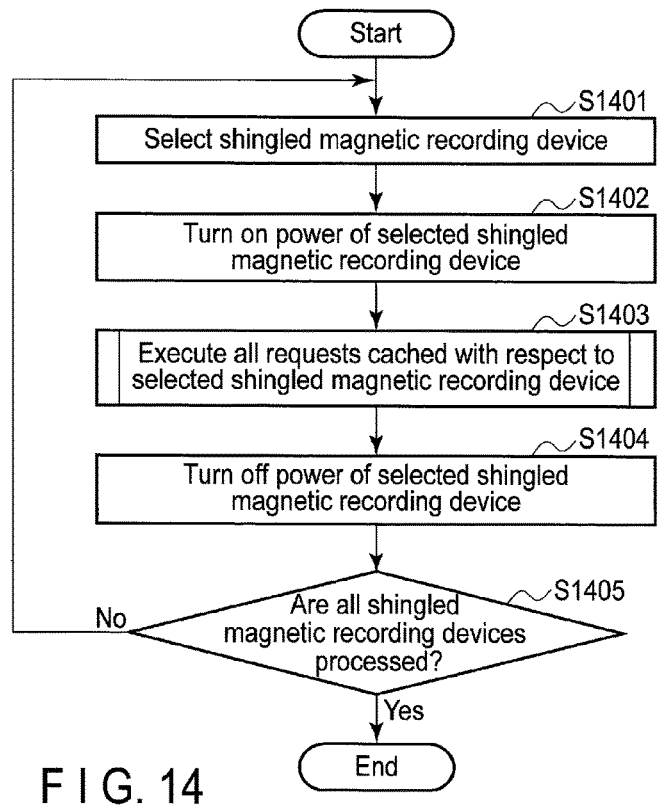
| Hash value table 19 ||||||
|---|---|---|---|---|---|
| Hash value | Data ID | Update history | Address | Size | Effective period |
| 1 | 100112 | Absent | Data band 3, 2345-th sector | 4 | 2015/3/31 |
| 2 | 100223 | Present | Data band 1, 0-th sector | 123 | |
| 3 | -1 | | | | |
| 4 | 100467 | Absent | Data band 12, 345-th sector | 56789 | 2020/2/28 |
| ... | ... | ... | ...... | ... | |
Initialized at time of executing "DELETE"
F I G. 13
F I G. 14

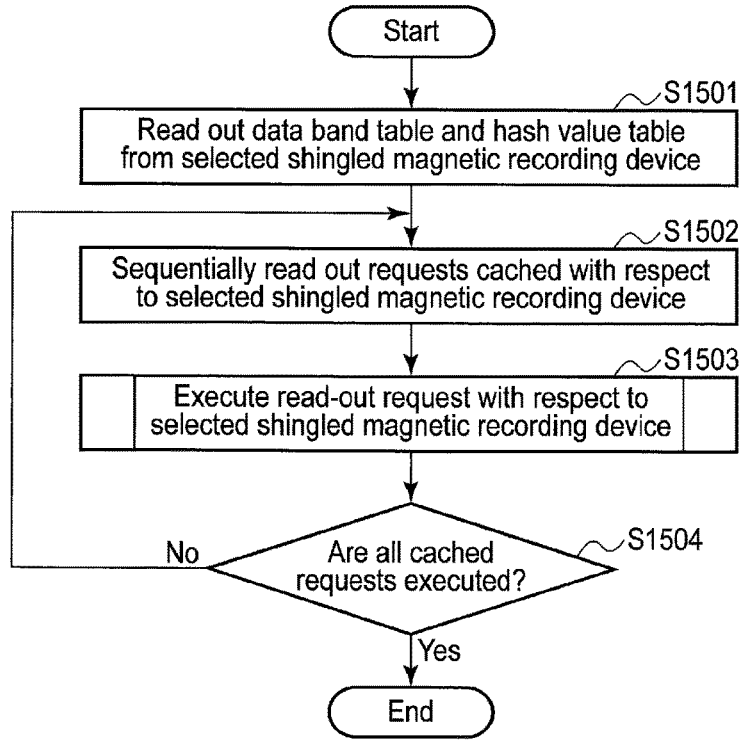
F I G. 15
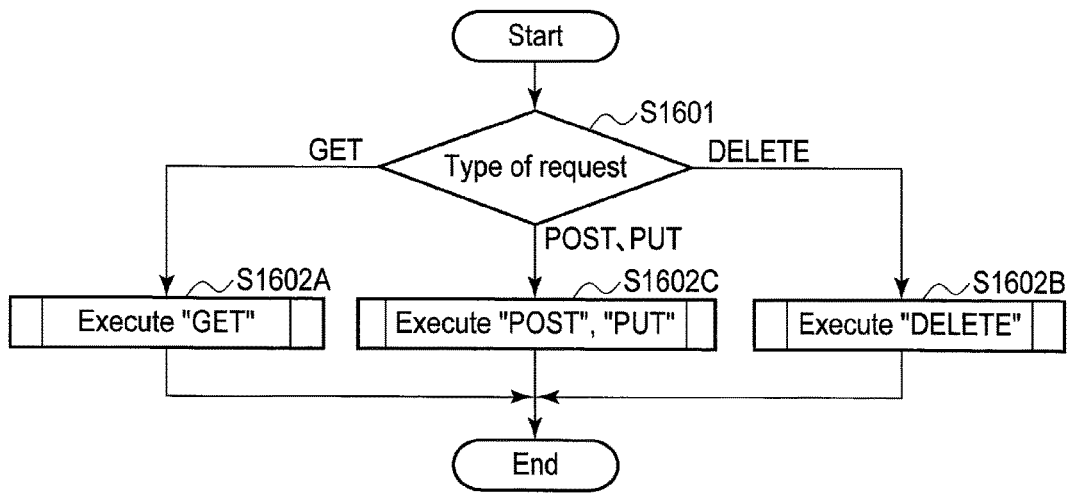
F I G. 16

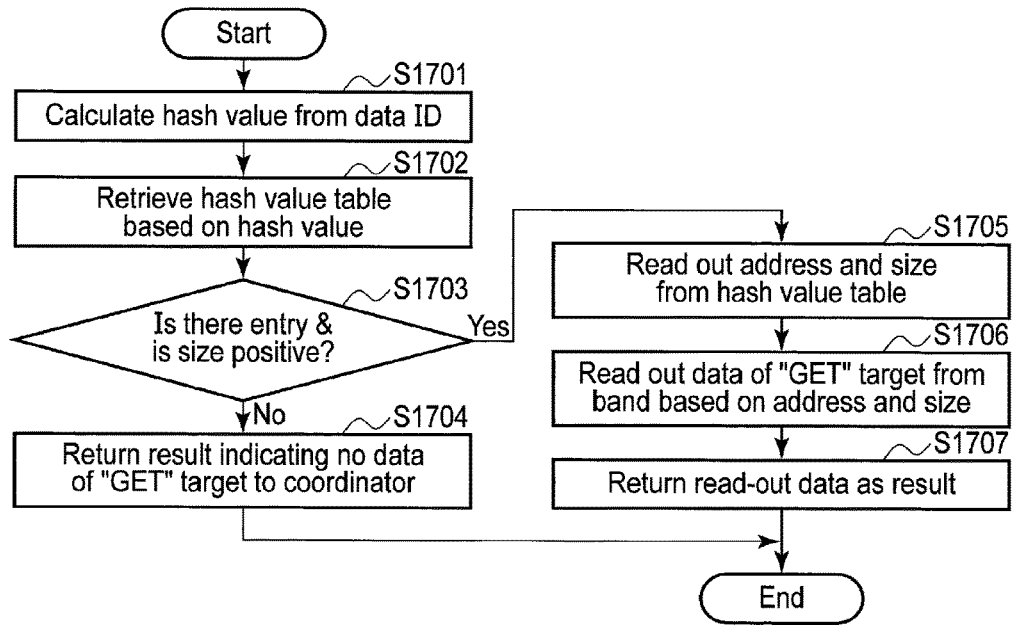
F I G. 17
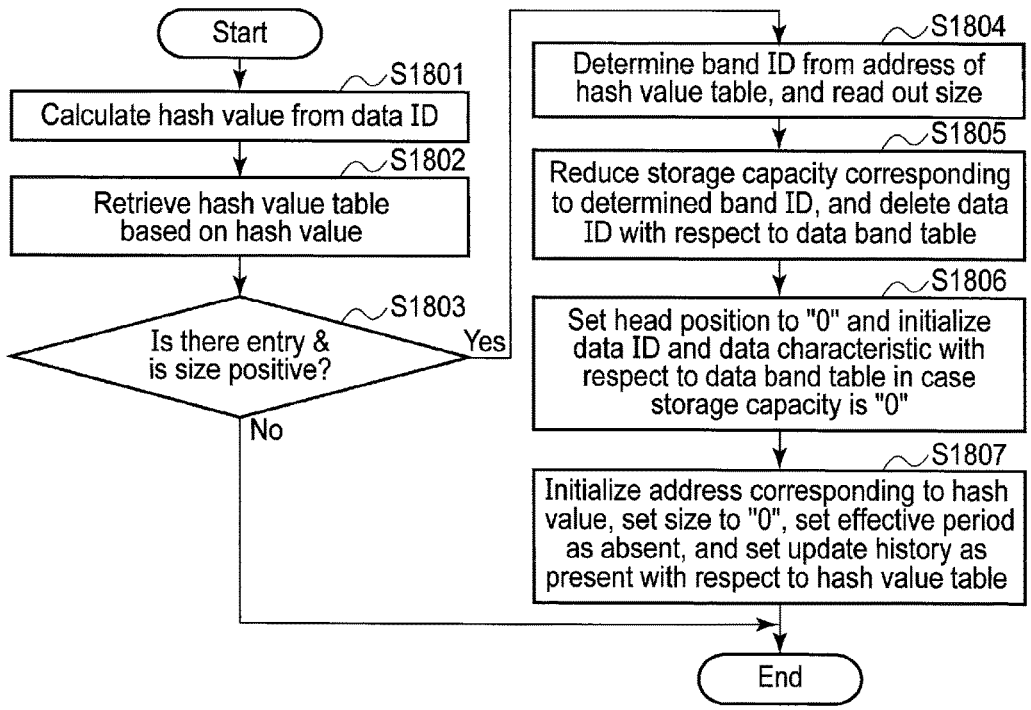
F I G. 18

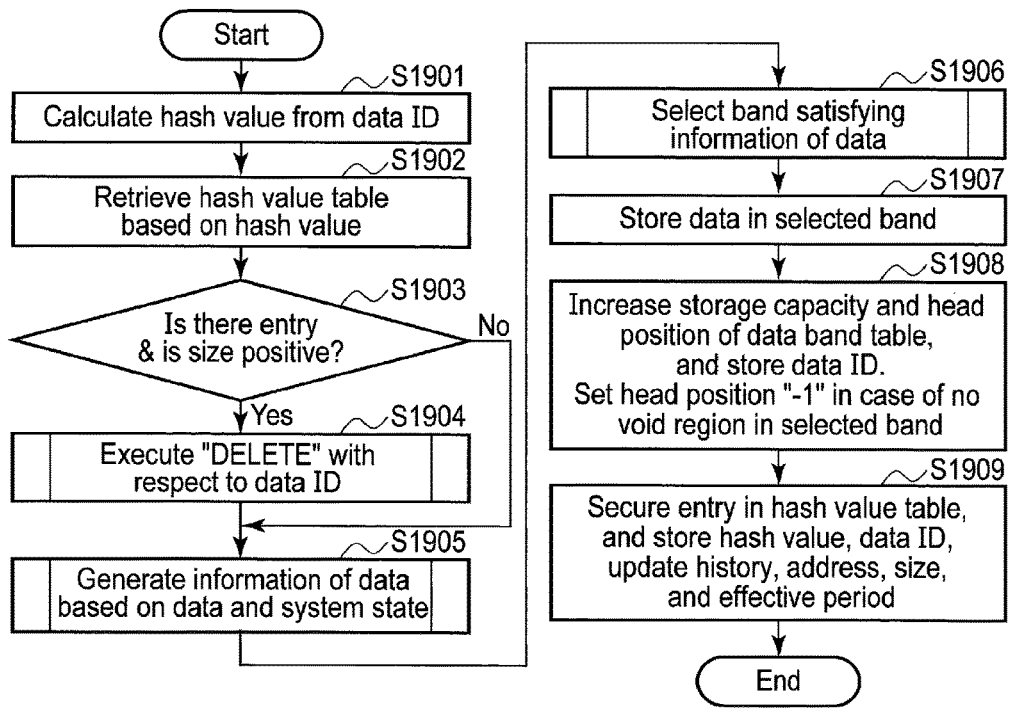
F I G. 19
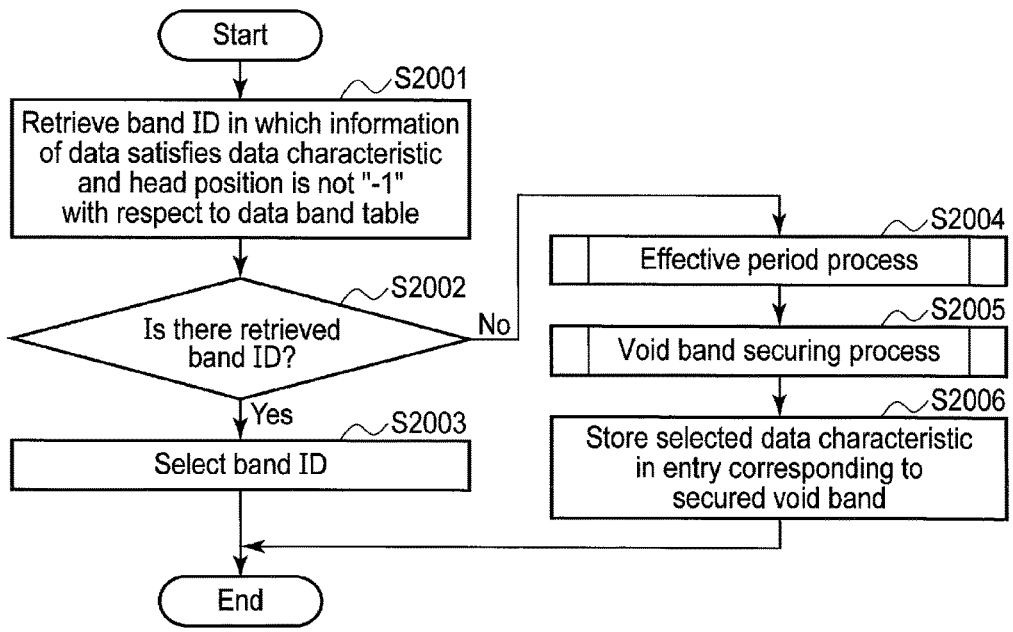
F I G. 20

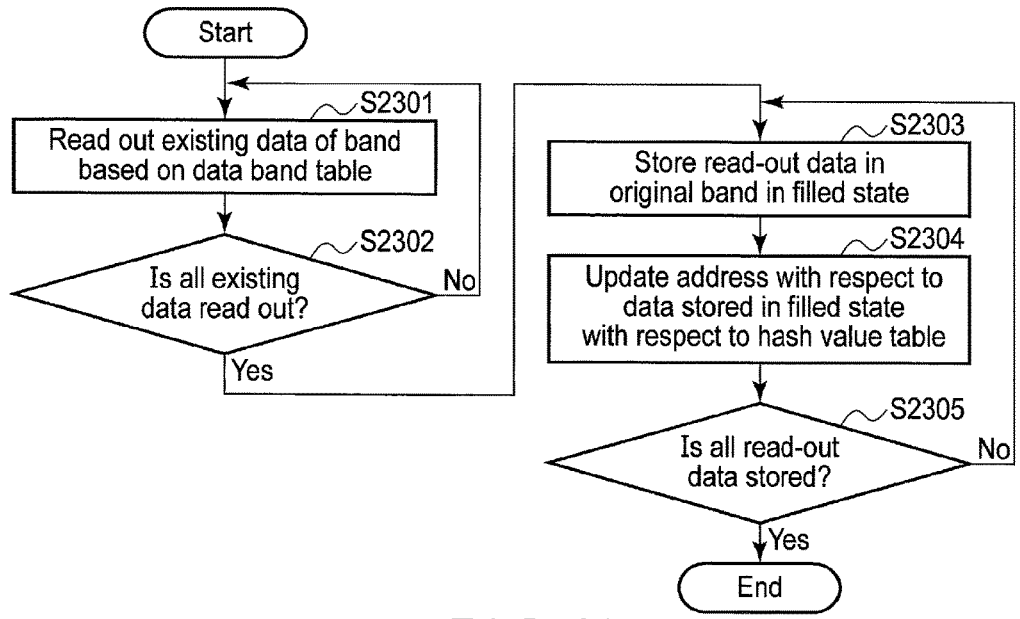
F I G. 23
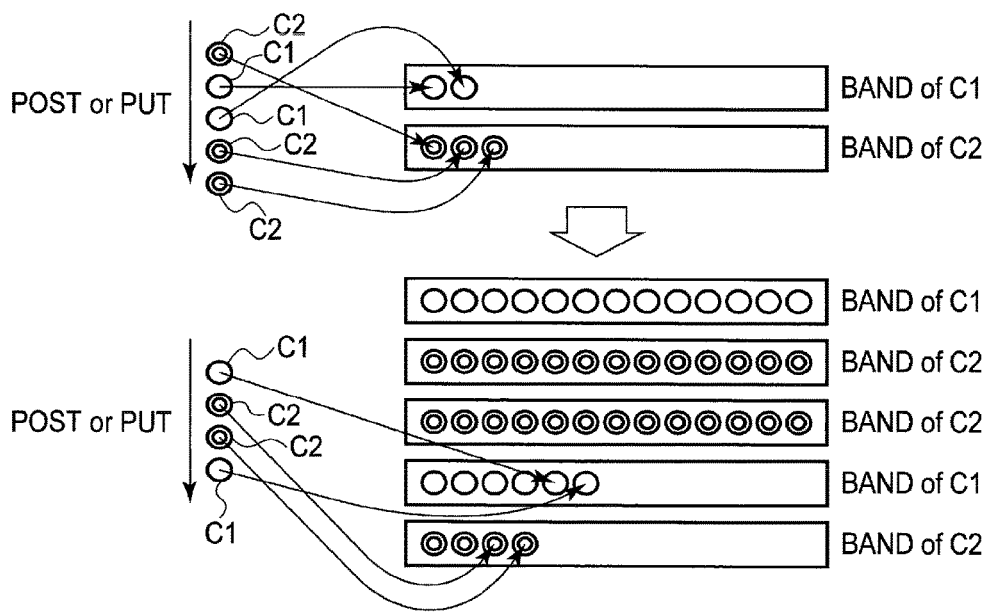
F I G. 24

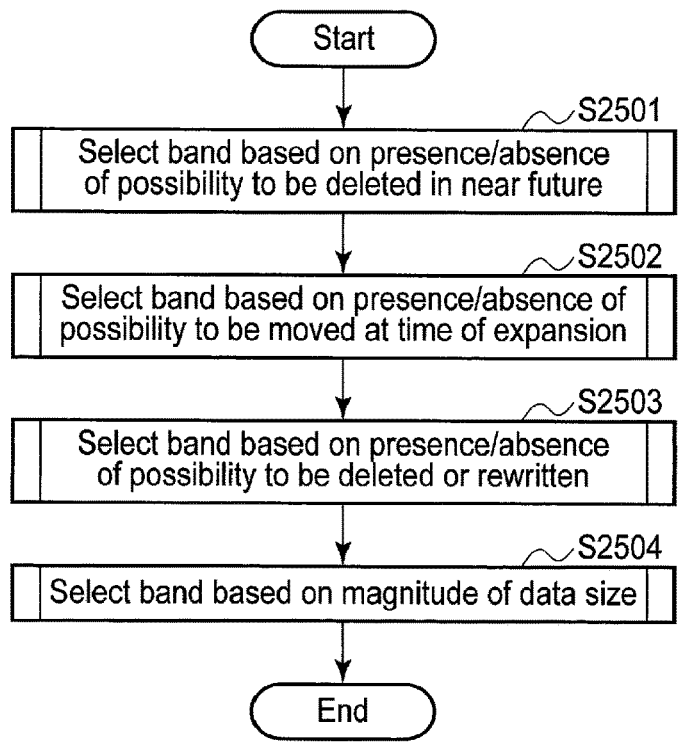
F I G. 25
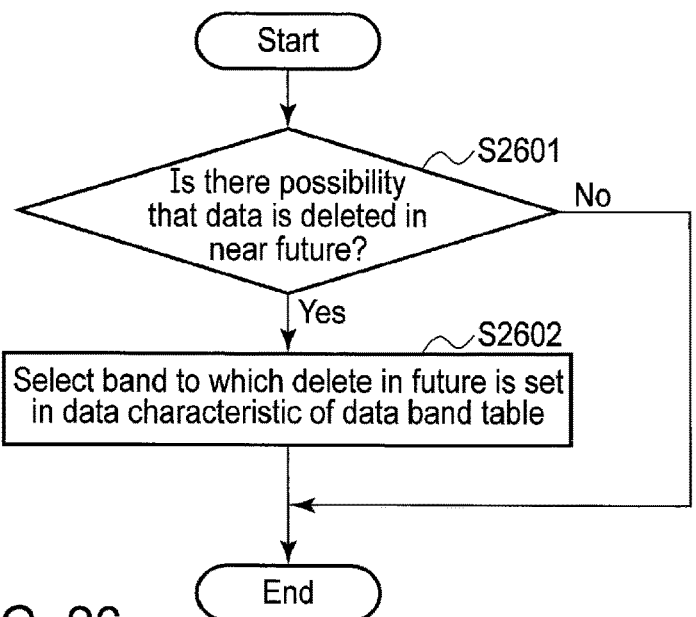
F I G. 26

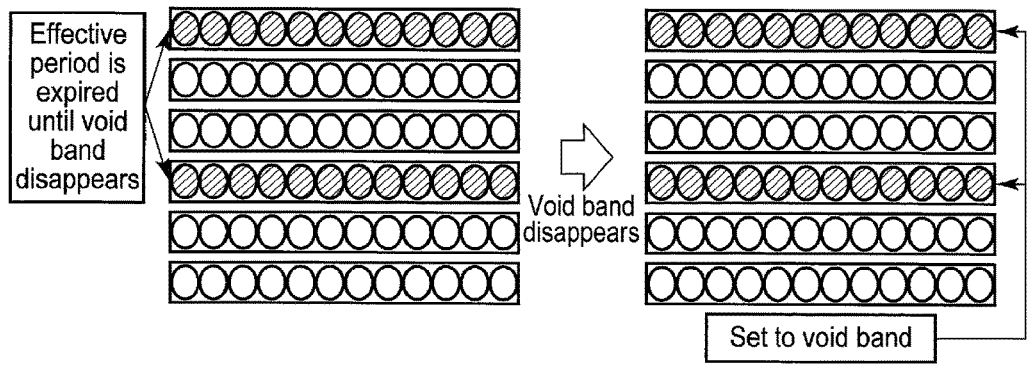
F I G. 27
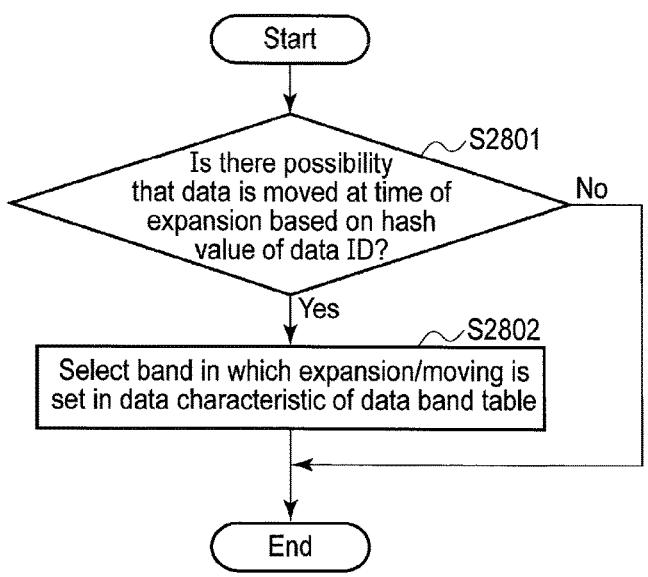
F I G. 28

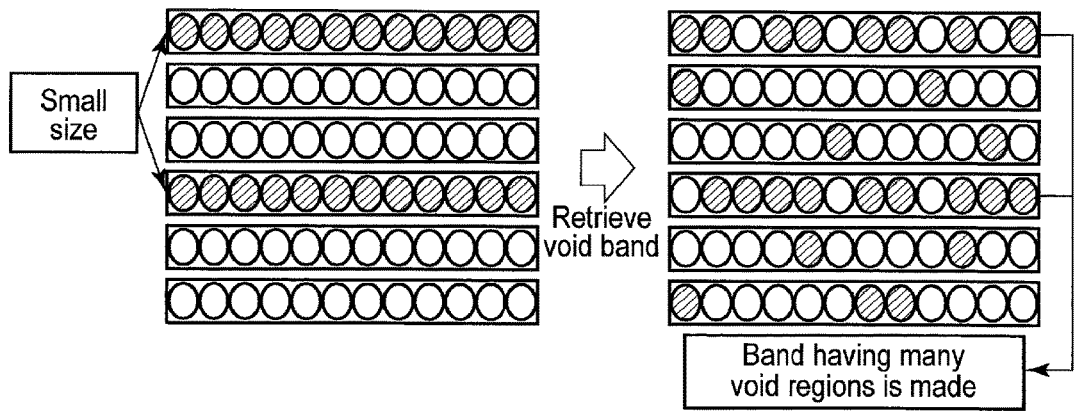
F I G. 33
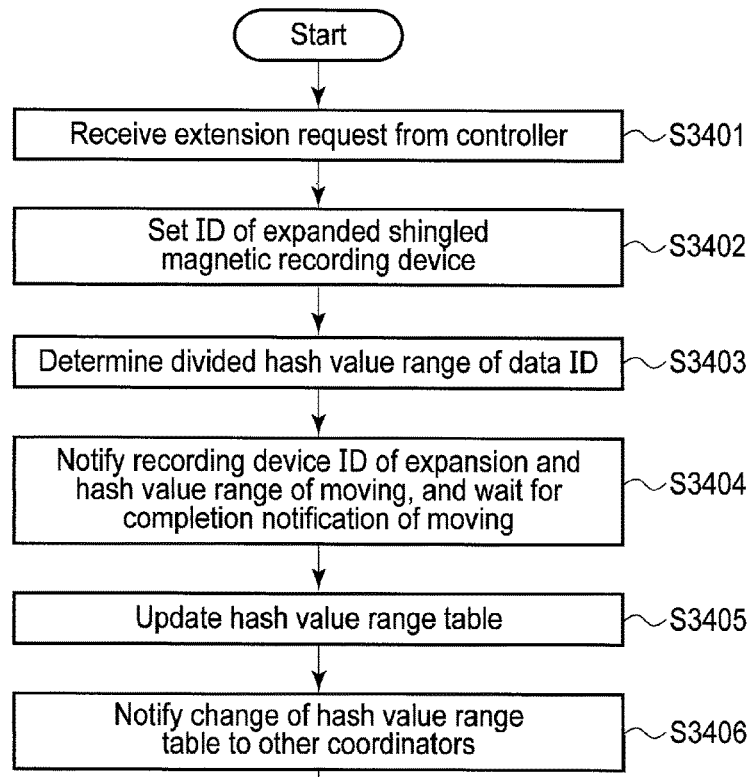
F I G. 34

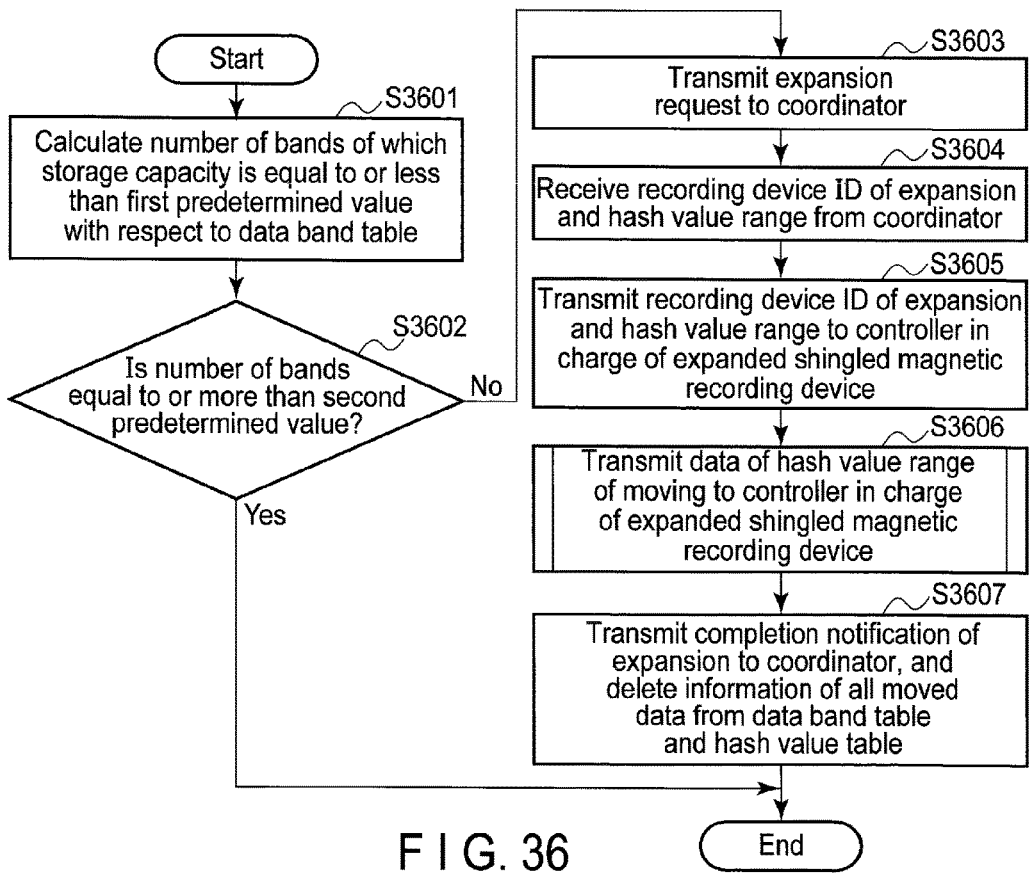
F I G. 35
F I G. 36

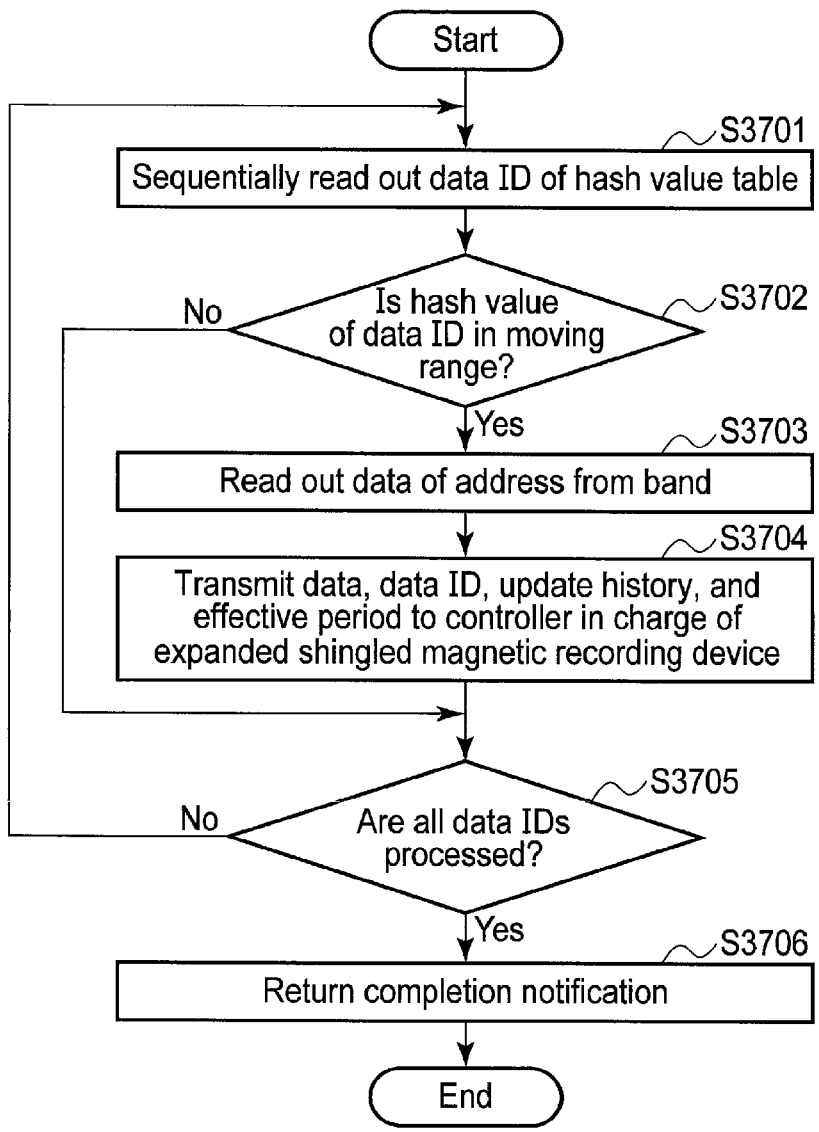
F I G. 37

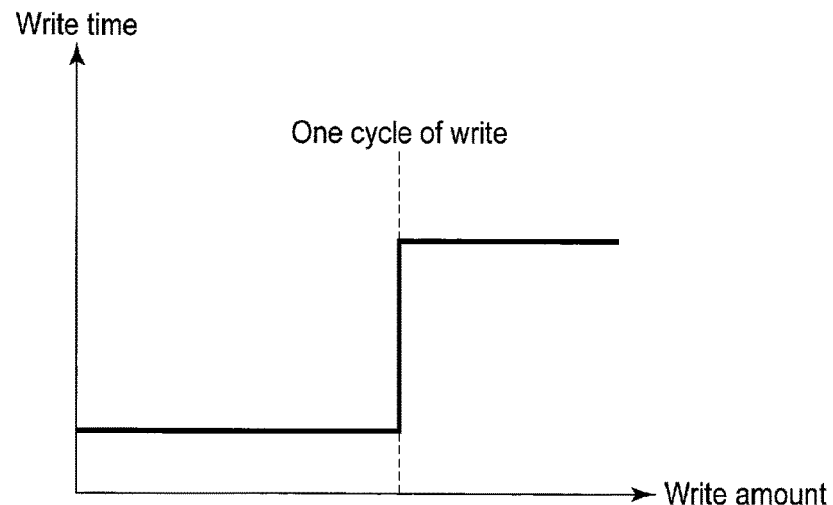
F I G. 40
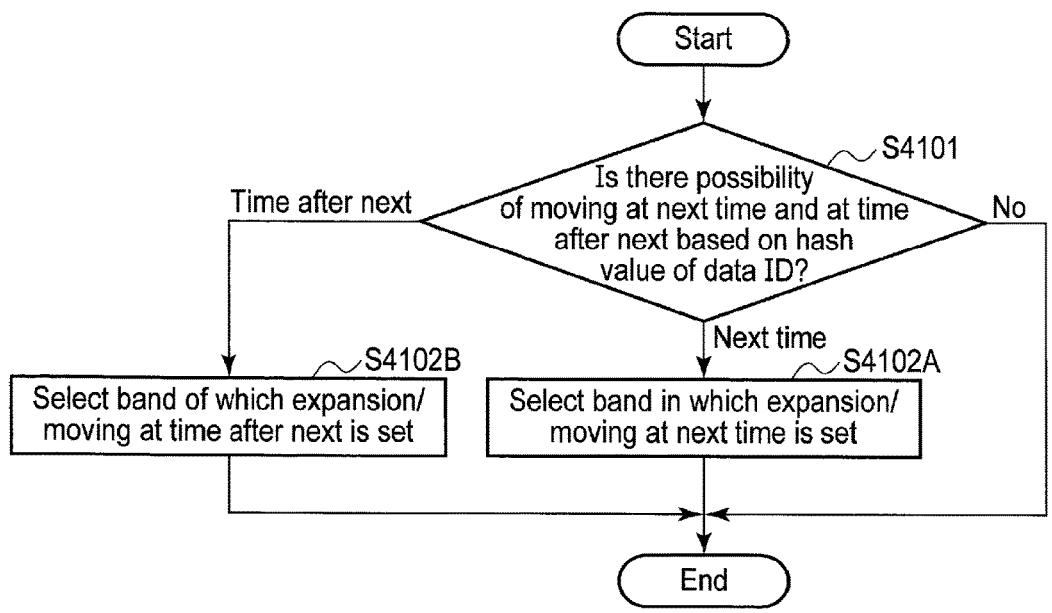
F I G. 41

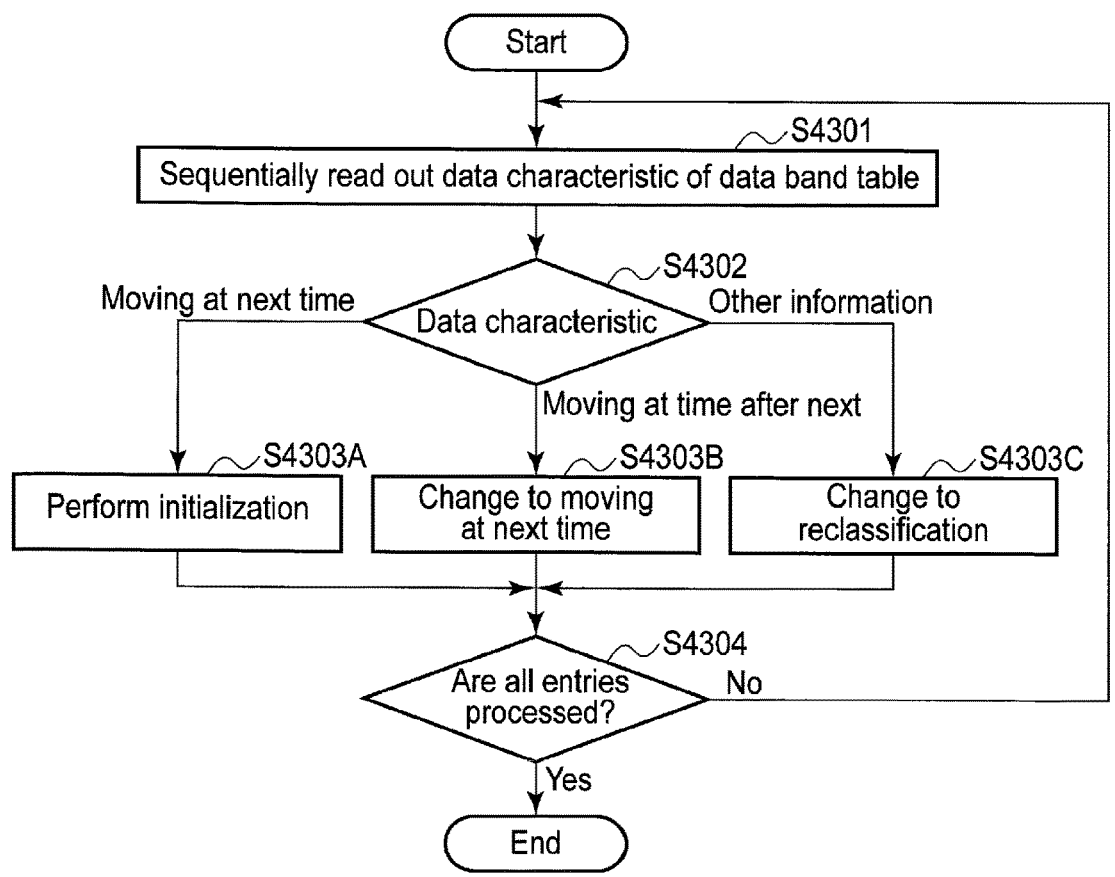
F I G. 43

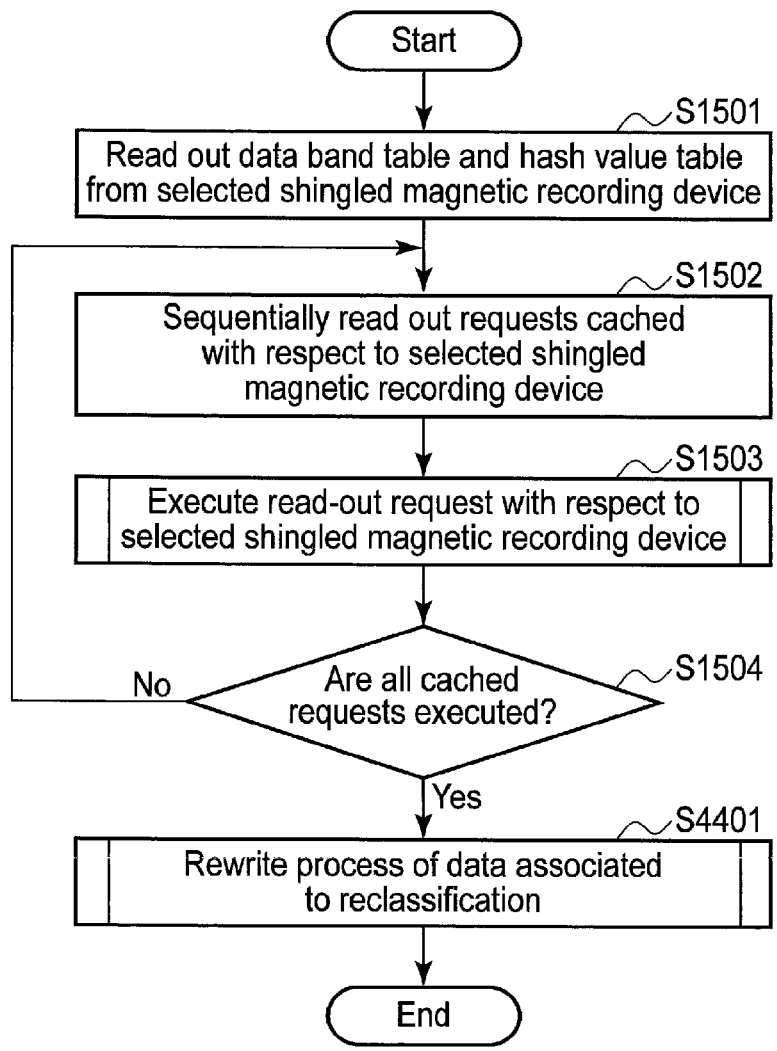
F I G. 44

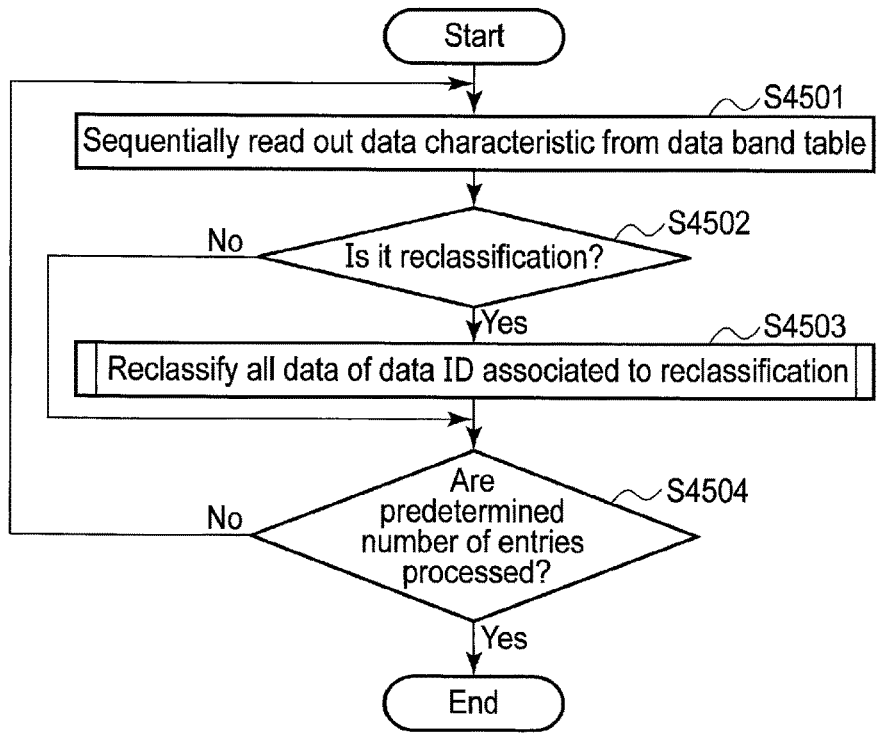
F I G. 45
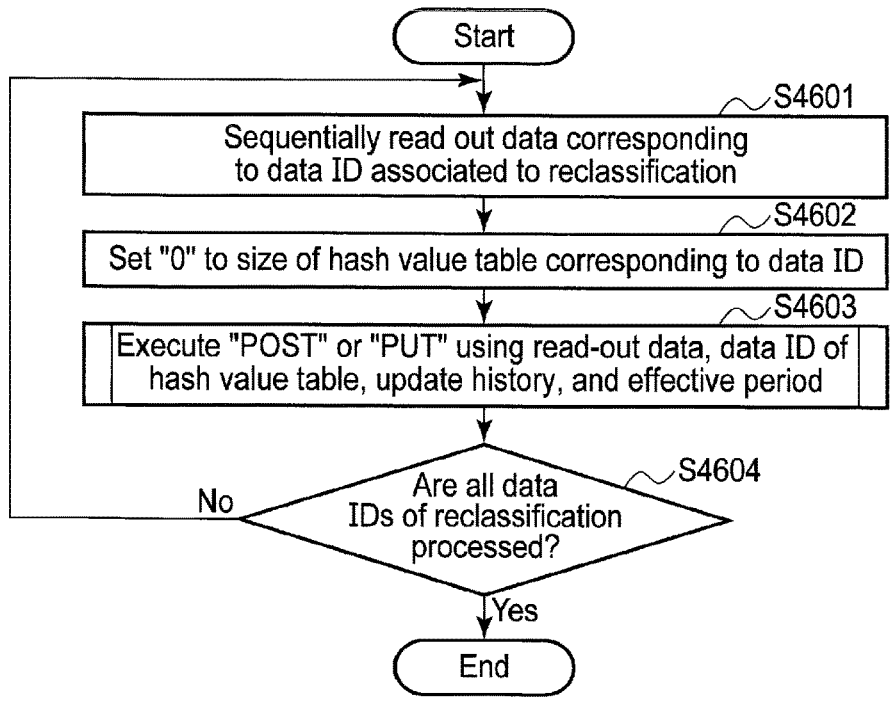
F I G. 46

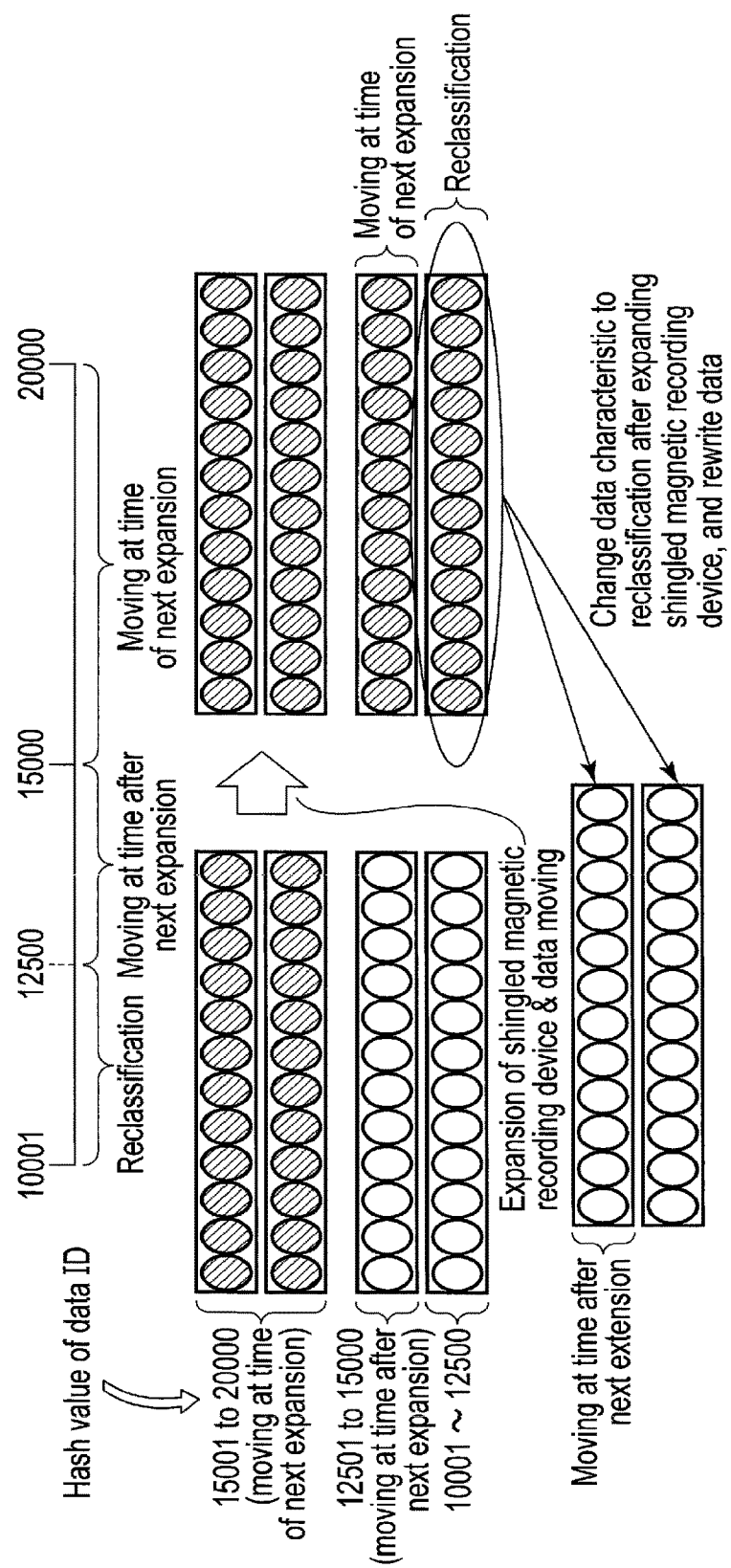
F I G. 47

| Hash value range table ||
|---|---|
| Hash value range | Recording device ID |
| 1 ~ 10000 | 8-1-1, 8-2-1, 8-3-1, 8-4-1, 8-5-1, 8-6-1 |
| 10001 ~ 20000 | 8-7-1, 8-8-1, 8-9-1, 8-10-1, 8-11-1, 8-12-1 |
| 20001 ~ 30000 | 8-13-1, 8-14-1, 8-15-1, 8-16-1, 8-17-1, 8-18-1 |
| ⋮ | ⋮ |
| 980001 ~ 990000 | 8-(N-11)-8, 8-(N-10)-8, 8-(N-9)-8, 8-(N-8)-8, 8-(N-7)-8, 8-(N-6)-8 |
| 990001 ~ 1000000 | 8-(N-5)-8, 8-(N-4)-8, 8-(N-3)-8, 8-(N-2)-8, 8-(N-1)-8, 8-N-8 |

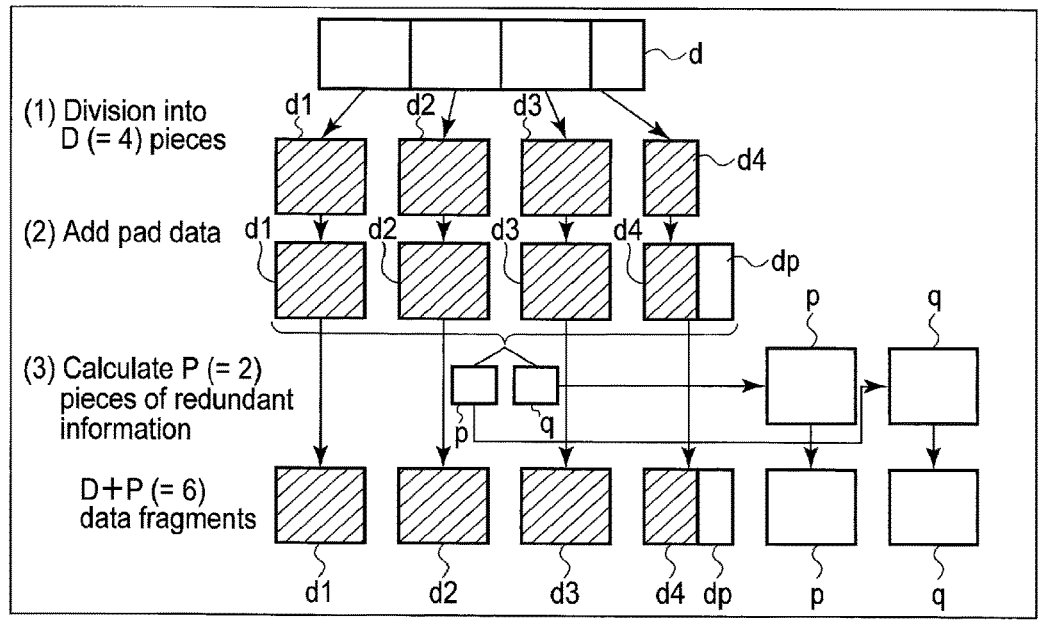
F I G. 50
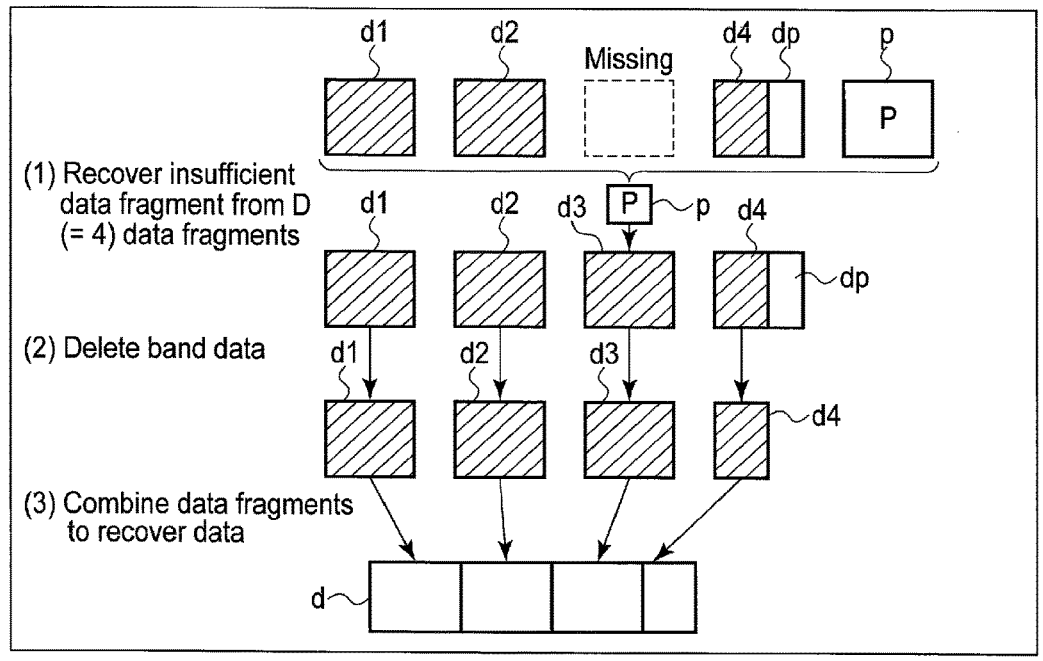
F I G. 51

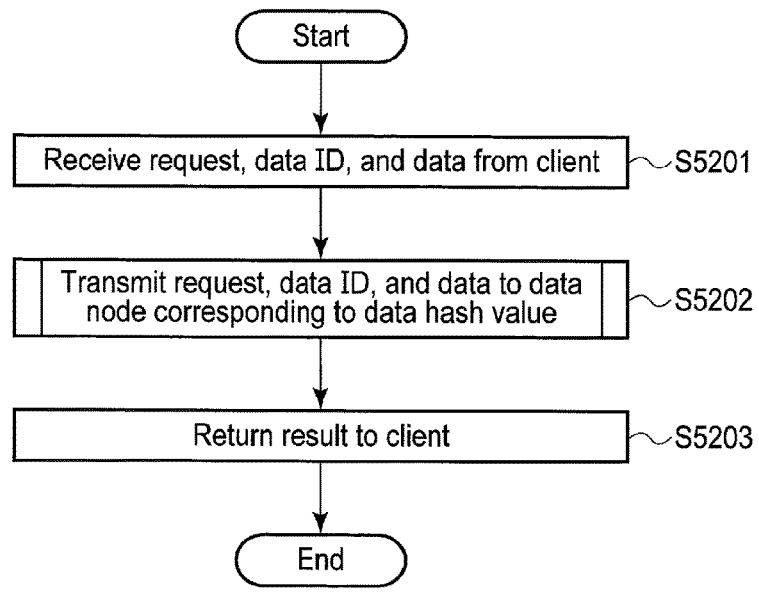
F I G. 52
| Data ID table ||| |
|---|---|---|
| Data ID | Data hash value list | Update history |
| 1 | 546434, 4556, 344566, 66335, 6567576, 444 | Absent |
| 2 | 1234, 34567, 345, 987891, 234563, 678934, 537789 | Present |
| 3 | Absent | |
| ⋮ | ⋮ | |
| 999999999 | 354435346, 45435, 5476547547, 4, 5654, ⋯ | Present |
| 1000000000 | Absent | |
F I G. 53

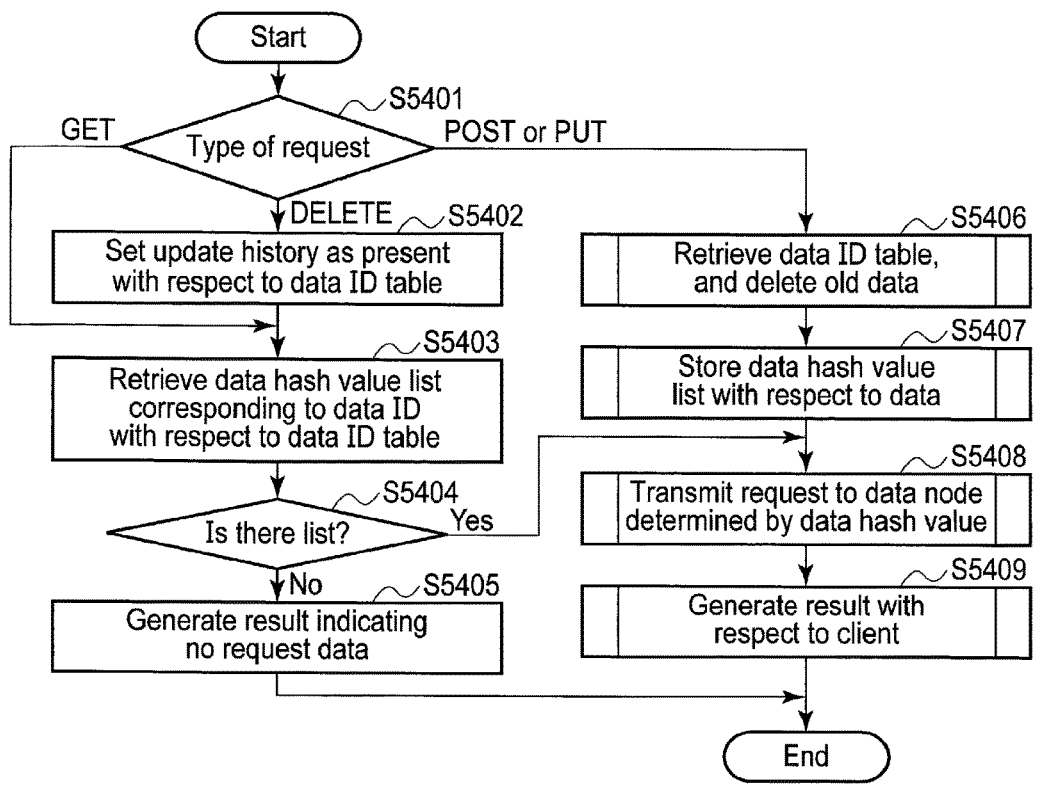
F I G. 54
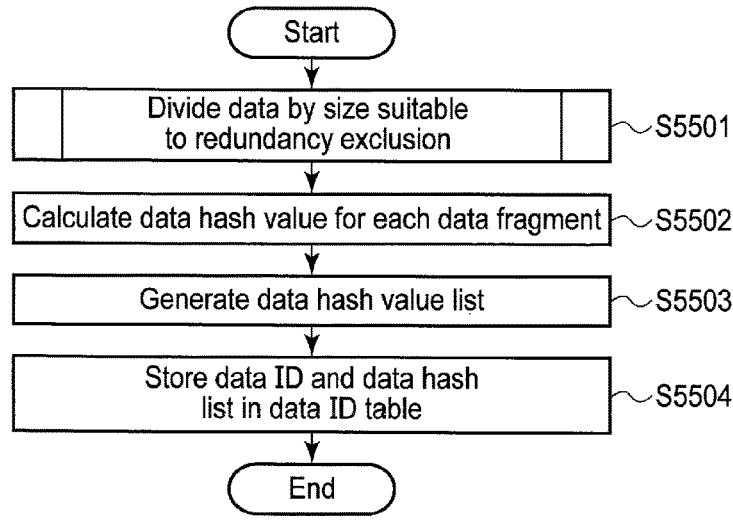
F I G. 55

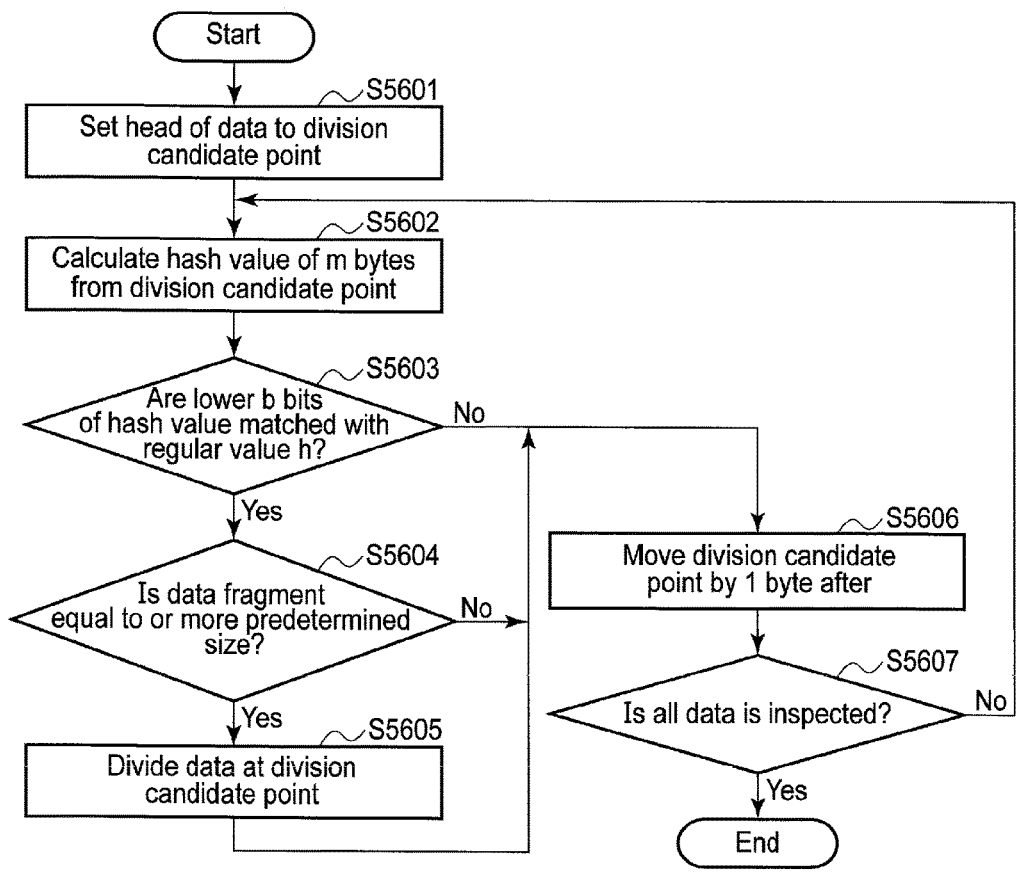
F I G. 56

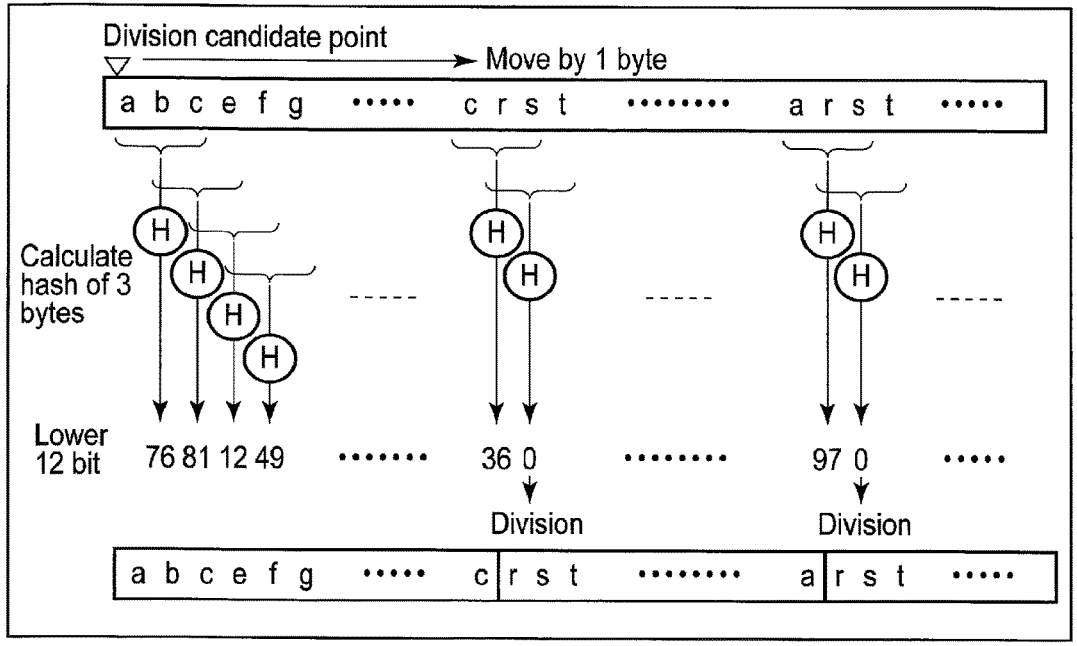
F I G. 57
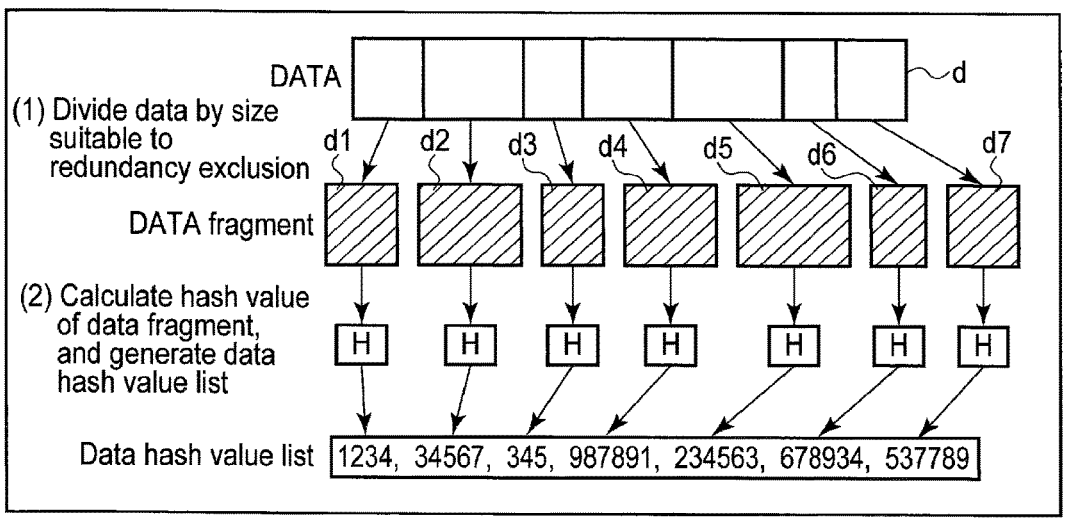
F I G. 58

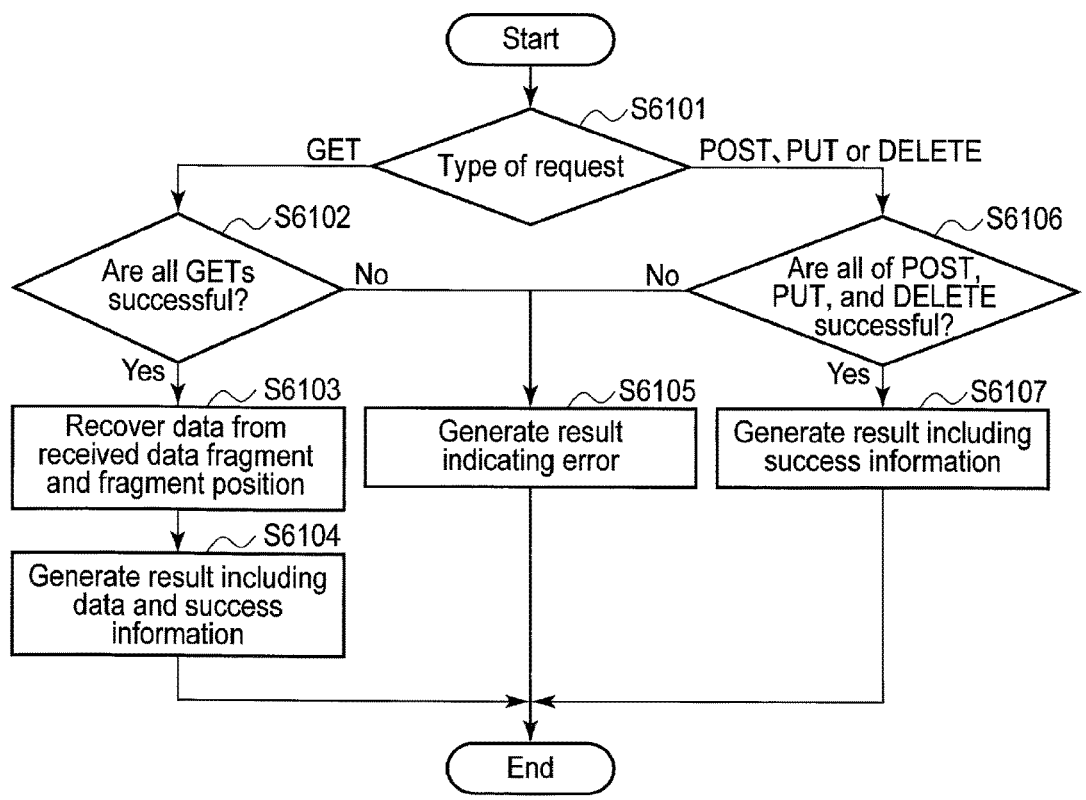
F I G. 61

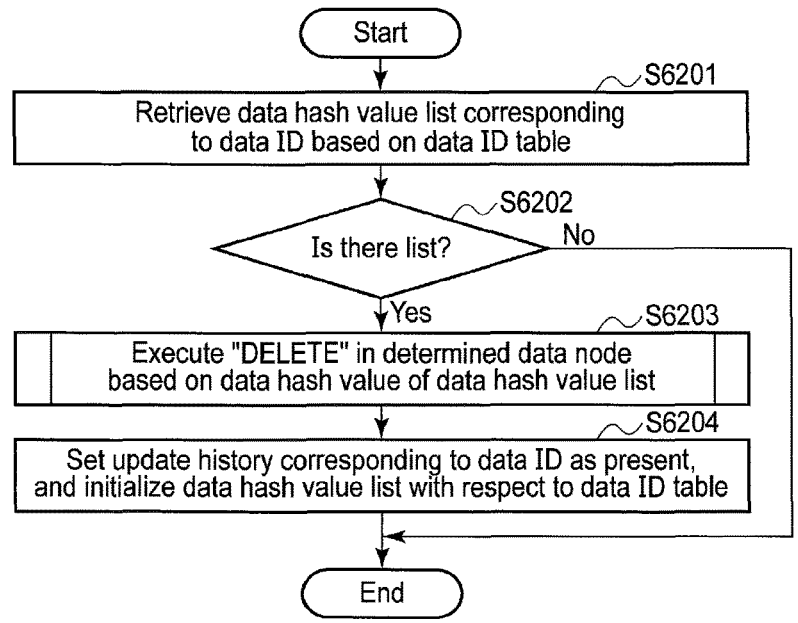

F I G. 62

| Cache information ||
|---|---|
| Recording device ID | Request |
| 8-1-1 | (POST, data ID0, fragment position 3, data fragment A), (PUT, data ID1, fragment position 1, data fragment B), (DELETE, data ID2, fragment position 7), (POST, data ID3, fragment position 6, data fragment C), (DELETE, DATA ID4, fragment position 2), ... |
| 8-1-2 | (PUT, data ID5, fragment position 4, data fragment D), (PUT, data ID6, fragment position 9, data fragment E), (POST, data ID7, fragment position 3, data fragment F), (POST, DATA ID8, fragment position 7, data fragment G), (DELETE, data ID5, fragment position 11), ... |
| 8-1-3 | (POST, data ID10, fragment position 8, data fragment I) (POST, data ID11, fragment position 5, data fragment J), (POST, data ID 13, fragment position 6, data fragment K), (POST, DATA ID14, fragment position 8, data fragment L), (PUT, data ID15, fragment position 4, data fragment M), ... |
| ... | ... |

F I G. 63

| Data band table | | | | |
|---|---|---|---|---|
| Band ID | Storage capacity | Write head position | Data ID + fragment position | Data characteristic |
| 1 | 400000 | -1 | 123+5, 456+9, ··· | Delete in future |
| 2 | 135678 | 164580 | 5589+8, 4321+0, ··· | Expansion/moving |
| 3 | 0 | 0 | Absent | Absent |
| ····· | ····· | ····· | ····· | |

| Hash value table 24 |||||||
|---|---|---|---|---|---|---|
| Hash value | Data ID + fragment position | Update history | Address | Size | Effective period | Data hash value |
| 1 | 3463+6 | Absent | Data band 3, 2345-th sector | 4 | 2015/3/31 | 19766 |
| 2 | 854332+3 | Present | Data band 1, 0-th sector | 123 | | 876 |
| 3 | -1 | | | | | |
| 4 | 100467+13 | Absent | Data band 12, 345-th sector | 56789 | 2020/2/28 | 8765 |
| ... | ... | ... | ..... | ... | | |

FIG. 66

| Data hash value table 25 ||
|---|---|
| Data hash value | Data ID + fragment position |
| 1 | 4537+6, 354+44 |
| 2 | 46433+8 |
| 3 | Absent |
| 4 | 76456+5, 453+3, 4845+1 |
| ..... | ..... |

FIG. 67

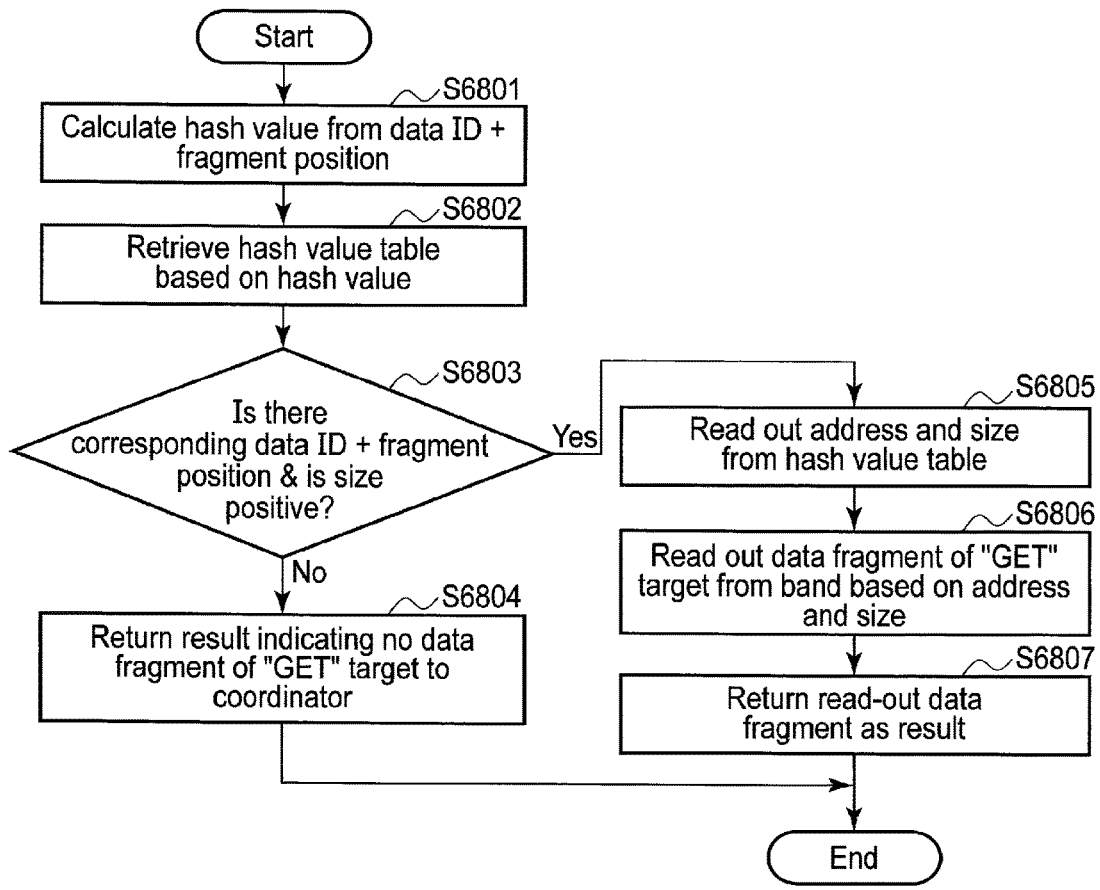
F I G. 68

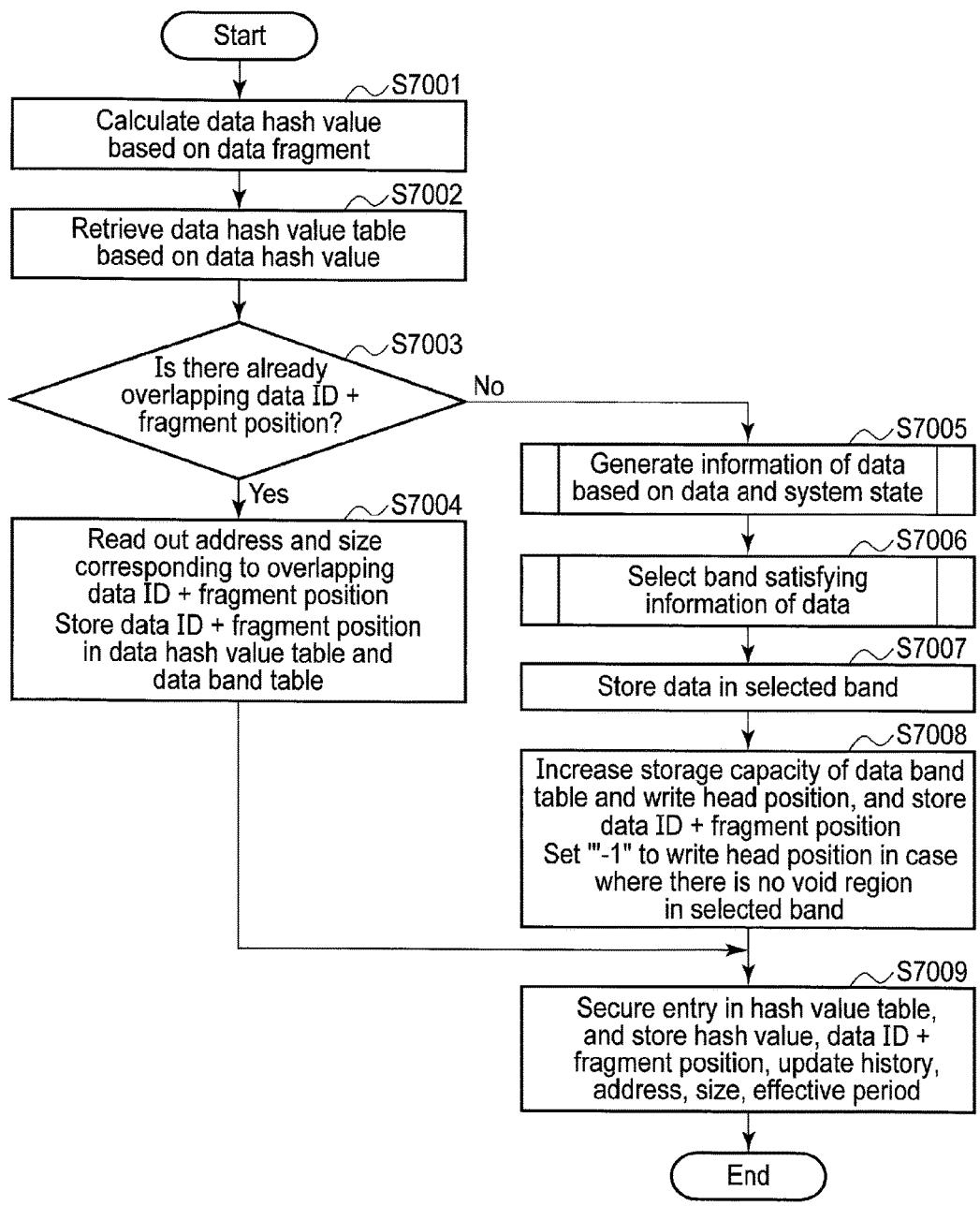
F I G. 70

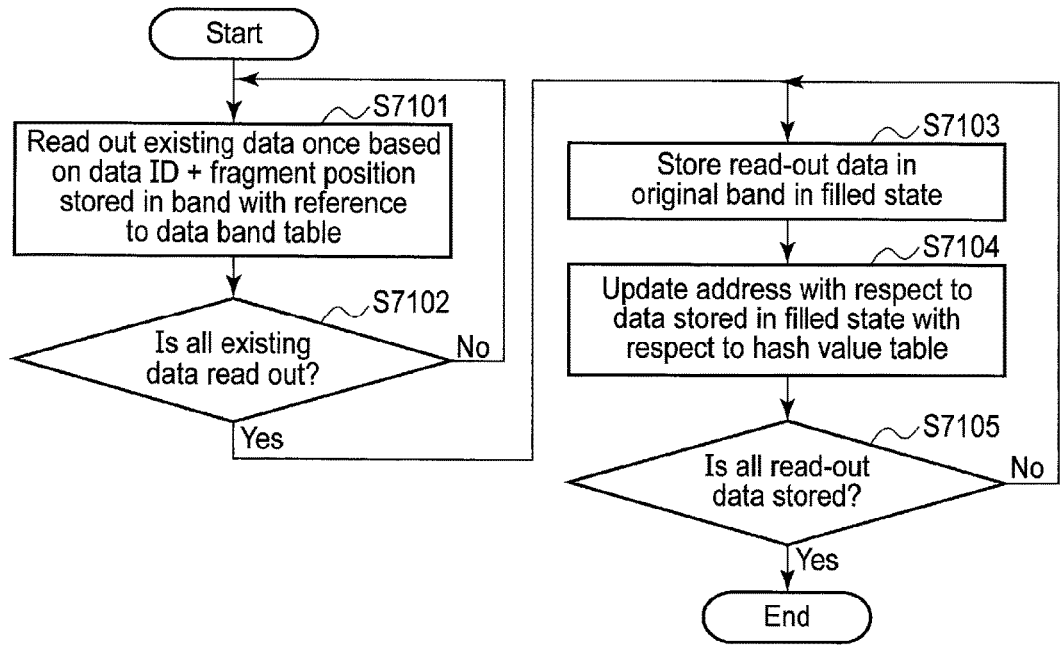
F I G. 71
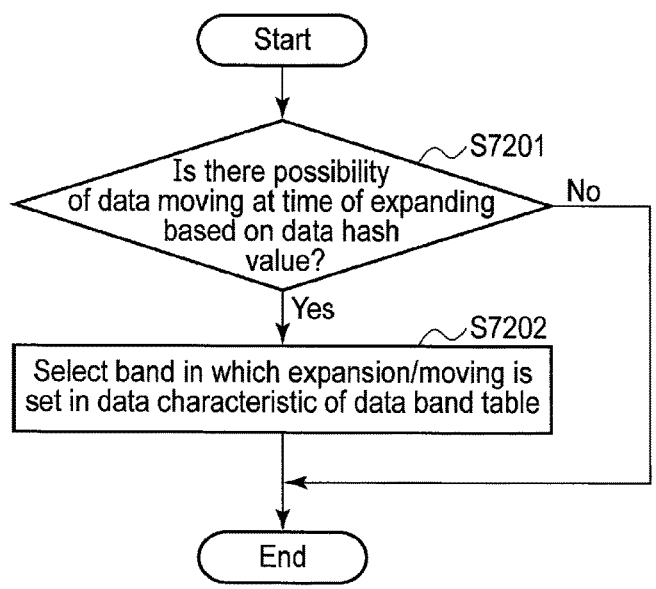
F I G. 72

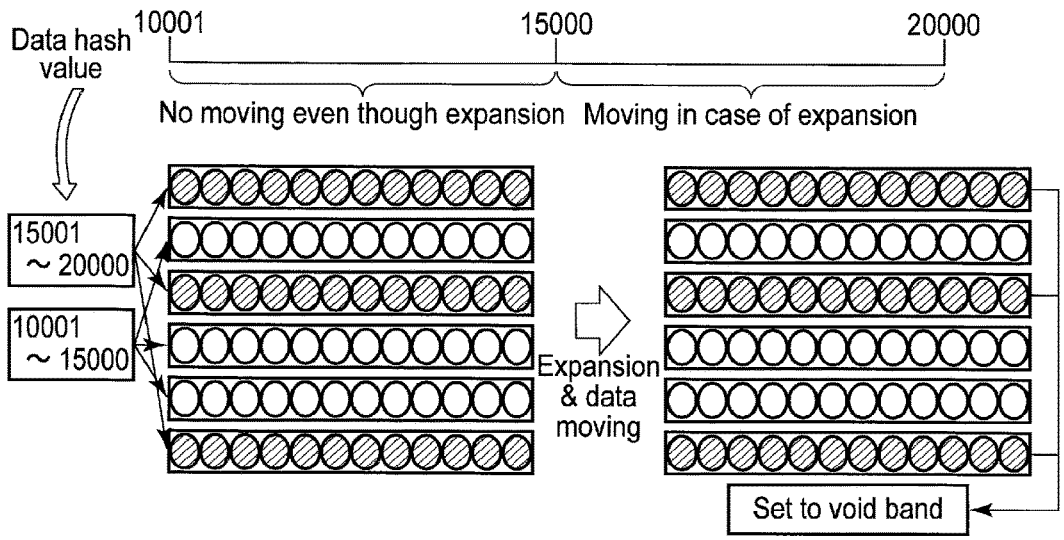
F I G. 73
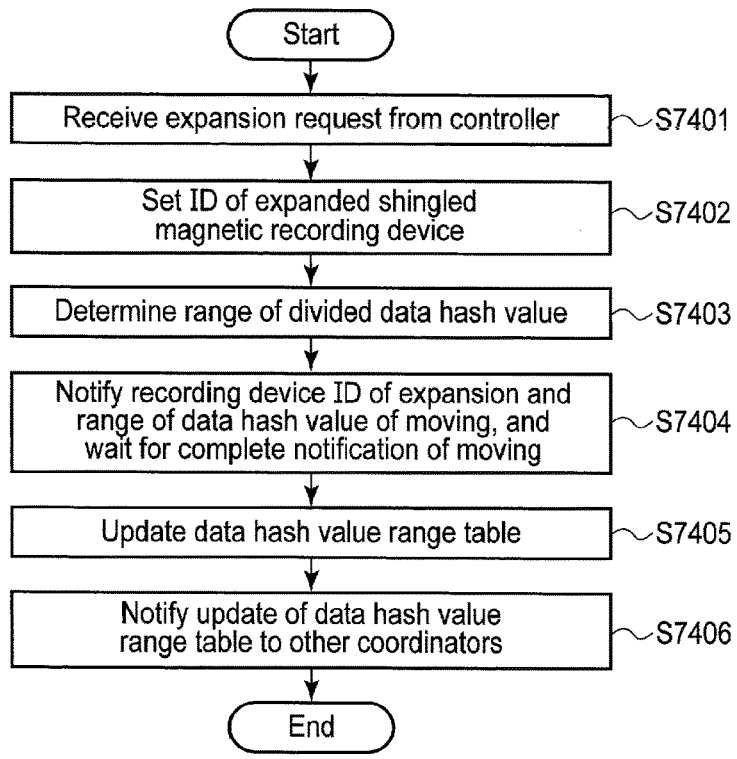
F I G. 74

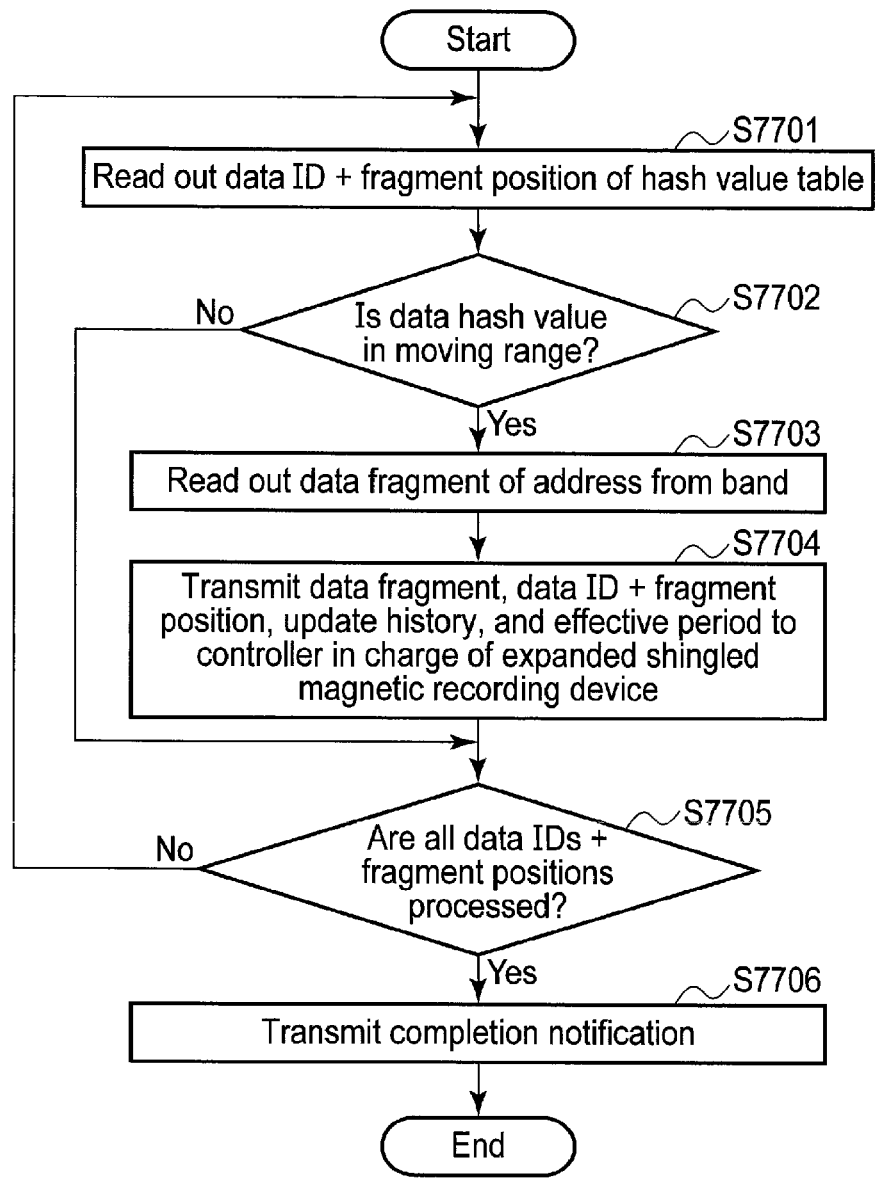
F I G. 77

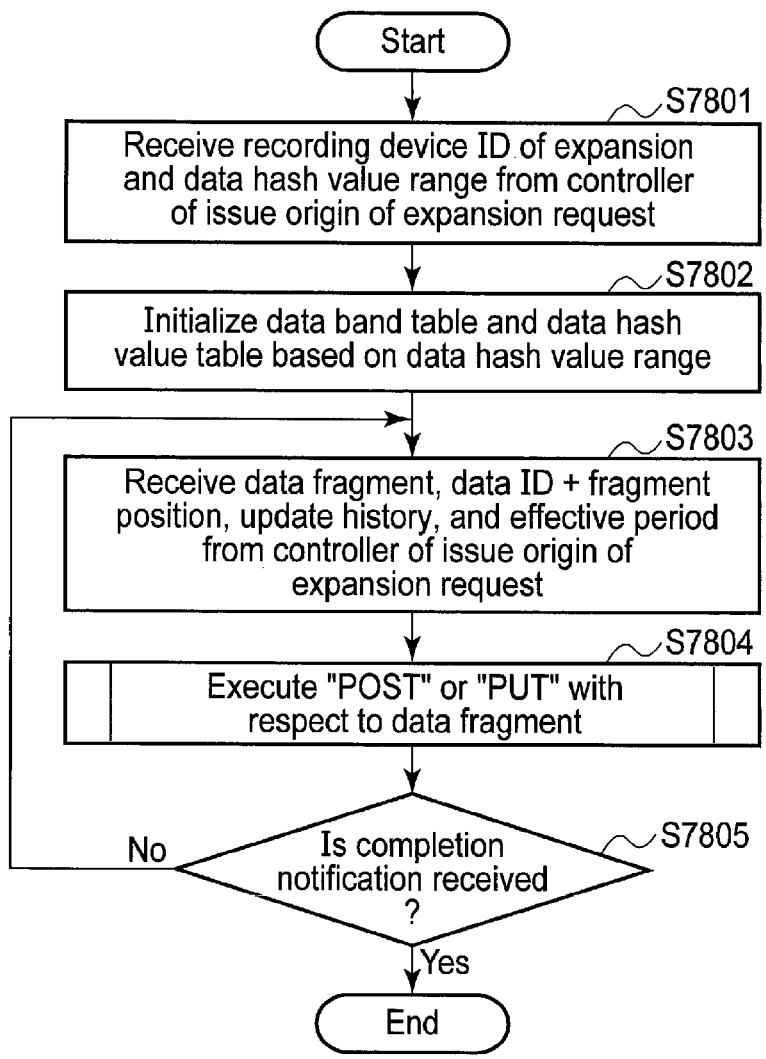
F I G. 78

STORAGE DEVICE, COMPUTER-READABLE NONVOLATILE STORAGE MEDIUM TO STORE CONTROL PROGRAM OF STORAGE DEVICE, AND CONTROL METHOD OF STORAGE DEVICE

CROSS REFERENCE TO RELATED APPLICATIONS

This application is a Continuation application of PCT Application No. PCT/JP2015/081058, filed Nov. 4, 2015, the entire contents of which are incorporated herein by reference.

FIELD

Embodiments described herein relate generally to a storage device, a computer-readable nonvolatile storage medium to store a control program of the storage device, and a control method of the storage device.

BACKGROUND

There is a technique of shortening a track width of a magnetic disk and of increasing a track density in order to increase the capacity of a hard disk drive (hereinafter, referred to as HDD) and to improve a recording density.

Further, there is disclosed a technique of narrowing the track width to an extent that the adjacent tracks are partially overlapped and overwritten in order to improve the track density of the magnet disk. This technique is called a shingled magnetic recording technique. In a case where the shingled magnetic recording technique is used, the data of the adjacent tracks partially overlapped overwritten is erased at the time of writing. Therefore, there is a need to perform writing in unit of a track group (hereinafter, referred to as band) by collecting a plurality of tracks.

SUMMARY

Technical Problem

A shingled magnetic recording device necessarily writes data in unit of a band, and it may take a time in writing more than a normal HDD which performs the writing in unit of a data. In addition, in a case where the shingled magnetic recording device performs updating by deleting or rewriting the data, the updating is necessarily performed in unit of a band containing the data to be updated. Therefore, it may take a time to update the data.

The embodiments have been made in view of the above situations, and an object thereof is to suppress a time to write with respect to the shingled magnetic recording device.

Solution to Problem

According to one embodiment, a storage device includes a shingled magnetic recording device, a management unit, a selection unit, and an execution unit. The shingled magnetic recording device performs writing in unit of a band including tracks being adjacent to and partially overlapping with each other. The management unit manages management information mutually associating band identification information of the band, characteristic information indicating a possibility that data stored in the band is not referred to, and data identification information of the data in a case where the data is stored in the band. The selection unit selects the band of the shingled magnetic recording device storing the data based on the data and the characteristic information in a case where the shingled magnetic recording device is requested to store the data. The execution unit stores the data to the selected band.

BRIEF DESCRIPTION OF THE DRAWINGS

FIG. 1 is a block diagram illustrating a first example of a storage device according to a first embodiment.

FIG. 2 is a block diagram illustrating a second example of the storage device according to the first embodiment.

FIG. 3 is a block diagram illustrating an example of a storage system according to a second embodiment.

FIG. 4 is a block diagram illustrating an example of a configuration of a coordinator.

FIG. 5 is a data structural diagram illustrating an example of a hash value range table.

FIG. 6 is a flowchart illustrating an example of processing of a request processing unit.

FIG. 7 is a flowchart illustrating an example of processing of determining a data node.

FIG. 8 is a block diagram illustrating an example of a configuration of a controller included in the data node.

FIG. 9 is a data structural diagram illustrating an example of cache information stored in a cache recording device.

FIG. 10 is a flowchart illustrating an example of processing of a cache processing unit.

FIG. 13 is a data structural diagram illustrating an example of a hash value table.

FIG. 14 is a flowchart illustrating an example of processing of a request execution unit.

FIG. 15 is a flowchart illustrating an example of processing of executing all requests cached with respect to a selected shingled magnetic recording device.

FIG. 16 is a flowchart illustrating an example of processing of executing request with respect to the shingled magnetic recording device.

FIG. 17 is a flowchart illustrating an example of processing of executing GET with respect to the shingled magnetic recording device.

FIG. 18 is a flowchart DELETE with respect to the shingled magnetic recording device.

FIG. 19 is a flowchart PUT or POST with respect to the shingled magnetic recording device.

FIG. 20 is a flowchart illustrating an example of processing of selecting a band which satisfies information of data.

FIG. 23 is a flowchart illustrating an example of existing data filling processing.

FIG. 24 is a diagram illustrating an example of a state in which a band is selected based on a data characteristic.

FIG. 25 is a flowchart illustrating an example of processing of selecting the band based on the data characteristic.

FIG. 26 is a flowchart illustrating an example of processing of selecting a band at a storing destination based on a determination on whether there is a possibility that data is deleted in near future.

FIG. 27 is a diagram illustrating an example of a state where bands at the storing destination according to an effective period.

FIG. 28 is a flowchart illustrating an example of processing of selecting a band at a storing destination by determining whether there is a possibility that data is moved at a time of expending a shingled magnetic recording device.

FIG. 33 is a diagram illustrating an example of a state where bands are divided into for data of a small size and for other data.

FIG. 34 is a flowchart illustrating an example of processing of an expansion management unit.

FIG. 35 is a data structural diagram illustrating an example of a hash value range table after expansion.

FIG. 36 is a flowchart illustrating an example of processing of an expansion processing unit.

FIG. 37 is a flowchart illustrating an example of processing of transmitting data in the hash value range of a data ID of moving to a controller in charge of an expanded shingled magnetic recording device.

FIG. 40 is a graph illustrating an example of a change in a writing period before and after one cycle of writing in the shingled magnetic recording device of the comparative example.

FIG. 41 is a flowchart illustrating an example of processing of selecting a band at a storing destination by determining whether there is a possibility of moving at a time of expanding a shingled magnetic recording device according to this embodiment.

FIG. 43 is a flowchart illustrating an example of processing of changing a data characteristic of a hash value table.

FIG. 44 is a flowchart illustrating an example of a relation between processing of executing all the cached requests with respect to a selected shingled magnetic recording device and processing of rewriting data associated to a reclassification.

FIG. 45 is a flowchart illustrating an example of processing of rewriting data associated to the reclassification.

FIG. 46 is a flowchart illustrating an example of processing of reclassifying all data of a data ID associated to the reclassification.

FIG. 47 is a diagram illustrating an example of a relation among data to be moved at a time of next expansion, data to be moved at a time after next expansion, and data to be reclassified in a data characteristic.

FIG. 50 is a block diagram illustrating an example of processing of generating four data fragments and two pieces of redundant information.

FIG. 51 is a block diagram illustrating an example of processing of recovering original data from the four data fragments and two pieces of the redundant information.

FIG. 52 is a flowchart illustrating an example of processing of a request processing unit of a coordinator according to a fifth embodiment.

FIG. 53 is a data structural diagram illustrating an example of a data ID table.

FIG. 54 is a flowchart illustrating an example of processing of determining a data node of a processing destination based on the data ID table.

FIG. 55 is a flowchart illustrating an example of processing of generating and storing a data hash value list.

FIG. 56 is a flowchart illustrating an example of processing of dividing data by a size suitable to redundancy exclusion.

FIG. 57 is a diagram illustrating a specific example of division of data.

FIG. 58 is a block diagram illustrating an example of generating a data hash value list.

FIG. 61 is a flowchart illustrating an example of processing of generating a result with respect to a client.

FIG. 62 is a flowchart illustrating an example of processing of retrieving data ID table and deleting old data.

FIG. 63 is a data structural diagram illustrating an example of cache information which is stored in a cache recording device.

FIG. 66 is a data structural diagram illustrating an example of a hash value table.

FIG. 67 is a data structural diagram illustrating an example of a data hash value table.

FIG. 68 is a flowchart illustrating an example of processing of executing GET with respect to a shingled magnetic recording device.

FIG. 70 is a flowchart illustrating an example of processing of executing PUT or POST with respect to the shingled magnetic recording device.

FIG. 71 is a flowchart illustrating an example of existing data filling processing.

FIG. 72 is a flowchart illustrating an example of processing of selecting a band at a storing destination by determination on whether there is a possibility that data is moved at a time of expansion of a shingled magnetic recording device.

FIG. 73 is a diagram illustrating an example of a state where bands at a storing destination of data are divided according to a possibility of moving at a time of expanding a shingled magnetic recording device.

FIG. 74 is a flowchart illustrating an example of processing of an expansion management unit.

FIG. 77 is a flowchart illustrating an example of processing of transmitting data in a data hash value range of moving to a controller in charge of an expanded shingled magnetic recording device.

FIG. 78 is a flowchart illustrating an example of processing of the controller in charge of the expanded shingled magnetic recording device.

DETAILED DESCRIPTION

Figures 11, 12:
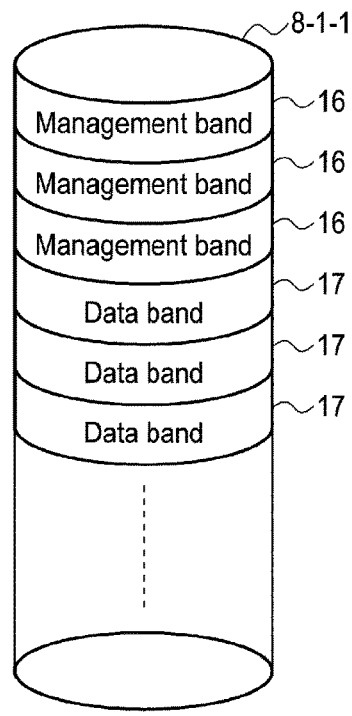
FIG. 11 is a diagram illustrating an example of a shingled magnetic recording device.
FIG. 12 is a data structural diagram illustrating an example of a data band table.

Hereinafter, embodiments will be described with reference to the drawings. Further, the elements identical with or similar to those in the drawings will be attached by the same symbols, and the descriptions thereof will be omitted or simplified while the description will focus on the different portions.

First Embodiment

A storage device according to this embodiment is mainly used for the purpose of writing, and the description herein will be given about an example of a cold storage device in which the number of reading is less than that of writing.

FIG. 1 is a block diagram illustrating a first example of the storage device according to this embodiment.

A storage device 101 includes a controller 102, a shingled magnetic recording device 103, and a recording device 104. The storage device 101 may be provided with two or more shingled magnetic recording devices. The storage device 101 is additionally provided with a shingled magnetic recording device 105 after starting to store data in the shingled magnetic recording device 103.

The controller 102 includes a selection unit 106, an execution unit 107, a management unit 108, a period elimination unit 109, an expansion storage unit 110, an expansion elimination unit 111, a reclassification setting unit 112, and a reclassification unit 113. Respective functions of the controller 102 may be realized such that a program 202 stored a non-transitory nonvolatile storage medium 201 is read out by a computer, and then the read-out program is executed by the computer.

The recording device 104 includes band management information 114 and data management information 115. The band management information 114 and the data management information 115 are managed in a table format for example. However, the band management information 114 and the data management information 115 may be managed in a list format or in other data formats. In addition, the band management information 114 and the data management information 115 may be integrated into one piece of information, or may be divided into three or more pieces of information.

The band management information 114 and the data management information 115 may be stored in the shingled magnetic recording device 103 for example. In this case, the recording device 104 may be omitted.

The band management information 114 mutually associates a recording device ID (for example, identification information such as an identifier) used to identify the shingled magnetic recording device provided in the storage device 101, a band ID used to identify a band of the shingled magnetic recording device, a write position of data stored in the band (for example, a storage capacity of data and a write head position of data), a data ID used to identify data in a case where the data is stored in the band, and a data characteristic indicating a possibility not to refer the data stored in the band. Herein, the expression "possibility not to refer data" indicates a possibility that the data stored in the band is not referred with respect to an inquiry from a host device or a user such as "a case where the data is not possible to be referred because an effective period designated by a host device or a user elapses", "a case where the data is not possible to be referred because of moving at the time of expanding (increasing) the shingled magnetic recording device", and "a case where the old data is not possible to be referred because the data is rewritten". In other words, the data characteristic indicates a possibility that data stored in a band comes to be an invalid state.

The data characteristic indicates, for example, a possibility that a band comes to be a void state after data is stored in the band. The data characteristic is set based on at least one of a characteristic of storable data in a band and a state of a system for example. For example, the controller 102 may include a function of setting the data characteristic.

The data management information 115 mutually associates a recording device ID, a data ID, an address at which data indicating the data ID is stored, a data size, an update history indicating whether the data is updated (delete or rewrite), and an effective period of the data.

In a case where storing (including creating, rewriting, and updating) of data and a data moving due to expansion of the shingled magnetic recording device 105 are requested, the selection unit 106 selects a band to store the data based on the data and the data characteristic of the band management information 114.

For example, the data characteristic of the band management information 114 indicates an expiration of the data effective period' of the band corresponding to a time point when the band of a void state of the shingled magnetic recording device 103 disappears.

For example, the data characteristic indicates a moving target at the time of expansion of the shingled magnetic recording device 105.

For example, the data characteristic indicates any one of a moving target at the time of next expansion of the shingled magnetic recording device, a moving target at the time after next expansion, reclassification, and other information.

For example, the data characteristic indicates a size of storable data.

For example, the data characteristic indicates that a condition allowing storing to the band is updated.

In a case where data storing is requested, the execution unit 107 stores the data to the selected band.

In a case where data deleting is requested, the execution unit 107 deletes the data based on the data management information 115.

The management unit 108 manages the band management information 114 and the data management information 115. For example, the management unit 108 updates the band management information 114 and the data management information 115 based on storing or deleting of data by the execution unit 107, deleting of data by the period elimination unit 109, storing of data by the expansion storage unit 110, deleting of data by the expansion elimination unit 111, and storing or deleting of data by the reclassification unit 113. For example, the management unit 108 further manages the update history of the data management information 115.

The management unit 108 manages the band management information 114 and the data management information 115 with respect to the shingled magnetic recording device 103 which is provided in the storage device 101 and manages the band management information 114 and the data management information 115 with respect to the shingled magnetic recording devices 103 and 105 after the shingled magnetic recording device 105 is expanded (added to the storage device 101).

In a case where an effective period of data stored in a band elapses, the period elimination unit 109 deletes the data from the shingled magnetic recording devices 103 and 105 based on the band management information 114 and the data management information 115.

At the time of expansion of the shingled magnetic recording device 105, the expansion storage unit 110 reads out data from a band of the shingled magnetic recording device 103 which is indicated as a moving target at the time of next expansion by the data characteristic of the band management information 114. Then, the expansion storage unit 110 stores the read-out data to the band of the shingled magnetic recording device 105 selected by the selection unit 106 based on the band management information 114 and the data management information 115.

At the time of expansion of the shingled magnetic recording device 105, the expansion elimination unit 111 deletes the data which is read out by the expansion storage unit 110 and moved to the expanded shingled magnetic recording device 105 from the band of the shingled magnetic recording device 103 before moving.

In a case where the data is moved from the shingled magnetic recording device 103 to the shingled magnetic recording device 105, the reclassification setting unit 112 changes the data characteristic with respect to the band of the shingled magnetic recording device 103. For example, the reclassification setting unit 112 initializes (clear) the data characteristic in a case where the data characteristic indicates moving at the time of next expansion after the data moved by the expansion storage unit 110 is read out, or sets the data characteristic to be at the time of next expansion in a case where the data characteristic indicates moving at the time after next expansion, or reclassifies characteristic information in a case where the data characteristic is other information.

The reclassification unit 113 reads out the data of the band where the reclassification is set in the data characteristic in the band management information 114, selects the band newly stored with the read-out data based on the read-out data and the data characteristic of the band management information 114, and stores the read-out data to the selected band.

FIG. 2 is a block diagram illustrating a second example of a storage device according to this embodiment.

A controller 102A of a storage device 101A divides data into a plurality of data fragments, and performs storing and reading on the data in unit of a data fragment with respect to the shingled magnetic recording devices 103 and 105, and performs the reading. Respective components 106A to 113A of the controller 102A are different from the components 106 to 113 of the controller 102 of FIG. 1 in that the data is divided into the plurality of data fragments, but performs almost the same processing as those of the components 106 to 113.

The controller 102A further includes a division unit 116, a recovery unit 117, and a combining unit 118.

The division unit 116 divides data into a plurality of data fragments, and generates combining information which is used in a case where the plurality of data fragments are recovered into the original data, and redundant information which is used for recovery in a case where an error occurs in the data fragment. For example, the redundant information may also be stored in the shingled magnetic recording devices 103 and 105 as data fragments. For example, the redundant information may be stored in a recording device other than the shingled magnetic recording devices 103 and 105. For example, a fragment position indicating a position of the data fragment in the data before division is used as the combining information. For example, the combining information is included and managed in at least one of the band management information 114 and the data management information 115.

The recovery unit 117 recovers data fragment where an error occurs based on a normal data fragment and the redundant information in a case where the data fragment is read out of the shingled magnetic recording devices 103 and 105 and an error occurs in any one of the plurality of read-out data fragments.

The combining unit 118 generates original data before division based on the plurality of data fragments and the combining information in a case where a plurality of normal data fragments are received from the recovery unit 117.

Band management information 114A and data management information 115A further include a data ID indicating a data fragment, a fragment position which is the combining information, and a value calculated based on the data fragment.

The controller 102A manages the band management information 114A and the data management information 115A using the value calculated based on the data fragment, and selects a band in the shingled magnetic recording devices 103 and 105. For example, the controller 102A selects a storing band using a data hash value which is a calculation result of a hash value of the data fragment.

In a case where the values of the plurality of data fragments are the same, the same data hash value is calculated. Therefore, it is possible to suppress that the same data fragment having the same value is stored and overlapped in the plurality of bands by selecting the band based on the data hash value. Further, it is possible to improve a capacity efficiency of the shingled magnetic recording devices 103 and 105.

In the storage devices 101 and 101A according to this embodiment described above, reading necessary at the time of writing can be reduced, a writing time to the shingled magnetic recording devices 103 and 105 can be suppressed, a recording density can be increased, a cost can be lowered, processing speed is increased, and power saving can be achieved.

In this embodiment, in a case where the band once stored with the data is reused, the data of which the effective period stored in the band is expired is collectively considered as the void state, the reused band can be used as a void band, and an overhead can be suppressed.

In this embodiment, in a case where the shingled magnetic recording device 105 is expanded, the data of the band of the existing shingled magnetic recording device 103 is moved to the expanded shingled magnetic recording device 105, and the band of the shingled magnetic recording device 103 can be used as the void band. Therefore, it is possible to suppress the overhead at the time of expansion of the shingled magnetic recording device 105.

In this embodiment, after the data is moved from the existing shingled magnetic recording device 103 to the expanded shingled magnetic recording device 105, the data having a high possibility that the effective period elapses in the future can be collected into the same band of the shingled magnetic recording device 105. Therefore, in a case where the band of the expanded shingled magnetic recording device 105 is reused, the data in the band is collectively considered as in the void state, the reused band of the shingled magnetic recording device 105 can be used as the void band as it is, and the overhead can be suppressed.

In this embodiment, the update history of the data is managed, and the data having a high possibility of deleting or rewriting can be collected in the same band. In a case where the band already has stored with the existing data is reused, the band where a lot of data is deleted or rewritten may be selected. In the updated band, there are a lot of regions in which the data comes to be the void state by the deleting or the rewriting of the data. Therefore, the amount of reading-out data can be reduced at the time of storing the data by reusing the band where a lot of deleted or rewritten data is stored, a lot of data can be stored, and the overhead can be suppressed.

In this embodiment, the data size is managed, and the band to store the data can be selected according to the data size. A small size of data is data for the management, and has a high possibility to be deleted or rewritten. In a case where the band already has stored with the existing data is reused, a lot of data in the band collectively having the small size of data is deleted or rewritten and enters the void state. Therefore, in a case where the band is reused, the band collectively having the small size of data is reused, so that the amount of reading-out data can be reduced, a lot of data can be stored, and the overhead can be suppressed.

In this embodiment, even in a case where the shingled magnetic recording device is repeatedly expanded, the data is moved from the existing shingled magnetic recording device to the expanded shingled magnetic recording device, so that the band of the void state can be generated in the existing shingled magnetic recording device.

In the storage device 101A according to this embodiment, the data is recovered based on the redundant information. Therefore, it is possible that the same data is redundantly stored for backup, and a required storage capacity can be suppressed. In this embodiment, it is possible to perform correction processing by erasure coding, and the capacity efficiency can be improved.

In the storage device 101A according to this embodiment, the band of the shingled magnetic recording devices 103 and 105 is selected based on the data hash value which is a hash value of the data fragment. Therefore, it is possible that the same data is redundantly stored in the shingled magnetic recording devices 103 and 105, and the capacity efficiency can be improved.

Second Embodiment

In this embodiment, the storage device according to the first embodiment will be described in detail. In this embodiment, a storage system will be described.

FIG. 3 is a block diagram illustrating an example of the storage system according to this embodiment.

A storage system 1 is provided with the coordinators 2-1 and 2-2, and the data nodes 3-1 to 3-N. For example, the storage system 1 is used for various purposes such as for backup, archives, and management of an amount of data. In FIG. 3, there is exemplified the storage system 1 which is provided with two coordinators, and N (N is an integer of 2 or more) data nodes. However, the number of coordinators may be "1", or "3" or more, and the number of data nodes may be "1". In other words, the number of coordinators and data nodes may be set to an arbitrary integer of "1" or more.

The coordinators 2-1 and 2-2, the data nodes 3-1 to 3-N, and a client 4 are connected to a network 5, and can mutually request data and transmission and reception of results. These components are connected to the storage system 1. The respective devices connected to the network 5 may be provided at a remote place. The client 4 is a device of the user.

The data nodes 3-1 to 3-N are provided with controllers 6-1 to 6-N, cache recording devices 7-1 to 7-N, and shingled magnetic recording devices 8-1-1 to 8-N-9. FIG. 3 illustrates a case where the number of shingled magnetic recording devices provided in the data nodes 3-1 to 3-N is "9", and the number may be "1" or more.

The controllers 6-1 to 6-N controls various types of components provided in the data nodes 3-1 to 3-N.

The cache recording devices 7-1 to 7-N caches the issued request for the data nodes 3-1 to 3-N and information relating to the request.

The shingled magnetic recording devices 8-1-1 to 8-N-9 store various types of data of a writing target. As the data stored to the shingled magnetic recording devices 8-1-1 to 8-N-9, for example, there is user data requested to be stored by the user.

The data nodes 3-1 to 3-N are provided with the controllers 6-1 to 6-N, the cache recording devices 7-1 to 7-N, and the shingled magnetic recording devices 8-1-1 to 8-1-9, . . . , 8-N-1 to 8-N-9.

The functions of the coordinators 2-1 and 2-2 may be provided in the controllers 6-1 to 6-N. In this case, the coordinators 2-1 and 2-2 may be omitted.

The client 4 issues a request to the storage system 1 according to an application program interface (API). The API is, for example, an interface which uses a communication protocol such as a HTTP (Hyper Text Transfer Protocol).

In this embodiment, the description will be typically given about the coordinator 2-1, the data node 3-1, the cache recording device 7-1, and the shingled magnetic recording device 8-1-1 among the coordinators 2-1 and 2-2, the data nodes 3-1 to 3-N, the cache recording devices 7-1 to 7-N, the shingled magnetic recording devices 8-1-1 to 8-N-9. The other coordinator 2-2, the data nodes 3-2 to 3-N, the cache recording device 7-2, and the shingled magnetic recording devices 8-1-2 to 8-N-9 also have the similar characteristics.

As the request, for example, there are POST, GET, PUT, and DELETE.

POST is a request for generating the data to the storage system 1. For example, POST is attached with a storage system ID for identifying a host, a data ID, data to be stored, and a size of the data.

GET is a request for acquire the data from the storage system 1. For example, GET is attached with the storage system ID and the data ID.

PUT is a request for updating the data of the storage system 1. For example, PUT is attached with the storage system ID, the data ID, the data to be stored, and the size of the data.

DELETE is a request for deleting the data of the storage system 1. DELETE is attached with the storage system ID and the data ID.

FIG. 4 is a block diagram illustrating an example of a configuration of the coordinator 2-1.

The coordinator 2-1 is provided with a request processing unit 9, an expansion management unit 10, and a hash value range table 11.

Herein, the hash value range table 11 and the request processing unit 9 will be described, and the expansion management unit 10 will be described later.

FIG. 5 is a data structural diagram illustrating an example of the hash value range table 11. In the hash value range table 11, the range of hash values is from 1 to 1000000. However, the range of hash values may be appropriately changed.

The hash value range table 11 associates the recording device IDs indicating the shingled magnetic recording devices 8-1-1 to 8-N-9 to various ranges of hash values.

With the use of the hash value range table 11, it is possible to determine the recording device ID corresponding to the data ID based on the hash value of the data ID. Further, the data node ID indicating the data node provided with the recording device ID can be determined based on the recording device ID. For example, the recording device ID contains the data node ID of the data node provided with the shingled magnetic recording device of the recording device ID.

In a case where a request issued from the client 4 is received, the request processing unit 9 determines a data node which processes the request based on the request and the hash value range table 11, and transmits the request to the determined data node.

FIG. 6 is a flowchart illustrating an example of processing of the request processing unit 9.

In Step S601, the request processing unit 9 receives the data ID of the request target, and the request from the client 4. The request processing unit 9 receives the data and the data size from the client 4 depending on a type of request (for example, POST or PUT).

In Step S602, the request processing unit 9 determines the data node in charge of (corresponding to) processing the request based on the data ID, and transmits the data ID of the request target and the request to the data node in charge. The request processing unit 9 transmits the data and the data size to the data node in charge depending on a type of request.

In Step S603, the request processing unit 9 returns a result to the client.

FIG. 7 is a flowchart illustrating an example of the processing of determining the data node in Step S602.

In Step S701, the request processing unit 9 calculates a hash value based on the data ID attached to the request.

In Step S702, the request processing unit 9 determines the shingled magnetic recording devices corresponding to the calculated hash value based on the calculated hash value and the hash value range table 11.

In Step S703, the request processing unit 9 transmits the request, the data ID, and the recording device ID indicating the determined shingled magnetic recording device to the data node in charge which includes one of the determined shingled magnetic recording devices. The request processing unit 9 transmits the data and the data size to the data node in charge depending on a type of request.

In Step S704, the request processing unit 9 determines whether the request is transmitted to all the plurality of determined shingled magnetic recording devices.

In a case where the request is not transmitted to all the plurality of determined shingled magnetic recording devices, the request processing unit 9 repeats Step S703.

In a case where the request is transmitted to all the plurality of determined shingled magnetic recording devices, the request processing unit 9 receives a completion notification from the data node in charge in Step S705. Herein, in a case where the request is POST, PUT, and DELETE, the request processing unit 9 receives the completion notifications from all the data nodes in charge. In a case where the request is GET, the request processing unit 9 receives the completion notification from one of the data nodes in charge.

FIG. 8 is a block diagram illustrating an example of a configuration of the controller 6-1 included in the data node 3-1.

The controller 6-1 includes a cache processing unit 12, a request execution unit 13, and an expansion processing unit 14. Further, the description of the expansion processing unit 14 will be given later.

The cache processing unit 12 receives the request, the data ID, and the recording device ID indicating the shingled magnetic recording device from the coordinator 2-1. The cache processing unit 12 receives the data and the data size depending on a type of request. Then, the cache processing unit 12 associates the information such as the request and the data ID to the recording device ID, and stores (caches) the information in the cache recording device 7-1.

FIG. 9 is a data structural diagram illustrating an example of cache information stored in the cache recording device 7-1. In FIG. 9, the cache information is logically illustrated.

Cache information 15 of the cache recording device 7-1 associates the recording device ID to the request with respect to the recording device ID. In a case where the type of request is POST or PUT, the request is attached with the data ID and the data. In a case where the type of request is GET or DELETE, the request is attached with the data ID.

The cache recording device 7-1 may be mounted as a database, or may manage the cache information 15 in a manner of storing the request, the data ID, and the data in a file corresponding to the recording device.

FIG. 10 is a flowchart illustrating an example of processing of the cache processing unit 12.

In Step S1001, the cache processing unit 12 receives the request, the data ID, and the recording device ID from the coordinator 2-1. The cache processing unit 12 receives the data and the data size depending on a type of request.

In Step S1002, the cache processing unit 12 determines whether the request is GET.

In a case where the request is GET, the processing proceeds to Step S1005.

In a case where the request is not GET, the cache processing unit 12 caches the information such as the request and the data ID for each recording device ID in the cache recording device 7-1 in a state of classification in Step S1003.

In a case where the request is POST, DELETE, or PUT, the cache processing unit 12 returns a result to the coordinator 2-1 and ends the processing in Step S1004.

In a case where it is determined that the request in Step S1002 is GET, the cache processing unit 12 retrieves data corresponding to the recording device ID and the data ID with respect to the cache recording device 7-1 in Step S1005.

In Step S1006, the cache processing unit 9 determines whether the corresponding data is read out of the cache recording device 7-1, in other words, whether the data corresponding to the request and the information received from the coordinators 2-1 and 2-2 is cached in the cache recording device 7-1.

In a case where the corresponding data is not cached, the processing proceeds to Step S1003.

In a case where the corresponding data is cached, the cache processing unit 9 returns the data (cached data) associated to the request and the information which are read out of the cache recording device 7-1 and received from the coordinator 2-1 to the coordinator 2-1 in Step S1007, and the processing ends.

FIG. 11 is a diagram illustrating an example of the shingled magnetic recording device 8-1-1.

The shingled magnetic recording device 8-1-1 includes a management band 16 and a data band 17. The management band 16 and the data band 17 are separated by a band separator.

The management band 16 stores management information. The management information includes, for example, a data band table 18 and a hash value table 19. The management information may be stored in the cache recording device 7-1. In this case, all the bands of the cache recording device 7-1 may be used as the data band 17.

The data band 17 stores, for example, various types of data such as the user data and the client data.

FIG. 12 is a data structural diagram illustrating an example of the data band table 18.

The data band table 18 stored in the management band 16 stores the band ID, the storage capacity, the write head position, the data ID of the stored data, and the data characteristic indicating the data effective period (for example, whether it is deleted in the future, and whether it can be expanded and moved) in association with each other.

FIG. 13 is a data structural diagram illustrating an example of the hash value table 19.

The hash value table 19 stores the hash value, the data ID, the update history, the address, the size, and the effective period in association with each other. The address includes, for example, the band ID and a sector ID.

In a case where DELETE is executed, the address, the size, and the effective period corresponding to the deleted data are initialized.

FIG. 14 is a flowchart illustrating an example of processing of the request execution unit 13.

In Step S1401, the request execution unit 13 selects a shingled magnetic recording device which executes the request among from the connected shingled magnetic recording devices.

In Step S1402, the request execution unit 13 turns on the power of the selected shingled magnetic recording device, and is on a standby until an access to the selected shingled magnetic recording device is enabled.

In Step S1403, the request execution unit 13 executes all the requests which are cached with respect to the selected shingled magnetic recording device.

In Step S1404, the request execution unit 13 turns off the power of the selected shingled magnetic recording device.

In Step S1405, the request execution unit 13 determines whether the requests cached with respect to all the selected shingled magnetic recording devices are executed.

In a case where the cached requests are not executed with respect to all the shingled magnetic recording devices, the processing returns to Step S1401.

In a case where the requests cached with respect to all the shingled magnetic recording devices are executed, the request execution unit 13 ends the processing.

FIG. 15 is a flowchart illustrating an example of the processing of executing all the requests cached with respect to the selected shingled magnetic recording devices (Step S1403 of FIG. 14).

In Step S1501, the request execution unit 13 reads out the data band table 18 and the hash value table 19 from the selected shingled magnetic recording device.

In Step 1502, the request execution unit 13 sequentially reads out the requests cached with respect to the selected shingled magnetic recording device and the information attached to the request from the cache recording device 7-1.

In Step S1503, the request execution unit 13 executes the read-out requests with respect to the selected shingled magnetic recording device.

In Step S1504, the request execution unit 13 determines whether all the cached requests are executed with respect to the selected shingled magnetic recording device.

In a case where all the cached requests are not executed, the processing returns to Step S1502.

In a case where all the cached requests are executed, the processing ends.

FIG. 16 is a flowchart illustrating an example of the processing of executing the request with respect to the selected shingled magnetic recording device (Step S1503 of FIG. 15).

In Step S1601, the request execution unit 13 determines a type of the request.

In the type of the request is GET, the request execution unit 13 executes GET with respect to the selected shingled magnetic recording device in Step S1602A.

In a case where the type of the request is DELETE, the request execution unit 13 executes DELETE with respect to the selected shingled magnetic recording device in Step S1602B.

In a case where the type of the request is POST or PUT, the request execution unit 13 executes POST or PUT with respect to the selected shingled magnetic recording device in Step S1602C.

FIG. 17 is a flowchart illustrating an example of the processing of executing GET with respect to the shingled magnetic recording device (Step S1602A of FIG. 16).

In Step S1701, the request execution unit 13 calculates the hash value based on the data ID attached to the request.

In Step S1702, the request execution unit 13 retrieves the hash value table 19 based on the hash value.

In Step S1703, the request execution unit 13 determines whether there is an entry corresponding to the hash value in the hash value table 19, and the size corresponding to the hash value is a positive value. In a case where the size is a positive value, it indicates that the data is stored in the corresponding band. In a case where the size is zero, it indicates that the data is not stored in the corresponding band.

In a case where there is no entry corresponding to the hash value in the hash value table 19, or in a case where the size corresponding to the hash value is not a positive value, the request execution unit 13 returns a result indicating that there is no data of a GET target toward the coordinator 2-1 in Step S1704, and the processing ends.

In a case where there is an entry corresponding to the hash value in the hash value table 19, and the size corresponding to the hash value is a positive value, the request execution unit 13 reads out the address and the size corresponding to the hash value from the hash value table 19 in Step S1705.

In Step S1706, the request execution unit 13 reads out the data of the GET target from the band of the selected shingled magnetic recording device based on the read-out address and the read-out size.

In Step S1707, the request execution unit 13 returns the read-out data to the coordinator 2-1 as a result.

FIG. 18 is a flowchart illustrating an example of the processing of executing DELETE with respect to the shingled magnetic recording device (Step S16025 of FIG. 16).

In Step S1801, the request execution unit 13 calculates the hash value based on the data ID attached to the request.

In Step S1802, the request execution unit 13 retrieves the hash value table 19 based on the hash value.

In Step S1803, the request execution unit 13 determines whether there is an entry corresponding to the hash value in the hash value table 19, and the size corresponding to the hash value is a positive value.

In a case where there is no entry corresponding to the hash value in the hash value table 19, or in a case where the size corresponding to the hash value is not a positive value, the processing ends.

In a case where there is an entry corresponding to the hash value in the hash value table 19, and the size corresponding to the hash value is a positive value, the request execution unit 13 determines the band ID of the DELETE target in Step S1804 from the address corresponding to the hash value of the hash value table 19, and reads out the size corresponding to the hash value.

In Step S1805, the request execution unit 13 reduces the storage capacity corresponding to the determined band ID as much as the size corresponding to the hash value with respect to the data band table 18. In addition, the request execution unit 13 deletes the data ID of the DELETE target corresponding to the determined band ID with respect to the data band table 18.

In Step S1806, in a case where the storage capacity corresponding to the determined band ID is zero, the request execution unit 13 sets the write head position corresponding to the determined band ID to zero and initializes the data ID and the data characteristic to "Absent" with respect to the data band table 18.

In Step S1807, the request execution unit 13 initializes the address corresponding to the hash value, sets the size to zero, sets the effective period to "Absent", and sets the update history to "Present" with respect to the hash value table 19. Then, the processing ends.

FIG. 19 is a flowchart illustrating an example of the processing of executing PUT or POST with respect to the shingled magnetic recording device (Step S16020 of FIG. 16).

In Step S1901, the request execution unit 13 calculates the hash value based on the data ID attached to the request.

In Step S1902, the request execution unit 13 retrieves the hash value table 19 based on the hash value.

In Step S1903, the request execution unit 13 determines whether there is an entry corresponding to the hash value in the hash value table 19, and the size corresponding to the hash value is a positive value.

In a case where there is no entry corresponding to the hash value in the hash value table 19, or in a case where the size corresponding to the hash value is not a positive value, the processing proceeds to Step S1905.

In a case where there is an entry corresponding to the hash value in the hash value table 19, and the size corresponding to the hash value is a positive value, the request execution unit 13 considers the data corresponding to the data ID as the data of the DELETE target in Step S1904, and executes DELETE.

In Step S1905, the request execution unit 13 generates information of the data based on the data of the PUT or POST target and a system state.

In Step S1906, the request execution unit 13 selects a band in which the information of the data satisfies the data characteristic of the data band table 18 with reference to the data band table 18. In a case where the data characteristic satisfying the information of the data is not set in the data band table 18, the request execution unit 13 selects the void band, and stores the information of the data in the data characteristic corresponding to the selected void band.

In Step S1907, the request execution unit 13 stores the data from the write head position with respect to the selected band.

In Step S1908, the request execution unit 13 increases the storage capacity and the write head position with respect to the selected band ID by an amount of the size of the data with respect to the data band table 18. The request execution unit 13 stores the data ID in association with the selected band ID with respect to the data band table 18. In a case where the void region disappears from the selected band with respect to the data band table 18, the request execution unit 13 sets the information "−1" indicating a state of no void region at the write head position corresponding to the selected band ID.

In Step S1909, the request execution unit 13 secures an entry in the hash value table 19, and stores the hash value, the data ID, the update history, the address, the size, and the effective period. Then, the processing ends.

FIG. 20 is a flowchart illustrating an example of the processing of selecting a band which satisfies the information of the data (Step S1906 of FIG. 19).

In Step S2001, the request execution unit 13 retrieves a band ID indicating that the information of the data satisfies the data characteristic and the state of a region other than the void region is not "−1" with respect to the data band table 18.

In Step S2002, the request execution unit 13 determines whether the band ID is retrieved from the data band table 18.

In a case where the band ID is retrieved, the request execution unit 13 selects the retrieved band ID in Step S2003. Then, the processing ends.

In a case where the band ID is not retrieved, the request execution unit 13 executes effective period processing in Step S2004, and executes void band securing processing in Step S2005.

In Step S2006, the request execution unit 13 selects the band ID of the secured void band, and stores the data characteristic corresponding to the information of the data in the entry corresponding to the secured void band with respect to the data band table 18. Then, the processing ends.

Figure 21:
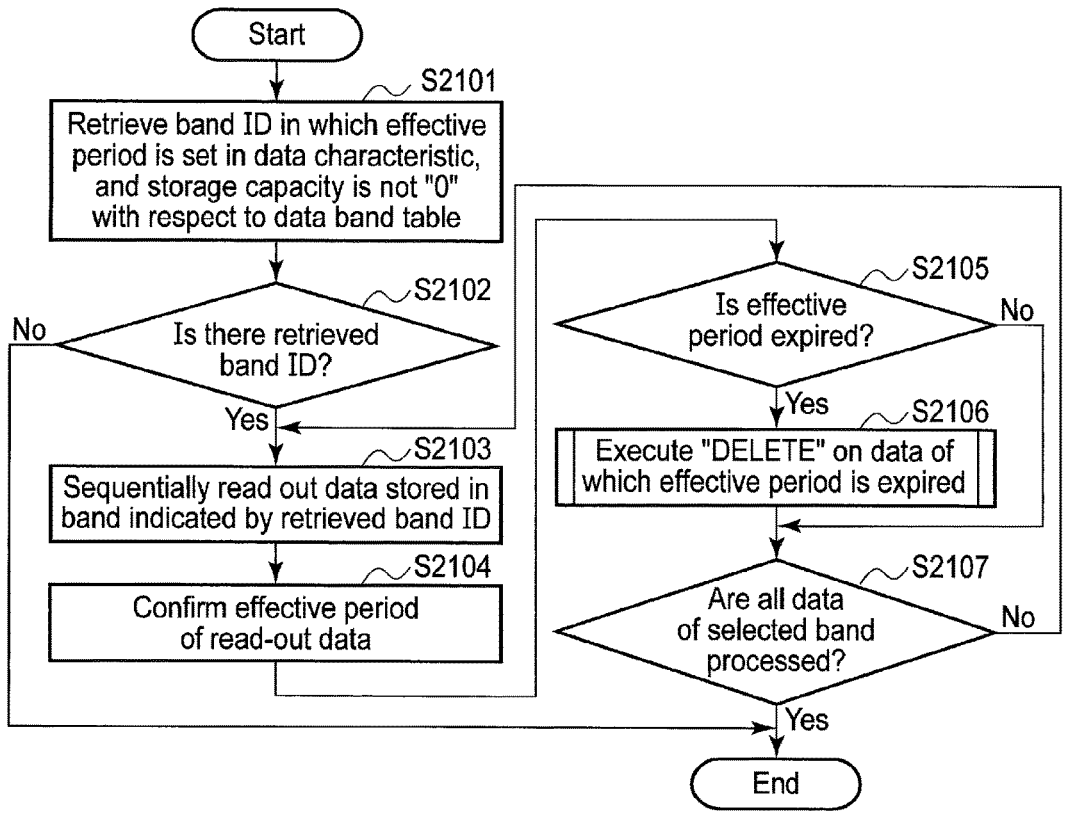
FIG. 21 is a flowchart illustrating an example of effective period processing.

FIG. 21 is a flowchart illustrating an example of the effective period processing (Step S2004 of FIG. 20).

In Step S2101, the request execution unit 13 retrieves a band ID of the band indicating that "effective period" indicating that the effective period is in the data characteristic is set, and the storage capacity is not zero with respect to the data band table 18.

In Step S2102, the request execution unit 13 determines whether the band ID is retrieved.

In a case where the band ID is not retrieved, the processing ends.

In a case where the band ID is retrieved, the request execution unit 13 sequentially reads out the data stored in the band indicated by the retrieved band ID based on the hash value table 19 in Step S2103.

In Step S2104, the request execution unit 13 confirms the effective period of the read-out data based on the hash value table 19.

In Step S2105, the request execution unit 13 determines whether the effective period of the read-out data is expired.

In a case where the effective period of the read-out data is not expired, the processing proceeds to Step S2107.

In a case where the effective period of the read-out data is expired, the request execution unit 13 executes DELETE in Step S2106 on the data of which the effective period is expired.

In Step S2107, the request execution unit 13 determines whether all the data stored in the band indicated by the retrieved band ID is processed.

In a case where all the data stored in the band indicated by the retrieved band ID is not processed, the processing returns to Step S2103.

In a case where all the data of the selected data band is processed, the processing ends.

Figure 22:
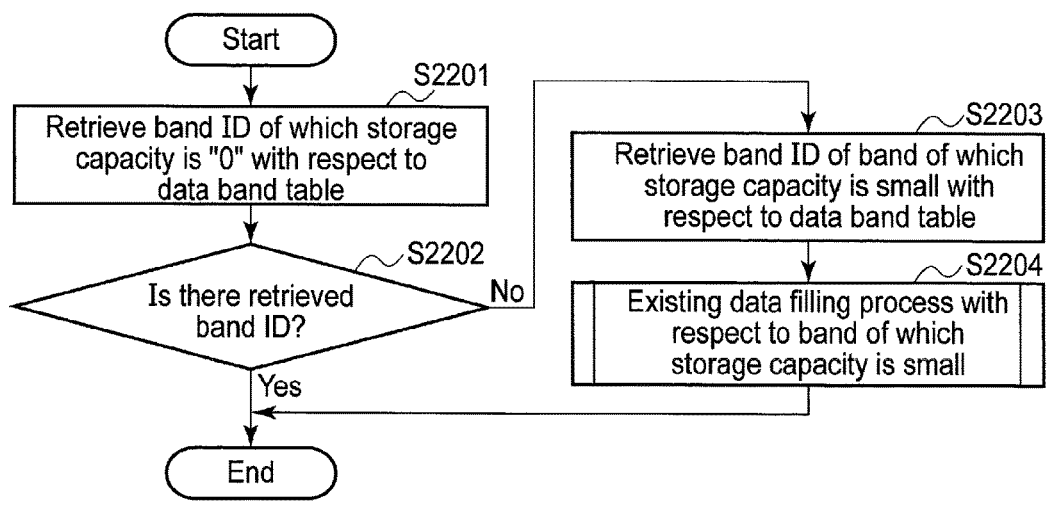
FIG. 22 is a flowchart illustrating an example of processing of securing a void band.

FIG. 22 is a flowchart illustrating an example of the processing of securing the void band (Step S2005 of FIG. 20).

In Step S2201, the request execution unit 13 retrieves a band ID indicating that the storage capacity is zero with respect to the data band table 18.

In Step S2202, the request execution unit 13 determines whether the band ID having the zero storage capacity is retrieved.

In a case where the band ID is retrieved, the processing ends.

In a case where the band ID is not retrieved, the request execution unit 13 retrieves a band ID of the band having a small storage capacity with respect to the data band table 18 in Step S2203 such that, for example, the storage capacity is the smallest, and the storage capacity is equal to or less than a threshold.

In Step S2204, the request execution unit 13 executes existing data filling processing on the band which is retrieved because the storage capacity is small. Then, the processing ends.

FIG. 23 is a flowchart illustrating an example of the existing data filling processing (Step S2204 of FIG. 22).

In Step S2301, the request execution unit 13 reads out the existing data of the band based on the data band table 18.

In Step S2302, the request execution unit 13 determines whether all the existing data is read out of the band.

In a case where all the existing data is not read out, the processing of Step S2301 is repeatedly performed.

In a case where all the existing data is read out, the request execution unit 13 stores the read-out data in the original band in a filled state in Step S2303.

In Step S2304, the request execution unit 13 updates the address with respect to the data stored in the filled state in the band with respect to the hash value table 19.

In Step S2305, the request execution unit 13 determines whether all the read-out data is stored in the band.

In a case where all the read-out data is not stored in the band, the processing returns to Step S2303.

In a case where all the read-out data is stored in the band, the processing ends.

Hereinafter, the characteristics of the storage system 1 according to this embodiment will be described in detail.

In this embodiment, as described above in Step S1906 of FIG. 19, in a case where POST or PUT is executed, a band is selected in which the information of the data satisfies the data characteristic set in the data band table 18.

FIG. 24 is a diagram illustrating an example of a state in which a band is selected based on the data characteristic.

In a case where POST or PUT is executed, the data having a feature C1 is stored in the band corresponding to the data characteristic of the feature C1. The data having a feature C2 is stored in the band corresponding to the data characteristic of the feature C2.

FIG. 25 is a flowchart illustrating an example of processing of selecting a band based on the data characteristic.

In Step S2501, the request execution unit 13 selects the band at a storing destination based on the determination on whether there is a possibility that the data is deleted in the near future.

In Step S2502, the request execution unit 13 selects the band at the storing destination based on the determination on whether there is a possibility that the data is moved at the time of expanding the shingled magnetic recording device.

In Step S2503, the request execution unit 13 determines whether there is a possibility that the data is deleted or rewritten (updated) using the update history, and selects the band at the storing destination.

In Step S2504, the request execution unit 13 selects the band at the storing destination based on a magnitude the data size.

(Processing of Selecting Band at Storing Destination Depending on Whether there is Possibility that Data is Deleted in Near Future)

In this embodiment, the request of POST or PUT is possible to designate the effective period of the data.

The client 4 transmits the request of POST or PUT, the data, and the effective period of the data to the controller 6-1 of the data node 3-1 through the coordinator 2-1. The controller 6-1 stores the effective period in the hash value table 19.

The request execution unit 13 selects a band to store the data based on the effective period and the data characteristic of each band.

FIG. 26 is a flowchart illustrating an example of the processing of selecting a band at the storing destination based on the determination on whether there is a possibility that the data is deleted in the near future (Step S2501 of FIG. 25).

In Step S2601, the request execution unit 13 determines whether there is a possibility that the data is deleted in the near future based on the effective period of the data.

In a case where there is no possibility that the data is deleted in the near future, the processing ends.

In a case where there is a possibility that the data is deleted in the near future, the request execution unit 13 selects a band where a future deletion is set in the data characteristic of the data band table 18 as a storing destination of the data in Step S2602.

In this embodiment described above, the request execution unit 13 determines whether there is a possibility that the data of the effective period is deleted in the near future, for example, based on a remaining capacity of the void band and a writing amount in a predetermined period, and selects a band to which the data is stored. For example, the near future may be an expected timing when the void band disappears. For example, the void bands are 10000 bands, and the data of 50 bands are subjected to POST or PUT a day. In this case, the request execution unit 13 determines that there is a possibility that the data of the effective period of 200 days or less is deleted in the near future, determines that the data of the effective period of 200 days or more is not deleted in the near future, and divides the bands at the storing destination.

A band to store the data which is deletable when the effective period is expired is generated by dividing the bands at the storing destination according to the presence/absence of the possibility of deleting in the near future. The band to store the deletable data may be reused for storing new data.

FIG. 27 is a diagram illustrating an example of a state where the bands at the storing destination according to the effective period.

In this embodiment, the effective period of the data is managed as meta data. The bands are divided into for the data of which the effective period until the void band disappears is expired, and for the bands for storing the other data. In this embodiment, the data having a possibility to be deleted in the near future is collectively stored in the plurality of bands, and thus the plurality of bands become the void bands after the effective period is expired. Since the data can be rewritten to the void band, it is possible to suppress the writing time.

(Processing of Selecting Band at Storing Destination by Determining Whether there is Possibility that Data is Moved at Time of Expanding Shingled Magnetic Recording Device)

In a cold storage system, there are first and second constraints.

In the first constraint, there is a need to provide a configuration which can handle a scale out with respect to an increase in number of data (for example, an expansion of the shingled magnetic recording device, an expansion of the data node). Therefore, the cold storage system is provided with a configuration which determines the shingled magnetic recording device at the storing destination from the hash value of the data ID.

In the second constraint, there is a need to provide a configuration which can handle an expansion of the shingled magnetic recording device at the time when the void capacity becomes small without preparing a maximum capacity of the shingled magnetic recording device from the beginning from the viewpoint of costs.

The storage system 1 according to this embodiment satisfies the first and second constraints. In the storage system 1, a new shingled magnetic recording device is expanded after the recording capacity of the shingled magnetic recording device is full in maximum, and the data is moved from the existing shingled magnetic recording device to the expanded shingled magnetic recording device.

FIG. 28 is a flowchart illustrating an example of the processing of selecting a band at the storing destination by determining whether there is a possibility that the data is moved at the time of expanding the shingled magnetic recording device (Step S2502 of FIG. 25). In the processing of FIG. 28, the request execution unit 13 determines whether there is a possibility that the data is moved at the time of expanding the shingled magnetic recording device, and selects a band to store the data.

In Step S2801, the request execution unit 13 determines that there is a possibility that the data is moved at the time of expanding the next shingled magnetic recording device based on the hash value of the data ID.

In a case where there is no possibility of moving, the processing ends.

In a case where there is a possibility of moving, the request execution unit 13 selects a band in Step S2802 in which expansion/moving is set in the data characteristic of the data band table 18 as the storing destination of the data.

Figure 29:
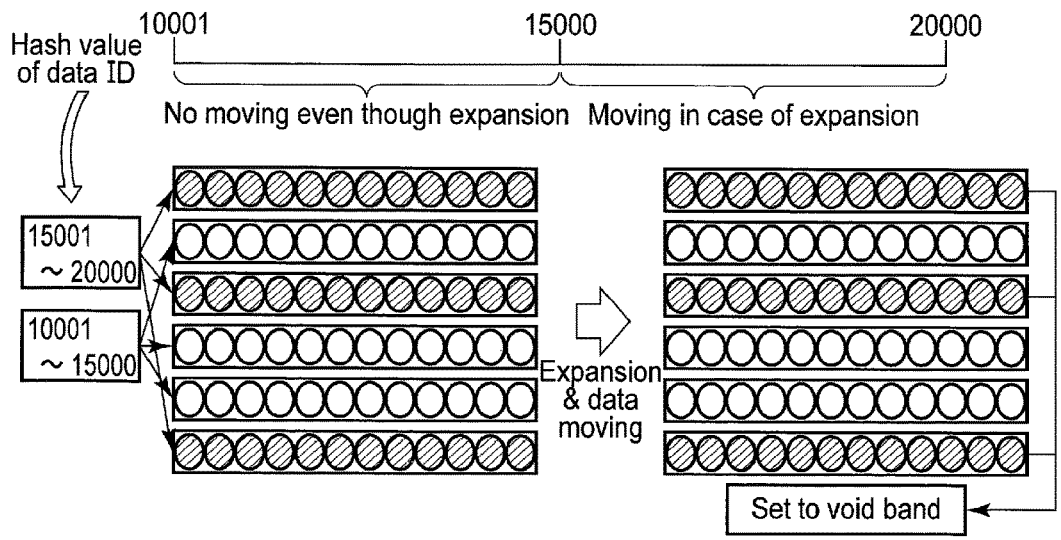
FIG. 29 is a diagram illustrating an example of a state where bands at a storing destination of data are divided according to a possibility of moving at a time of expending a shingled magnetic recording device.

FIG. 29 is a diagram illustrating an example of a state where the bands at the storing destination of the data are divided according to the possibility of moving at the time of expanding the shingled magnetic recording device.

Data stored in a shingled magnetic recording device is the one of which the hash value of the data ID is 10001 to 20000. In the shingled magnetic recording device, while the data of the hash values 10001 to 15000 is not moved even when the shingled magnetic recording device is expanded, the data of the hash values 15001 to 20000 is moved at the time of expanding the shingled magnetic recording device. Therefore, the request execution unit 13 determines whether the hash value of the data ID is 15001 to 20000, and selects a band according to the determination result.

In this embodiment, the shingled magnetic recording device is expanded, the data having the hash values 15001 to 20000 of the data ID is moved to the expanded shingled magnetic recording device, and the moved data is deleted from the original shingled magnetic recording device. Therefore, a number of bands are generated in which the void bands are collected in the original shingled magnetic recording device. In a case where the data is stored in these void bands, the data may be rewritten as it is, and thus the writing time can be suppressed.

(Processing of Selecting Band at Storing Destination by Determining Whether there is Possibility that Data is Deleted or Rewritten)

In the cold storage system, the data of the designated data ID is deleted or rewritten by executing DELETE or PUT. The data which has been deleted or rewritten in the past is more likely to deleted or rewritten again.

Therefore, in the storage system 1 according to this embodiment, information indicating whether the data has been deleted or rewritten is set in the update history of the hash value table 19.

The storage system 1 determines whether there is a possibility that the data is deleted or rewritten based on the update history of the hash value table 19, and selects a band to store the data.

Figure 30:
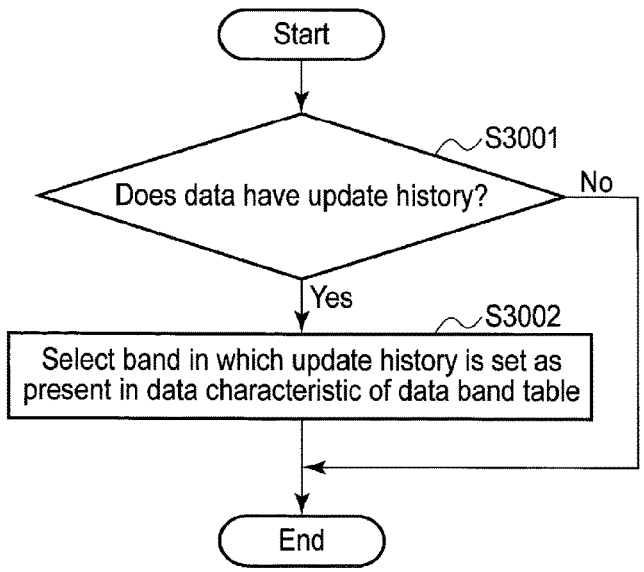
FIG. 30 is a flowchart illustrating an example of processing of selecting a band at a storing destination by determining whether there is a possibility that data is deleted or rewritten.

FIG. 30 is a flowchart illustrating an example of the processing of selecting a band at the storing destination by determining whether there is a possibility that the data is deleted or rewritten (Step S2503 of FIG. 25).

In Step S3001, the request execution unit 13 determines whether there is a possibility that the data is deleted or rewritten based on the update history in the hash value table 19.

In a case where there is no possibility that the data is deleted or rewritten, the processing ends.

In a case where there is a possibility that the data is deleted or rewritten, the request execution unit 13 selects a band where the update history is present in the data characteristic of the data band table 18 as the storing destination of the data in Step S2702.

Through this processing, the data which has been deleted or rewritten is collected in the same band.

Figure 31:
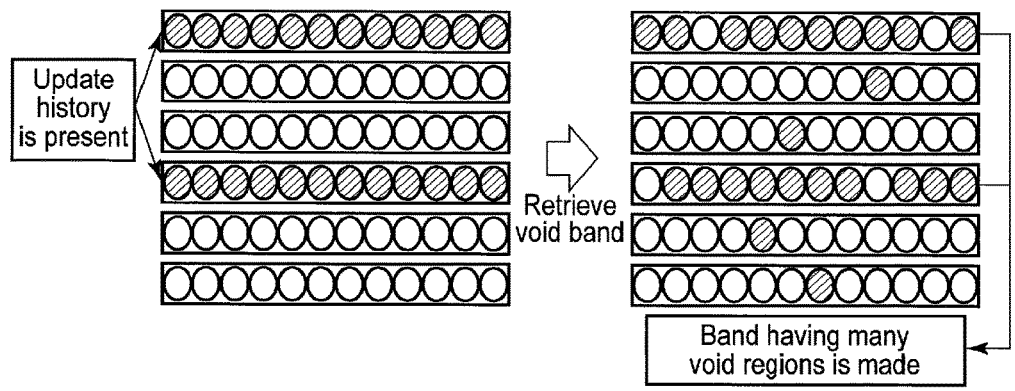
FIG. 31 is a diagram illustrating an example of a state where bands are divided into for data which has been deleted or rewritten in past and for other data.

FIG. 31 is a diagram illustrating an example of a state where the bands are divided into for the data which has been deleted or rewritten in the past and for the other data.

In the band where the data which has been deleted or rewritten are stored, there is a possibility that a number of data is deleted or rewritten at the time of retrieving the void band, and becomes invalid. Therefore, in the band where the data which has been deleted or rewritten is collected, the number of read-out data can be reduced at the time of filling the existing data. Accordingly, in the storage system 1, the writing time can be suppressed at the time of filling the existing data.

(Processing of Selecting Band at Storing Destination Based on Magnitude of Data Size)

In the cold storage system, the data of a small size is more likely to be handled as the data for management, and also likely to be deleted or updated.

Then, the storage system 1 according to this embodiment selects a band at the storing destination based on a magnitude of the data size. For example, the band at the storing destination is different according to whether the size of the data is equal to or less than a threshold, or exceeds the threshold.

Figure 32:
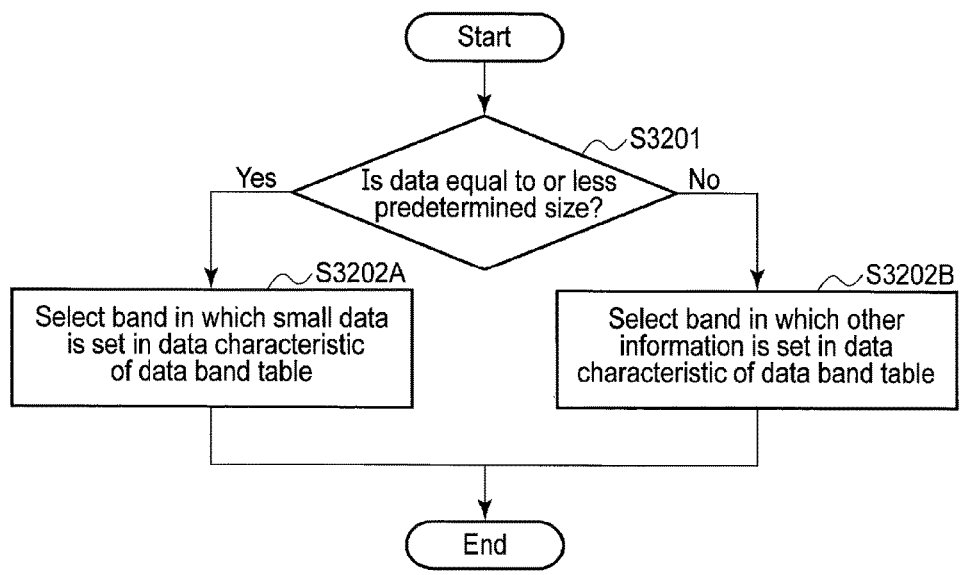
FIG. 32 is a flowchart illustrating an example of processing of selecting a band at a storing destination based on a magnitude of a data size.

FIG. 32 is a flowchart illustrating an example of the processing of selecting a band at the storing destination based on the magnitude of the data size (Step S2504 of FIG. 25).

In Step S3201, the request execution unit 13 determines whether the data is equal to or less than a predetermined size.

In a case where the data is equal to or less than the predetermined size, the request execution unit 13 selects a band where the data of a small size is set in the data characteristic of the data band table 18 as the storing destination of the data in Step S3202A.

In a case where the data is equal to or less than the predetermined size, the request execution unit 13 selects a band where the other information is set in the data characteristic of the data band table 18 as the storing destination of the data in Step S3202B.

Through this processing, the data of a small size is collected in the same band.

FIG. 33 is a diagram illustrating an example of a state where the bands are divided into for the data of a small size and for the other data.

In many cases, the data of a small size is the data for management, and thus the data is more likely rewritten or deleted. Therefore, in the band where the data of a small size is collected, a lot of data is deleted or rewritten at the time of retrieving the void band, and is more likely to be invalid. In this embodiment, in the band where the data of a small size is stored, the number of read-out data is reduced at the time of filling the existing data. Therefore, the writing time can be suppressed in the storage system 1 at the time of filling the existing data.

(Expansion of Shingled Magnetic Recording Device)

The description will be given about the processing executed in the expansion management unit 10 provided in the coordinator 2-1 and the expansion processing unit 14 provided in the controller 6-1.

The determination on whether the shingled magnetic recording device is expanded is executed by the controller 6-1. The determination on a hash value range of the data ID and the determination on a shingled magnetic recording device corresponding to the hash value range are executed by the coordinator 2-1.

FIG. 34 is a flowchart illustrating an example of processing of the expansion management unit 10. The expansion management unit 10 changes the hash value range table 11 at the stage of receiving the completion notification of the expansion processing from the controller 6-1 which is an issue origin of an expansion request.

In Step S3401, the expansion management unit 10 receives the expansion request from the controller 6-1.

In Step S3402, the expansion management unit 10 determines the recording device ID of the expanded shingled magnetic recording device.

In Step S3403, the expansion management unit 10 determines the hash value range of the divided data ID.

In Step S3404, the expansion management unit 10 notifies the controller 6-1 which issues the expansion request with the recording device ID of the expanded shingled magnetic recording device and the hash value range of the moving, and waits for a notification of a moving completion.

In Step S3405, the expansion management unit 10 changes the hash value range table 11.

In Step S3406, the expansion management unit 10 notifies the change of the hash value range table 11 to the other coordinator 2-2.

FIG. 35 is a data structural diagram illustrating an example of the hash value range table 11 after the expansion.

The hash value range of 10001 to 20000 before the expansion is divided into a hash value range of 10001 to 15000 and a hash value range of 15001 to 20000 by the expansion. The expanded shingled magnetic recording devices 8-1-9, 8-2-9, and 8-3-9 are assigned to the hash value range of 15001 to 20000. More specifically, the hash value range of 10001 to 20000 is taken charge by the shingled magnetic recording devices 8-4-1, 8-5-1, and 8-6-1 before the expansion. When the shingled magnetic recording devices 8-4-1, 8-5-1, and 8-6-1 are expanded, the hash value range of 10001 to 15000 is taken charge by the shingled magnetic recording devices 8-4-1, 8-5-1, and 8-6-1, and the hash value range of 15001 to 20000 is taken charge by the shingled magnetic recording devices 8-1-9, 8-2-9, and 8-3-9. The hash value range table 11 after the expansion is notified to all of the coordinators. Therefore, the coordinators 2-1 and 2-2 are enabled to access the expanded shingled magnetic recording devices 8-1-9, 8-2-9, and 8-3-9.

FIG. 36 is a flowchart illustrating an example of processing of the expansion processing unit 14.

In Step S3601, the expansion processing unit 14 counts the number of bands of which the storage capacity is equal to or less than a first predetermined value with respect to the data band table 18.

In Step S3602, the expansion processing unit 14 determines whether the calculated number of bands is equal to or more than a second predetermined value.

In a case where the number of bands is equal to or more than the second predetermined value, the processing ends.

In a case where the number of bands is less than the second predetermined value, the expansion processing unit 14 transmits the expansion request of the shingled magnetic recording device to the coordinator 2-1 in Step S3603.

In Step S3604, the expansion processing unit 14 receives the recording device ID of the expanded shingled magnetic recording device and the hash value range of the data ID of the moving from the coordinator 2-1.

In Step S3605, the expansion processing unit 14 transmits the recording device ID of the expanded shingled magnetic recording device and the hash value range of the data ID of the moving to the controller in charge of (corresponding to) the expanded shingled magnetic recording device.

In Step S3606, the expansion processing unit 14 transmits the data in the hash value range of the data ID of the moving to the controller in charge of the expanded shingled magnetic recording device.

In Step S3707, the expansion processing unit 14 transmits the expanded completion notification to the coordinator 2-1, and deletes the information of all the data from the data band table 18 and the hash value table 19. Then, the processing ends.

FIG. 37 is a flowchart illustrating an example of the processing of transmitting the data in the hash value range of the data ID of the moving to the controller in charge of the expanded shingled magnetic recording device (Step S3606 of FIG. 36).

In Step S3701, the expansion processing unit 14 sequentially reads out the data ID of the hash value table 19.

In Step S3702, the expansion processing unit 14 determines whether the read-out hash value of the data ID is in the hash value range of the data ID of the moving.

In a case where the hash value of the data ID is not in the hash value range of the data ID of the moving, the processing proceeds to Step S3705.

In a case where the hash value of the data ID is in the hash value range of the data ID of the moving, the expansion processing unit 14 reads out the data at an address corresponding to the data ID of the hash value table 19 from the band in Step S3703.

In Step S3704, the expansion processing unit 14 transmits the read-out data, the data ID, the update history, and the effective period of the hash value table 19 to the controller in charge of the expanded shingled magnetic recording device.

In Step S3705, the expansion processing unit 14 determines whether all the data IDs of the hash value table 19 are processed.

In a case where all the data IDs of the hash value table 19 are not processed, the processing returns to Step S3701.

In a case where all the data IDs of the hash value table 19 are processed, the expansion processing unit 14 transmits an end notification to the controller in charge of the expanded shingled magnetic recording device, and the processing ends.

Figure 38:
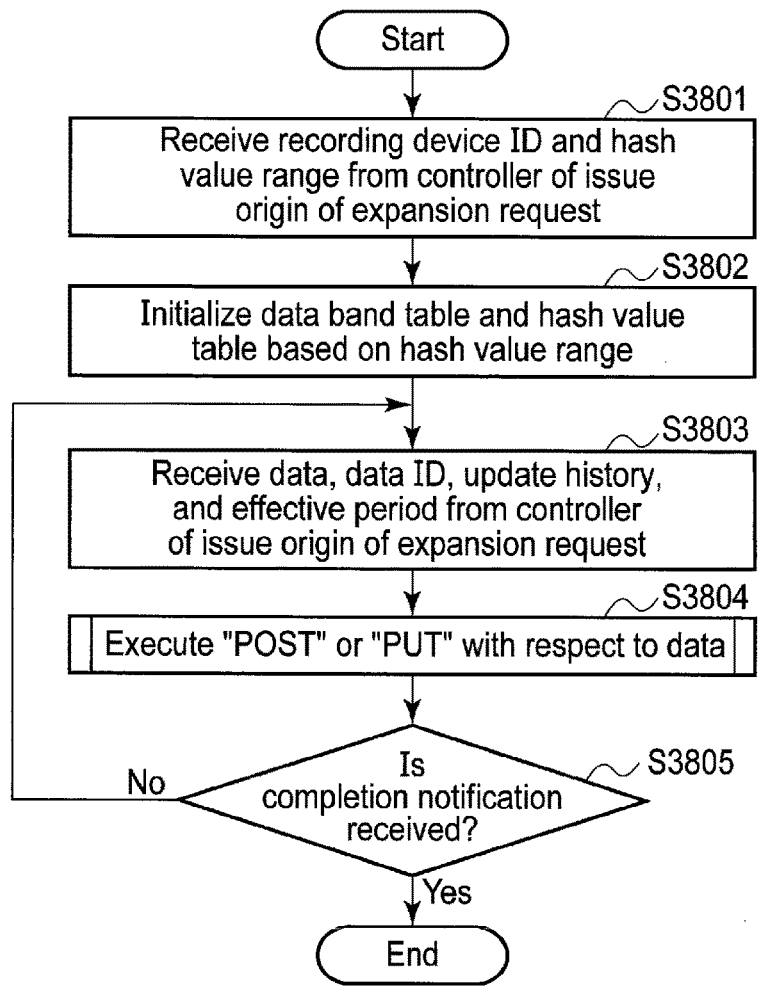
FIG. 38 is a flowchart illustrating an example of processing of the controller in charge of the expanded shingled magnetic recording device.

FIG. 38 is a flowchart illustrating an example of processing of the controller in charge of the expanded shingled magnetic recording device.

In Step S3801, the expansion processing unit 14 receives the recording device ID of the expanded shingled magnetic recording device and the hash value range of the data ID of the moving from the controller of the issue origin of the expansion request (for example, the controller in charge of the shingled magnetic recording device of which the storage capacity is full in maximum).

In Step S3802, the expansion processing unit 14 initializes the data band table 18 and the hash value table 19 based on the hash value range of the data ID of the moving.

In Step S3803, the expansion processing unit 14 receives the data, the data ID, the update history, and the effective period from the controller of the issue origin of the expansion request.

In Step S3804, the expansion processing unit 14 assumes the data received from the controller of the issue origin of the expansion request as the data newly stored, and executes POST or PUT.

In Step S3805, the expansion processing unit 14 determines whether the end notification is received from the controller of the issue origin of the expansion request.

In a case where the end notification is received, the processing returns to Step S3803.

In a case where the end notification is received, the processing ends.

As described above, upon moving the data at the time of expanding the shingled magnetic recording device, the controller of the issue origin of the expansion request transmits information necessary for the controller in charge of the expanded shingled magnetic recording device to select a band (specifically, information used in determination on the possibility of deleting in the near future, determination on the possibility of moving at the time of expanding the shingled magnetic recording device, determination on the possibility of deleting or rewriting for the update history, and determination on a magnitude of the data size) to the controller in charge of the expanded shingled magnetic recording device together with the data.

The controller in charge of the expanded shingled magnetic recording device selects a band to store the data based on the information received from the controller of the issue origin of the expansion request, and stores the data in the selected band.

Therefore, in this embodiment, the data to be deleted, moved, and rewritten in the near future can be collected from among the data moved to the expanded shingled magnetic recording device, and be stored in the selected band in the expanded shingled magnetic recording device. In the expanded shingled magnetic recording device, the selected band is used to some extent, and can newly perform the writing as a void band. Therefore, the writing time can be suppressed.

(Effectiveness of this Embodiment)

Effectiveness of the storage system 1 according to this embodiment will be described in contradistinction to a shingled magnetic recording device of a comparative example.

Figure 39:
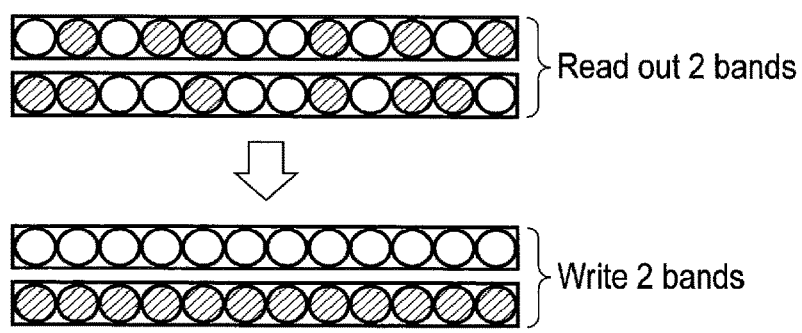
FIG. 39 is a diagram illustrating an example of a storage state of a band of a shingled magnetic recording device of a comparative example.

FIG. 39 is a diagram illustrating an example of a storage state of a band of the shingled magnetic recording device of the comparative example.

FIG. 40 is a graph illustrating an example of a change in a writing period before and after one cycle of writing in the shingled magnetic recording device of the comparative example.

In the shingled magnetic recording device of the comparative example, there is a need to perform the writing in unit of a band. Therefore, when the writing is performed in one band, for example, even when a small amount (512 bytes) of data is written, and even when the amount of data corresponding to 1 byte of storage capacity (about 200 Megabytes) is written, there is required the same time. In a case where the similar writing to the normal HDD is applied to the shingled magnetic recording device of the comparative example, the void band disappears after one cycle of writing of the data to the shingled magnetic recording device of the comparative example. Thereafter, when there occurs adding, updating, deleting, or moving of the data to be written to the shingled magnetic recording device of the comparative example, the rewrite positions of the data is dispersed in a spotted state. In a case where the data as much as one band is stored in the bands as the dispersed rewrite positions, there is required to perform reading of two bands and writing of two bands. Therefore, the shingled magnetic recording device of the comparative example requires four times the time in writing (reading of two bands, writing of two bands) compared to the normal HDD. In the normal HDD, even when the rewriting place is increased in number, the rewriting is performed at random, so that the rewriting is performed only by a slightly increased time. On the contrary, in the shingled magnetic recording device of the comparative example, it takes time for performing the updating in unit of a band, and the number of updating bands is also increased. Therefore, a time taken for the updating is increased.

On the contrary, in the storage system 1 according to this embodiment, the number of times of reading in unit of a band in the shingled magnetic recording device, and the number of times of writing can be suppressed by dividing the bands to store the data according to the data characteristic. Further, power consumption can be suppressed.

In the storage system 1 according to this embodiment, it is possible to store a large amount of data at a low cost by using the shingled magnetic recording device.

Third Embodiment

In this embodiment, a modification of the storage system 1 according to the second embodiment will be described. In this embodiment, the description will be mainly given about the portions different from those in the second embodiment.

In the second embodiment, the selection of a band based on the determination on whether there is a possibility of moving at the time of expanding the shingled magnetic recording device is used in expanding once. Therefore, in a situation where the expansion is repeated, the void bands may become less at the data node of the issue origin of the expansion request.

With this regard, the description in this embodiment will be given about the storage system 1 which is possible to repeatedly issue the expansion request plural times.

In this embodiment, the next expansion of the shingled magnetic recording device and also the expansion of the shingled magnetic recording device at the time after next are taken into consideration to select a band at the storing destination of the data.

FIG. 41 is a flowchart illustrating an example of processing of selecting a band at the storing destination by determining whether there is a possibility of moving at the time of expanding the shingled magnetic recording device according to this embodiment.

In Step S4101, the request execution unit 13 determines the possibility of data moving at the time of next expansion and at the time after next expansion of the shingled magnetic recording device based on the hash value of the data ID.

In a case where there is no possibility of moving, the processing ends.

In a case where there is a possibility of moving at the time of expanding the shingled magnetic recording device at the next time, the request execution unit 13 selects a band in which the expansion/moving at the next time is set in the data characteristic of the data band table 18 as the storing destination of the data in Step S4102A.

In a case where there is a possibility of moving at the time of after next expansion of the shingled magnetic recording device, the request execution unit 13 selects a band in which the expansion/moving at the time after next expansion is set in the data characteristic of the data band table 18 as the storing destination of the data in Step S4102B.

Figure 42:
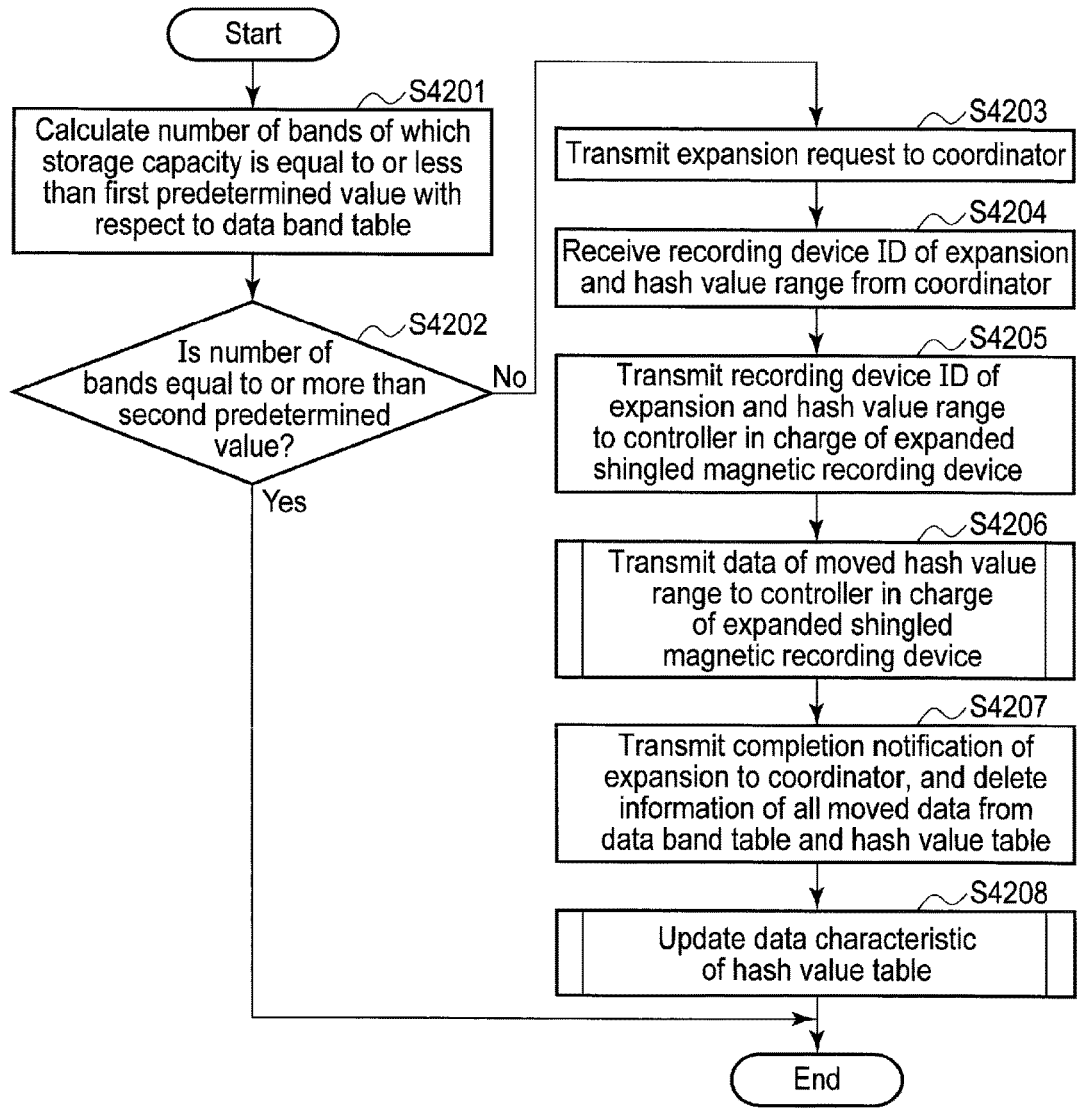
FIG. 42 is a flowchart illustrating an example of processing of an expansion processing unit.

FIG. 42 is a flowchart illustrating an example of processing of the expansion processing unit 14 according to this embodiment. Steps S4201 to S4207 of FIG. 42 are similar to Steps S3601 to S3607 of FIG. 36. The processing of FIG. 42 includes Step S4208 in which the processing of changing the data characteristic of the hash value table 19 is performed.

FIG. 43 is a flowchart illustrating an example of the processing of changing the data characteristic of the hash value table 19 (Step S4208 of FIG. 42).

In Step S4301, the expansion processing unit 14 of the issue origin of the expansion request sequentially reads out the data characteristic of the data band table 18.

In Step S4302, the expansion processing unit 14 determines the data characteristic.

In a case where the expansion/moving at the next time is set in the data characteristic, the expansion processing unit 14 initializes the data characteristic in Step S4303A (deleting of the information).

In a case where the expansion/moving at the time after next expansion is set in the data characteristic, the expansion processing unit 14 sets the expansion/moving at the next time in the data characteristic in Step S4303B.

In a case where other information such as the update history and a small size of data is set in the data characteristic, the expansion processing unit 14 sets reclassification in the data characteristic in Step S4303C.

In Step S4304, the expansion processing unit 14 determines whether the data characteristics of all the entries of the data band table 18 are set.

In a case where all the entries are not processed, the processing returns to Step S4301.

In a case where all the entries are processed, the processing ends.

As a result, in the data band table 18 of the issue origin of the expansion request, the expansion/moving of the data at the next time of the data characteristic is initialized after the expansion of the shingled magnetic recording device, the expansion/moving at the time after next expansion of the data characteristic is changed to the expansion/moving at the next time, and the other data characteristics are changed in to reclassification.

FIG. 44 is a flowchart illustrating an example of a relation between the processing of executing all the cached requests with respect to the selected shingled magnetic recording device (the processing of FIG. 15), and processing of rewriting the data associated to the reclassification.

In FIG. 44, after all the requests in Steps S1501 to S1504 are executed, the request execution unit 13 executes the rewriting of the data associated to the reclassification in Step S4401.

FIG. 45 is a flowchart illustrating an example of the processing of rewriting the data associated to the reclassification (Step S4401 of FIG. 44).

In Step 4501, the request execution unit. 13 sequentially reads out the data characteristic from the data band table 18. For example, the request execution unit 13 may read out the data characteristic following the data characteristic read out in the previous reclassification processing.

In Step S4502, the request execution unit 13 determines whether the data characteristic is reclassified.

In a case where the data characteristic is not reclassified, the processing proceeds to Step S4504.

In a case where the data characteristic is reclassified, the request execution unit 13 performs the processing of reclassifying all the data of the data ID associated to the reclassification in Step S4503.

In Step S4504, the request execution unit 13 determines whether a predetermined number of entries are processed.

In a case where the predetermined number of entries are not processed, the processing returns to Step S4501.

In a case where the predetermined number of entries are processed, the processing ends.

FIG. 46 is a flowchart illustrating an example of the processing of reclassifying all the data of the data ID associated to the reclassification (Step S4503 of FIG. 45).

In Step S4601, the request execution unit 13 reads out the data ID associated to the reclassification in the data band table 18, and sequentially reads out the data corresponding to the read-out data ID.

In Step S4602, the request execution unit 13 sets the size of the hash value table 19 corresponding to the read-out data ID to zero.

In Step S4603, the request execution unit 13 executes POST or PUT using the data ID, the update history, and the effective period of the hash value table 19 corresponding to the read-out data.

In Step S4604, the request execution unit 13 determines whether all the data of the data ID associated to the reclassification is processed.

In a case where all the data of the data ID associated to the reclassification is not processed, the processing returns to Step S4601.

In a case where all the data of the data ID associated to the reclassification is processed, the processing ends.

As described above, in a case where the shingled magnetic recording device is expanded in this embodiment, the data stored in a shingled magnetic recording device can be moved plural times.

FIG. 47 is a diagram illustrating an example of a relation among the data to be moved at the time of next expansion, the data to be moved at the time after next expansion, and the data to be reclassified in the data characteristic.

In the example of FIG. 47, the data of the hash values 15001 to 20000 of the data ID is moved at the next time, the data of the hash values 12501 to 15000 of the data ID is moved at the time after next expansion, so that the bands are respectively stored.

In a case where the data is moved to the expanded shingled magnetic recording device, the data of the hash values 12501 to 15000 of the data ID is moved at the next time, and the data of the hash values 10001 to 12500 of the data ID is reclassified, so that the data characteristic is changed.

In a case where the cached request is processed, the data stored in the reclassified bands is reclassified little by little (by a predetermined number of pieces). Through this reclassification, the data stored in the reclassified bands is divided into the moving at the time after next expansion and the other information, and stored in the separate bands. Therefore, the void band can be generated even when the shingled magnetic recording device is repeatedly expanded and the data is repeatedly moved.

Further, in this embodiment, reading and writing of the reclassified bands are necessary to perform the reclassification. However, the number of reclassified bands is about a quarter (¼) of the total number, so that the writing time is increased about twice more than the normal HDD. In the shingled magnetic recording device of the comparative example, there is required four times the reading and writing time compared to the normal HDD. Therefore, in the storage system 1 according to this embodiment, the writing time can be shortened compared to the shingled magnetic recording device of the comparative example.

Fourth Embodiment

In this embodiment, a modification of the second and third embodiments will be described.

For example, in the second embodiment, the same data may be stored in three shingled magnetic recording devices in order to store backup data. In this case, the overhead of the capacity is increased. Thus, in this embodiment, the data correction processing can be performed in the coordinator 2-1 by erasure coding, and the data fragment and the redundant information are stored in the shingled magnetic recording device.

Figures 48, 49:
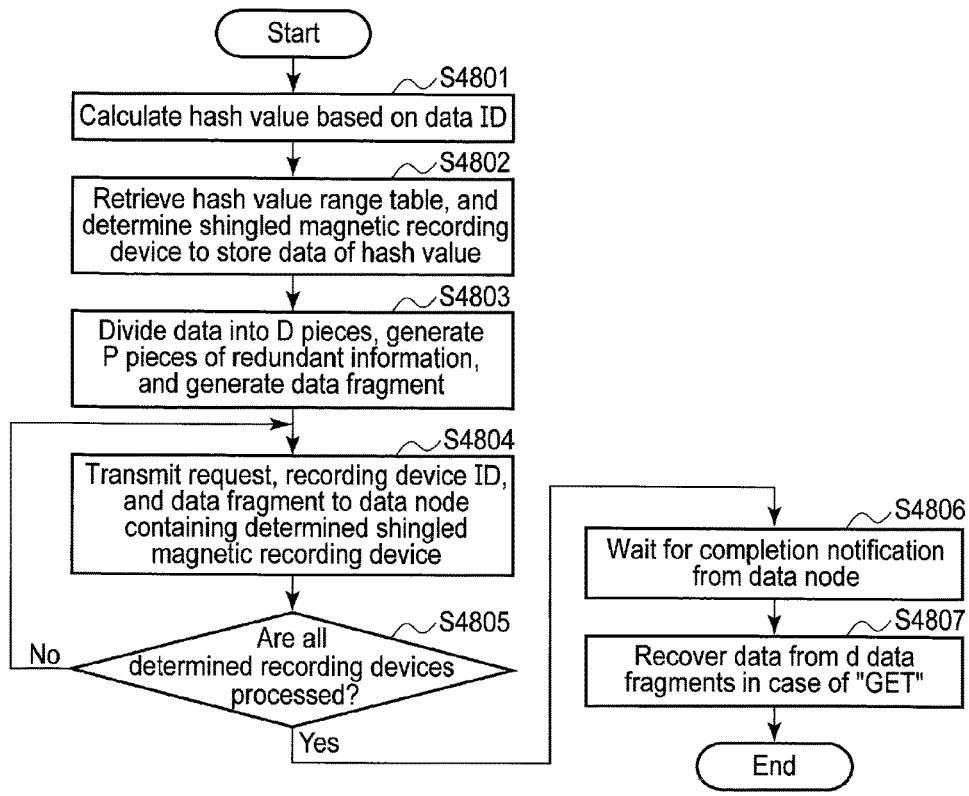
FIG. 48 is a flowchart illustrating an example of processing of determining a data node and issuing a request in a case where erasure coding is applied.
FIG. 49 is a data structural diagram illustrating an example of a hash value range table in a case where D=4 and P=2.

FIG. 48 is a flowchart illustrating an example of processing of determining the data node and issuing a request in a case where the erasure coding is applied. In FIG. 48, the data node is determined based on the data ID.

In Step S4801, the request processing unit 9 of the coordinator 2-1 calculates the hash value based on the data ID. For example, the hash value is set in a range of 1 to 1000000.

In Step S4802, the request processing unit 9 retrieves the hash value range table 11 based on the calculated hash value, and determines (D+P) shingled magnetic recording devices which store the data corresponding to the calculated hash value. Herein, D and P are integers.

In Step S4803, the request processing unit 9 divides the data into D pieces, and divides the redundant information into P pieces so as to generate D data fragments and P pieces of redundant information.

In Step S4804, the request processing unit 9 transmits the request, the recording device ID of the determined shingled magnetic recording device, and the data fragment or the redundant information to the data node which contains one of the determined shingled magnetic recording devices.

In Step S4805, the request processing unit 9 determines whether the request is transmitted to all the determined shingled magnetic recording devices.

In a case where the request is not transmitted to all the determined shingled magnetic recording devices, the request processing unit 9 repeats Step S4804.

In a case where the request is transmitted to all the determined shingled magnetic recording devices, the request processing unit 9 waits for the completion notification from the data node which has transmitted the request in Step S4806. Herein, in a case where the request is POST, PUT, or DELETE, the request processing unit 9 waits for the completion notifications from all the data nodes to which the request is transmitted. In a case where the request is GET, the request processing unit 9 waits for the completion notifications from (D+P) data nodes among the data nodes to which the request is transmitted.

In Step S4807, in a case where the request is GET, the request processing unit 9 recovers the original data from the D data fragments and the P pieces of redundant information.

The flowchart of FIG. 48 is different from that of FIG. 7 of the second embodiment in that processing of generating the D data fragments and the P pieces of redundant information from the data and processing of recovering the original data from the D data fragments and the P pieces of redundant information are included, and other portions are substantially equal.

FIG. 49 is a data structural diagram illustrating an example of the hash value range table 11 in a case where D=4 and P=2. Further, D may be any integer of 2 or more, and P may be any integer of 1 or more.

In the storage system 1 according to this embodiment, the (D+P) shingled magnetic recording devices are registered in each hash range of the hash value range table 11.

FIG. 50 is a block diagram illustrating an example of processing of generating four data fragments and two pieces of redundant information.

First, the data d is divided into the D (four) data fragments d1 to d4.

Second, pad data dp is added to the data fragment d4 in order to make the size of the divided four pieces of the data d1 to d4 equal in size.

Third, two pieces p and q of redundant information are generated with respect to the four divided pieces d1 to d4 of the data.

FIG. 51 is a block diagram illustrating an example of processing of recovering the original data d from the four data fragments d1 to d4 and the redundant information p.

First, in a case where an error occurs in the data fragment d3 among the data fragments d1 to d4, and the data fragment d3 is missed, the lacked data fragment d3 is recovered based on the redundant information p.

Second, the pad data dp is deleted from the data fragment d4.

Third, the four data fragments d1 to d4 are linked, and the data d is recovered.

In this embodiment described above, the data fragments d1 to d4 and the redundant information p and q are generated based on the data d, and stored in the data node. Therefore, there is no need to store the same data in plural places, and the capacity efficiency of the storage system 1 can be improved.

Fifth Embodiment

In this embodiment, a modification of the second to fourth embodiments will be described.

In the second embodiment, the shingled magnetic recording device to which the data is stored is determined according to the hash value calculated from the data ID. In this case, there may be stored a plural pieces of data having the same value of data but different data ID.

With this regard, in this embodiment, the data having the same value is stored in the same shingled magnetic recording device, so that the capacity efficiency is improved.

FIG. 52 is a flowchart illustrating an example of processing of the request processing unit 9 of the coordinator 2-1 according to this embodiment.

In Step S5201, the request processing unit 9 receives the request, the data ID, and the data from the client 4.

In Step S5202, the request processing unit 9 determines the data node in charge which corresponds to the data hash value (the hash value of the data), and transmits the request, the data ID, and the data to the determined data node.

In Step S5203, the request processing unit 9 returns the result to the client 4.

The flowchart of FIG. 52 is different from that of FIG. 6 of the second embodiment in the processing in which the data node corresponding to the data hash value is determined and the request is transmitted to the determined data node, and other portions are substantially equal.

FIG. 53 is a data structural diagram illustrating an example of a data ID table according to this embodiment.

A data ID table 20 stores the data ID, a data hash value list which contains data hash values of the data fragments obtained by dividing the data corresponding to the data ID, and the update history with respect to the data ID in association with each other.

In this embodiment, the data hash value list is used in the storing of the data and the reading-out of the data.

FIG. 54 is a flowchart illustrating an example of processing of transmitting the request to the data node corresponding to the data hash value.

In Step S5401, the request processing unit 9 determines a type of the request.

In a case where the request is DELETE, the processing proceeds to Step S5402.

In a case where the request is GET, the processing proceeds to Step S5403.

In a case where the request is POST or PUT, the processing proceeds to Step S5406.

In Step S5402, the request processing unit 9 sets the update history corresponding to the data ID as "Present" with respect to the data ID table 20. Thereafter, the processing proceeds to Step S5403.

In Step S5403, the request processing unit 9 retrieves the data hash value list corresponding to the data ID with respect to the data ID table 20.

In Step S5404, the request processing unit 9 determines whether there is a data hash value list corresponding to the data ID.

In a case where there is the data hash value list, the processing is shifted to Step S5408.

In a case where there is no data hash value list, the request processing unit 9 generates a result indicating "No request data" in Step S5409. Then, the processing ends.

In a case where it is determined in Step S5401 that the request is POST or PUT, Step S5406 is performed. In Step S5406, the request processing unit 9 retrieves the data ID table 20, and deletes old data if there is old data.

In Step S5407, the request processing unit 9 calculates the data hash value from the data, and stores the data hash value list in the data ID table 20.

In Step S5404, in a case where there is the data hash value list, or in Step S5408 after Step S5407, the request processing unit 9 transmits the request to the data node which is determined by the data hash value contained in the data hash value list.

In Step S5409, the request processing unit 9 receives the completion notifications from all the determined data nodes, and then generates a result with respect to the client 4. Then, the processing ends.

FIG. 55 is a flowchart illustrating an example of the processing of generating and storing the data hash value list (Step S5407 of FIG. 54).

In Step S5501, the request processing unit 9 divides the data by a size suitable to redundancy exclusion.

In Step S5502, the request processing unit 9 calculates the data hash value for each divided data fragment.

In Step S5503, the request processing unit 9 generates the data hash value list based on the calculated data hash value.

In Step S5504, the request processing unit 9 stores the generated data hash value list and the data ID in association with each other with respect to the data ID table.

FIG. 56 is a flowchart illustrating an example of the processing of dividing the data by a size suitable to the redundancy exclusion (Step S5501 of FIG. 55).

In Step S5601, the request processing unit 9 sets the head of the data as a division candidate point.

In Step S5602, the request processing unit 9 calculates an m-byte hash value from the division candidate point.

In Step S5603, the request processing unit 9 determines whether the lower b bits of the hash value are matched with a regular value h.

In a case where the lower b bits are not matched with the regular value h, the processing proceeds to Step S5606.

In a case where the lower b bits are matched with the regular value h, the request processing unit 9 determines in Step S5604 whether the data fragment is equal to or more than a predetermined size (for example, 1 kilo byte).

In a case where the data fragment is not equal to or more than a predetermined size, the processing proceeds to Step S5606.

In a case where the data fragment is equal to or more than the predetermined size, in Step S5605, the request processing unit 9 divides the data at the division candidate point to generate the data fragment. Then, the processing proceeds to Step S5606.

In Step S5606, the request processing unit 9 moves the division candidate point by 1 byte after.

In Step S5607, the request processing unit 9 determines whether all the data is inspected.

In a case where all the data is not inspected, the processing returns to Step S5602.

In a case where all the data is inspected, the processing ends.

FIG. 57 is a diagram illustrating a specific example of division of the data.

FIG. 57 illustrates a division state of the data in a case where the flowchart of FIG. 56 is performed at m=3, b=12, and h=0. In this example, the data is divided at a start portion of "rst".

Even when the overlapping offset positions are deviated, and thus some data has a partially overlapped portion, the portion having zero in the lower 12 bits is contained in the overlapped portion by applying the dividing method of FIGS. 56 and 57, and then the dividing position becomes the same, so that a probability that the divided data fragments are matched to each other becomes increased. Therefore, it is possible to divide the data such that the overlapped portions are increased.

FIG. 58 is a block diagram illustrating an example of generating the data hash value list according to this embodiment.

First, the data d is divided by a size suitable to the redundant exclusion to generate the data fragments d1 to d7.

Second, the data hash values of the data fragments d1 to d7 are calculated to generate the data hash value list.

A data node which is used to manage the data fragments d1 to d7 using the data hash value list is determined, and the request is transmitted to the determined data node.

Figures 59, 60:
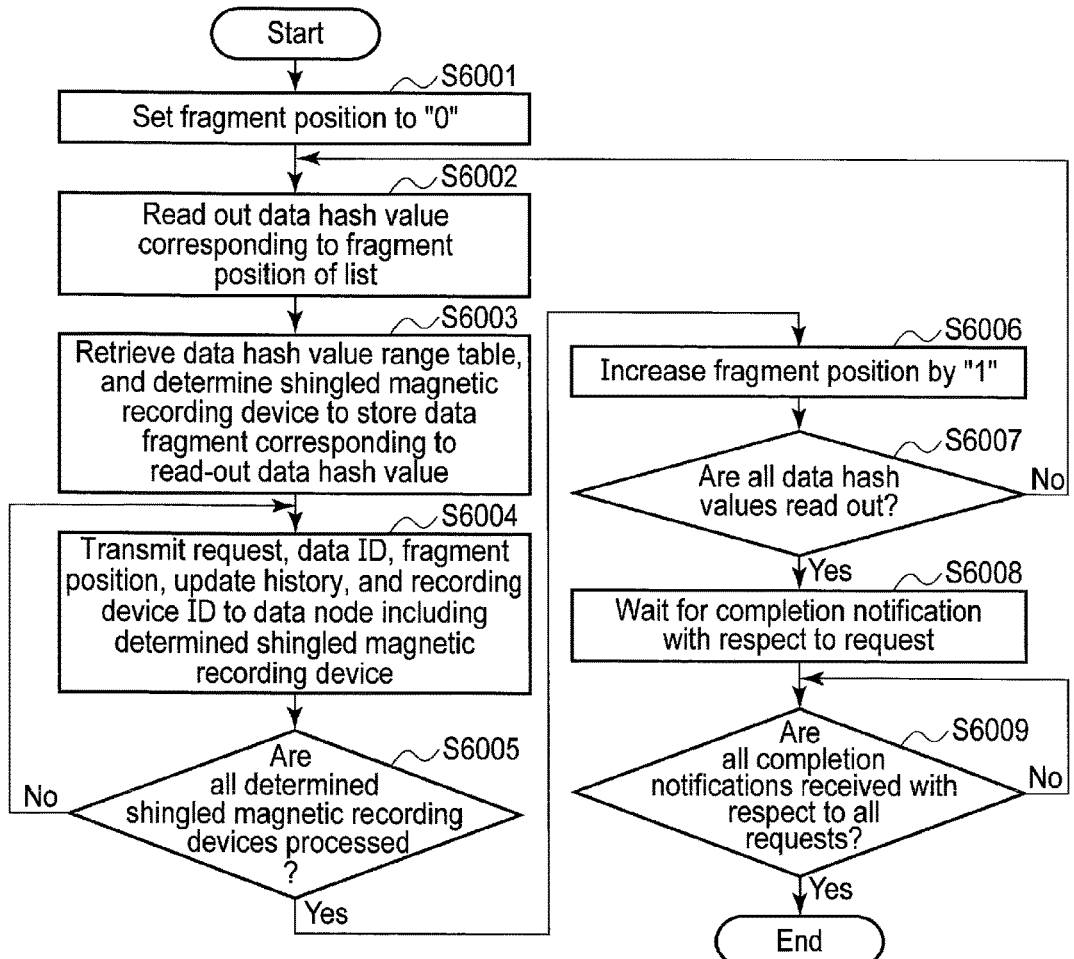
FIG. 59 is a data structural diagram illustrating an example of a data hash value range table.
FIG. 60 is a flowchart illustrating an example of processing of transmitting a request to a data node determined by a data hash value of the data hash value list.

FIG. 59 is a diagram illustrating an example of a data hash value range table according to this embodiment.

In this embodiment, a data hash value range table 21 is used to determine the data node in charge of the data fragment from the data hash value. The division of the data hash value range table 21 corresponds to the hash value range table 11 according to the second embodiment.

In the data hash value range table 21, a recording device ID is associated with the data hash value range.

The request processing unit 9 according to this embodiment transmits all the data fragments to the data node of the data hash value range based on the data hash value range table 21, and requests the processing. Then, the request processing unit 9 waits for the completion notification with respect to all the data fragments from the data node.

FIG. 60 is a flowchart illustrating an example of the processing of transmitting the request to the data node determined by the data hash value of the data hash value list (Step S5408 of FIG. 54).

In Step S6001, the request processing unit 9 sets zero to the fragment position indicating a position of the generated data fragment in the data.

In Step S6002, the request processing unit 9 reads out the data hash value corresponding to the fragment position in the data hash value list.

In Step S6003, the request processing unit 9 retrieves the data hash value range table 21, and determines the shingled magnetic recording device (or devices) in which the data fragment corresponding to the read-out data hash value is stored.

In Step S6004, the request processing unit 9 transmits the request, the data ID, the fragment position, the update history, and the recording device ID of the determined shingled magnetic recording device to the data node containing one of the plurality of determined shingled magnetic recording devices. In a case where the request is POST or PUT, the request processing unit 9 further transmits the corresponding data fragment and the size of the data fragment to the data node containing one of the plurality of determined shingled magnetic recording devices.

In Step S6005, the request processing unit 9 determines whether the request is transmitted to all the determined shingled magnetic recording devices.

In a case where the request is not transmitted to all the determined shingled magnetic recording devices, the request processing unit 9 repeats Step S6004.

In a case where the request is transmitted to all the determined shingled magnetic recording devices, the request processing unit 9 increases the fragment position by 1 in Step S6006.

In Step S6007, the request processing unit 9 determines whether all the data hash values contained in the data hash value list are read out.

In a case where all the data hash values contained in the data hash value list are not read out, the processing returns to Step S6002.

In a case where all the data hash values contained in the data hash value list are read out, the request processing unit 9 waits for the completion notification in Step S6008 with respect to the request from the data node to which the request is transmitted.

In Step S6009, the request processing unit 9 determines whether the completion notifications with respect to all the requests are received.

In a case where the completion notifications with respect to all the requests are not received, the processing of Step S6008 is repeatedly performed.

In a case where the completion notifications with respect to all the requests are received, the processing ends.

In this way, after receiving the completion notifications from all the data nodes containing the determined shingled magnetic recording devices, the request processing unit 9 generates a result with respect to the client 4.

FIG. 61 is a flowchart illustrating an example of the processing of generating a result with respect to the client 4 (Step S5409 of FIG. 54).

In Step S6101, the request processing unit 9 determines a type of the request.

In a case where the request is GET, the request processing unit 9 determines in Step S6102 whether all of GETs are successful.

In a case where all of GETs are successful, the request processing unit 9 recovers the origin data from the received data fragments and the fragment positions in Step S6103.

In Step S6104, a result including the recovered data and success information is generated.

In a case where the requests of all of GETs are not successful, the request processing unit 9 generates a result indicating an error in Step S6105.

In a case where it is determined in Step S6101 that the request is POST, PUT, or DELETE, the request processing unit 9 determines in Step S6106 whether the requests of all of POSTs, PUTs, or DELETEs are successful.

In a case where the requests of all of POSTs, PUTs, or DELETES are successful, the request processing unit 9 generates a result including the success information in Step S6107.

In a case where the requests of all of POSTs, PUTs, or DELETEs are not successful, the request processing unit 9 generates a result indicating an error in Step S6105.

In this embodiment, in a case where the data is rewritten by POST or PUT, the data node to store the old data fragment and the data node to store a new data fragment may be different. Therefore, in this embodiment, the coordinator 2-1 instructs the deleting of the old data fragment.

FIG. 62 is a flowchart illustrating an example of the processing of retrieving the data ID table and deleting the old data (Step S5406 of FIG. 54).

In Step S6201, the request processing unit 9 retrieves the data hash value list corresponding to the data ID based on the data ID table 20.

In Step S6202, in a case where there is no data hash value list corresponding to the data ID, the request processing unit 9 ends the processing.

In a case where there is the data hash value list corresponding to the data ID, the request processing unit 9 executes DELETE in Step S6203 in the data node which is determined based on the data hash value of the data hash value list.

In Step S6204, the request processing unit 9 sets "Present" to the update history corresponding to the data ID with respect to the data ID table 20, and initializes (clears) the data hash value list. Then, the processing ends.

In this embodiment, the request processing unit 9 manages the update history indicating whether the data is deleted or rewritten using the data ID table 20, and transmits the update history corresponding to the request to the data nodes 3-1 to 3-N in a case where the request is transmitted to the data nodes 3-1 to 3-N.

Next, the management in the data nodes 3-1 to 3-N will be described. The processing of the data nodes 3-1 to 3-N according to this embodiment is different from that of the second embodiment in the following first to sixth differences.

The first difference is that the information for identifying the data is changed from the data ID to the data ID and the fragment position, and the data is changed to the data fragment.

The second difference is that the redundant data is managed based on a data hash value table described below.

The third difference is that the writing to the band is not performed in a case where the same data is already stored in the data node when PUT is executed.

The fourth difference is that the data of the band is not deleted if the data is referred by other data when DELETE is executed.

The fifth difference is that the moving at the time of expansion of the shingled magnetic recording device is determined not by the data hash value of the data ID but by the data hash value obtained by hash-calculating the data fragment.

The sixth difference is that the data moving at the time of expansion of the shingled magnetic recording device is performed not by using the hash value of the data ID but by using the data hash value of the data fragment.

In this embodiment, the data structure of the cache recording devices 7-1 to 7-N and the processing of the cache processing unit 12 are changed based on the above differences.

FIG. 63 is a data structural diagram illustrating an example of the cache information which is stored in the cache recording device 7-1 according to this embodiment. In FIG. 63, cache information 22 is logically illustrated.

The cache information 22 of the cache recording device 7-1 associates the recording device ID with the request to the recording device ID. In a case where the request type is POST or PUT, the data ID, the fragment position, and the data fragment are attached to the request. In a case where the request type is GET or DELETE, the data ID and the fragment position are attached to the request.

Figures 64, 65:
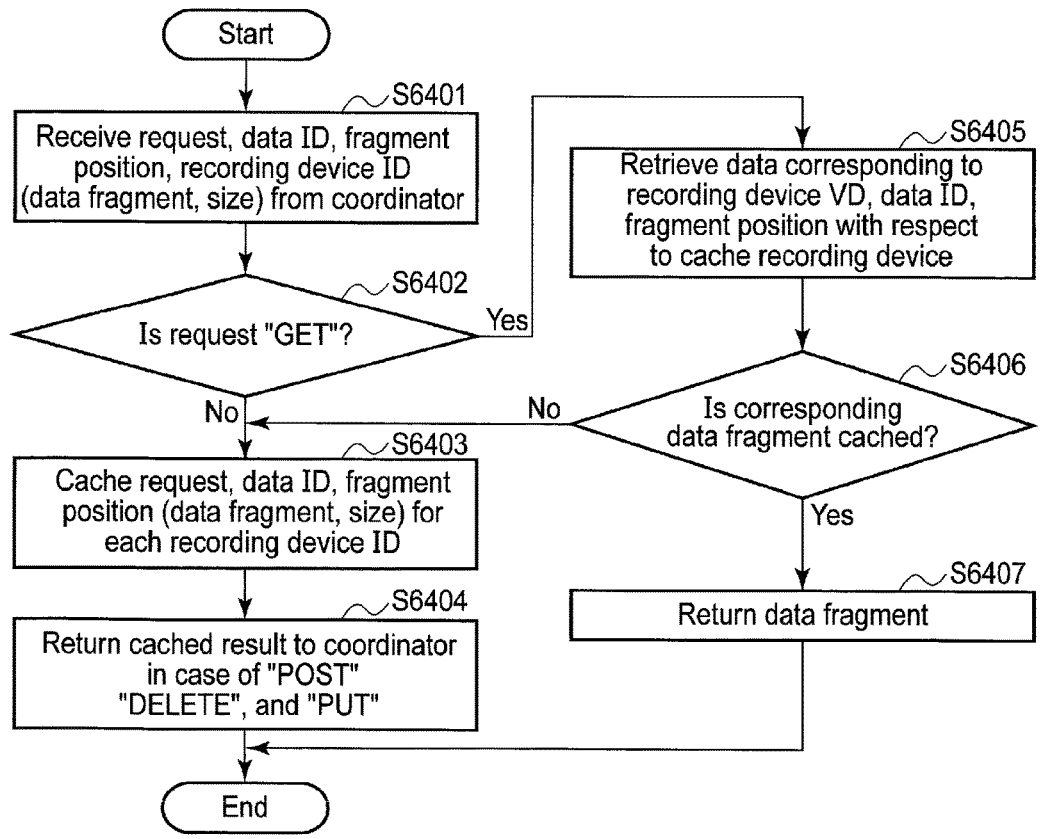
FIG. 64 is a flowchart illustrating an example of processing of a cache processing unit.
FIG. 65 is a data structural diagram illustrating an example of a data band table.

FIG. 64 is a flowchart illustrating an example of processing of the cache processing unit 12.

In Step S6401, the cache processing unit 12 receives the request, the data ID, the fragment position, and the recording device ID from the coordinator 2-1. In a case where the request is POST or PUT, the cache processing unit 12 receives the request, the data ID, the fragment position, the recording device ID, the data fragment, and the size of the data fragment from the coordinator 2-1.

In Step S6402, the cache processing unit 12 determines whether the request is GET.

In a case where the request is GET, the processing proceeds to Step S6405.

In a case where the request is not GET, the cache processing unit 12 caches the request, the data ID, and the fragment position for each recording device ID in the cache recording device 7-1 in Step S6403. In a case where the request is PUST or PUT, the cache processing unit 12 caches the request, the data ID, the fragment position, the data fragment, and the size to the cache recording device for each recording device ID.

In Step S6404, in a case where the request is POST, DELETE, or PUT, the cache processing unit 12 returns a result of the caching to the coordinator 2-1. Then, the processing ends.

In a case where the request is GET in Step S6402, in Step S6405, the cache processing unit 12 retrieves the data fragment corresponding to the request, the recording device ID, the data ID, and the fragment position which are received from the coordinator 2-1.

In Step S6406, the cache processing unit 12 determines whether the cache recording device 7-1 is cached with the data fragment corresponding to the request and the information received from the coordinator 2-1.

In a case where the corresponding data fragment is not cached, the processing proceeds to Step S6403.

In a case where the corresponding data fragment is cached, the cache processing unit 12 returns the data fragment to the coordinator 2-1, which is read out of the cache recording device 7-1 and relates to the request and the information received from the coordinator 2-1 in Step S6407. Then, the processing ends.

FIG. 65 is a data structural diagram illustrating an example of the data band table.

A data band table 23 stores the band ID, the storage capacity, the write head position, the data ID of the stored data fragment, the fragment position, and the data characteristic (for example, whether it is deleted in the future, and whether it can be expanded and moved) in association with each other.

FIG. 66 is a data structural diagram illustrating an example of the hash value table.

A hash value table 24 stores the hash value, the data ID, the fragment position, the update history, the address, the size, the effective period, and the data hash value in association with each other.

FIG. 67 is a data structural diagram illustrating an example of the data hash value table.

A data hash value table 25 stores the data hash value calculated based on the data fragment, the data ID, and the fragment position in association with each other. In the data hash value table 25, the data ID and the fragment position of the data fragment having the same data hash value are associated to the same data hash value, and stored in the same area.

FIG. 68 is a flowchart illustrating an example of processing of executing GET with respect to the shingled magnetic recording device.

In Step S6801, the request execution unit 13 calculates the hash value based on the data ID and the fragment position.

In Step S6802, the request execution unit 13 retrieves the hash value table 24 based on the hash value.

In Step S6803, the request execution unit 13 determines whether there is an area corresponding to the hash value in the hash value table 24 (there are the data ID and the fragment position corresponding to the hash value), and the size corresponding to the hash value is a positive value.

In a case where there are no data ID and no fragment position corresponding to the hash value, or in a case where the size corresponding to the hash value is not a positive value, the request execution unit 13 returns a result indicating that there is no target data fragment of GET to the coordinator 2-1 in Step S6804, and the processing ends.

In a case where there are the data ID and the fragment position corresponding to the hash value, and the size corresponding to the hash value is a positive value, the request execution unit 13 reads out the address and the size corresponding to the hash value from the hash value table 24 in Step S6805.

In Step S6806, the request execution unit 13 reads out the target data fragment of GET from the band based on the read-out address and the read-out size.

In Step S6807, the request execution unit 13 returns the read-out data fragment to the coordinator 2-1 as a result.

Figure 69:
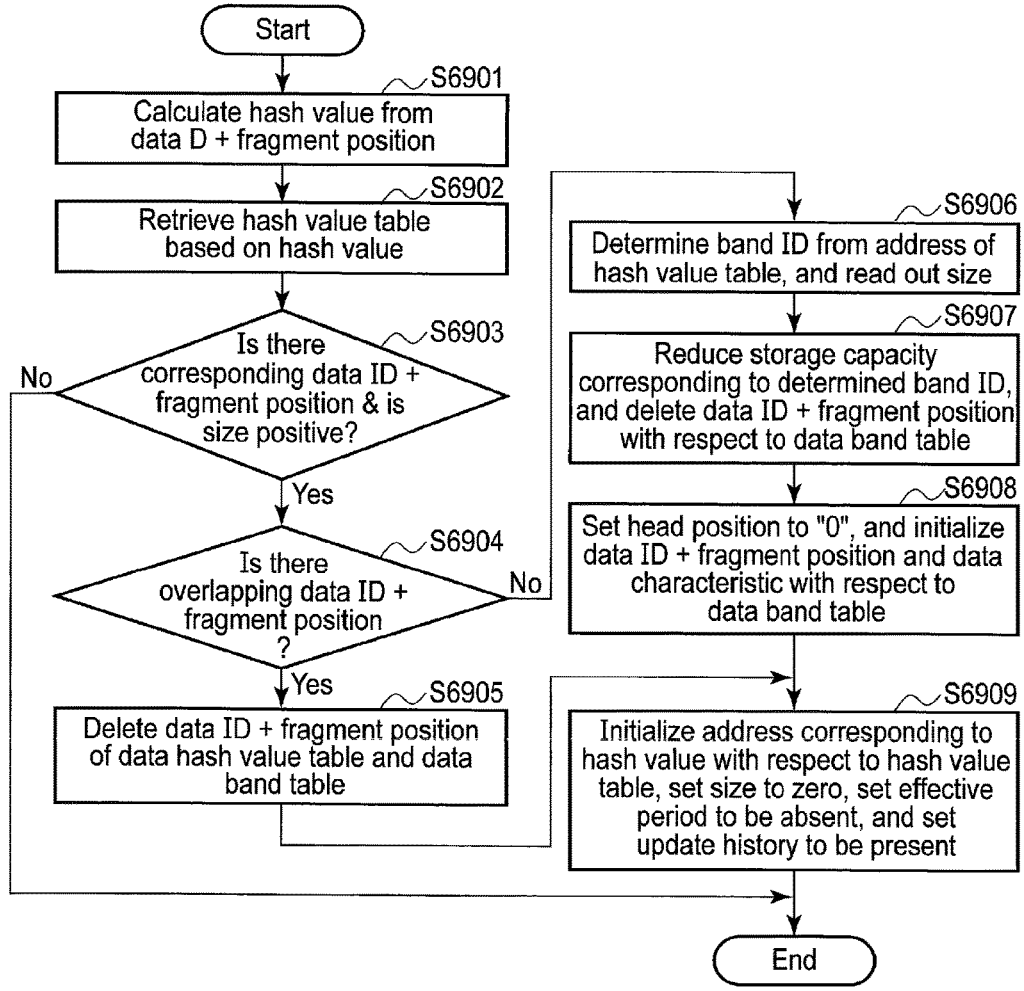
FIG. 69 is a flowchart illustrating an example of processing of executing DELETE with respect to the shingled magnetic recording device.

FIG. 69 is a flowchart illustrating an example of processing of executing DELETE with respect to the shingled magnetic recording device.

In Step S6901, the request execution unit 13 calculates the hash value based on the data ID and the fragment position.

In Step S6902, the request execution unit 13 retrieves the hash value table 24 based on the hash value.

In Step S6903, the request execution unit 13 determines whether there are the data ID and the fragment position corresponding to the hash value in the hash value table 24, and the size corresponding to the hash value is a positive value.

In a case where there are no data ID and no fragment position corresponding to the hash value, or the size corresponding to the hash value is a positive value, the processing ends.

In a case where there are the data ID and the fragment position corresponding to the hash value, and the size corresponding to the hash value is a positive value, the request execution unit 13 determines whether there are other overlapping data IDs and overlapping fragment positions based on the data hash value table 25 in Step S6904.

In a case where there is the redundant data, the request execution unit 13 deletes the data ID and the fragment position corresponding to the hash value from the data hash value table 25 and the data band table 23 in Step S6905. Thereafter, the processing proceeds to Step S6909.

In a case where there is no redundant data, the processing proceeds to Step S6906.

In Step S6906, the request execution unit 13 determines the band ID of a DELETE target from the address corresponding to the hash value of the hash value table 24, and reads out the size corresponding to the hash value.

In Step S6907, the request execution unit 13 reduces the storage capacity corresponding to the determined band ID as much as the size corresponding to the hash value with respect to the data band table 23. In addition, the request execution unit 13 deletes the data ID and the fragment position of the DELETE target corresponding to the determined band ID with respect to the data band table 23.

In Step S6908, in a case where the storage capacity corresponding to the band ID becomes zero with respect to the data band table 23, the request execution unit 13 sets the write head position corresponding to the determined band ID to zero, and initializes the data ID, the fragment position, and the data characteristic to be "Absent".

In Step S6909, the request execution unit 13 initializes the address corresponding to the hash value with respect to the hash value table 24, sets the size to zero, sets the effective period to be "Absent", and sets the update history to be "Present". Then, the processing ends.

FIG. 70 is a flowchart illustrating an example of processing of executing PUT or POST with respect to the shingled magnetic recording device.

In Step S7001, the request execution unit 13 calculates the data hash value based on the date fragment.

In Step S7002, the request execution unit 13 retrieves the data hash value table 25 based on the data hash value.

In Step S7003, the request execution unit 13 determines whether there are already the data ID and the fragment position of which the data hash values are overlapped.

In a case where there are the overlapping data ID and the overlapping fragment position, the request execution unit 13 reads out the address and the size corresponding to the overlapping data ID and the overlapping fragment position from the hash value table 24 in Step S7004. The request execution unit 13 stores the data ID and the fragment position of the PUT or POST target to the data hash value table 25 and the data band table 23. Thereafter, the processing proceeds to Step S7009.

In a case where there are no overlapping data ID and no overlapping fragment position, the request execution unit 13 generates the information of the data based on the data and the system state of the PUT or POST target in Step S7005.

In Step S7006, the request execution unit 13 selects a band in which the information of the data satisfies the data characteristic of the data band table 23 with reference to the data band table 23.

In Step S7007, the request execution unit 13 stores the data fragment from the write head position with respect to the selected band.

In Step S7008, the request execution unit 13 increases the storage capacity and the write head position with respect to the selected band ID as much as the size of the data fragment with respect to the data band table 23. The request execution unit 13 stores the data ID and the fragment position in association with the selected band ID with respect to the data band table 23. In a case where the void region disappears in the selected band with respect to the data band table 23, the request execution unit 13 sets the information "−1" indicating a state that there is no void region at the write head position corresponding to the selected band ID.

In Step S7009, the request execution unit 13 secures an entry in the hash value table 24, and stores the hash value, the data ID, the fragment position, the update history, the address, the size, the effective period, and the data hash value. Then, the processing ends.

FIG. 71 is a flowchart illustrating an example of existing data filling processing.

In Step S7101, the request execution unit 13 reads out the existing data of the band once based on the data ID and the fragment position stored in the band with reference to the data band table 23.

In Step S7102, the request execution unit 13 determines whether all the existing data is read out of the band.

In a case where all the existing data is not read out, the processing of Step S7101 is repeatedly performed.

In a case where all the existing data is read out, the request execution unit 13 stores the read-out data in the original band in a filled state in Step S7103.

In Step S7104, the request execution unit 13 updates the address of the data stored in the filled state in the band with respect to the hash value table 24.

In Step S7105, the request execution unit 13 determines whether all the read-out data is stored in the band.

In a case where all the read-out data is not stored in the band, the processing returns to Step S7103.

In a case where all the read-out data is stored in the band, the processing ends.

FIG. 72 is a flowchart illustrating an example of processing of selecting a band at the storing destination by the determination on whether there is a possibility that the data is moved at the time of expansion of the shingled magnetic recording device.

In Step S7201, the request execution unit 13 determines a possibility that the data is moved at the time of next expansion of the shingled magnetic recording device based on the data hash value.

In a case where there is no possibility of moving, the processing ends.

In a case where there is a possibility of moving, the request execution unit 13 selects a band in Step S7202 in which the expansion/moving is set in the data characteristic of the data band table 23 as the storing destination of the data.

FIG. 73 is a diagram illustrating an example of a state where the bands at the storing destination of the data are divided according to the possibility of moving at the time of expanding the shingled magnetic recording device.

Data stored in a shingled magnetic recording device is the one of which the data hash value is 10001 to 20000. In the shingled magnetic recording device, while the data of the hash value 10001 to 15000 is not moved even when the shingled magnetic recording device is expanded, the data of the hash value 15001 to 20000 is moved. Therefore, the request execution unit 13 determines whether the data hash value is 15001 to 20000, and selects a band according to the determination result.

Therefore, when the shingled magnetic recording device is expanded, the data having the data hash value of 15001 to 20000 is moved to the expanded shingled magnetic recording device, and the moved data is deleted from the original shingled magnetic recording device, a number of collected void bands can be generated. The storing to these void bands can be rewritten as it is, and thus it is possible to prevent that the writing time is expanded.

FIG. 74 is a flowchart illustrating an example of processing of the expansion management unit 10. The expansion management unit 10 changes the data hash value range table 21 at the stage when the expansion processing receives the completion notification from the controller 6-1 of the issue origin of the expansion request.

In Step S7401, the expansion management unit 10 receives the expansion request from the controller 6-1.

In Step S7402, the expansion management unit 10 determines a recording device ID of the expanded shingled magnetic recording device.

In Step S7403, the expansion management unit 10 determines a range of the divided data hash values.

In Step S7404, the expansion management unit 10 notifies the recording device ID of the expanded shingled magnetic recording device and the range of the data hash values of the moving with respect to the controller 6-1 which issues the expansion request, and waits for a notification of the moving completion.

In Step S7405, the expansion management unit 10 changes the data hash value range table 21.

In Step S7406, the expansion management unit 10 notifies the change of the data hash value range table 21 to the other coordinator.

Figures 75, 76:
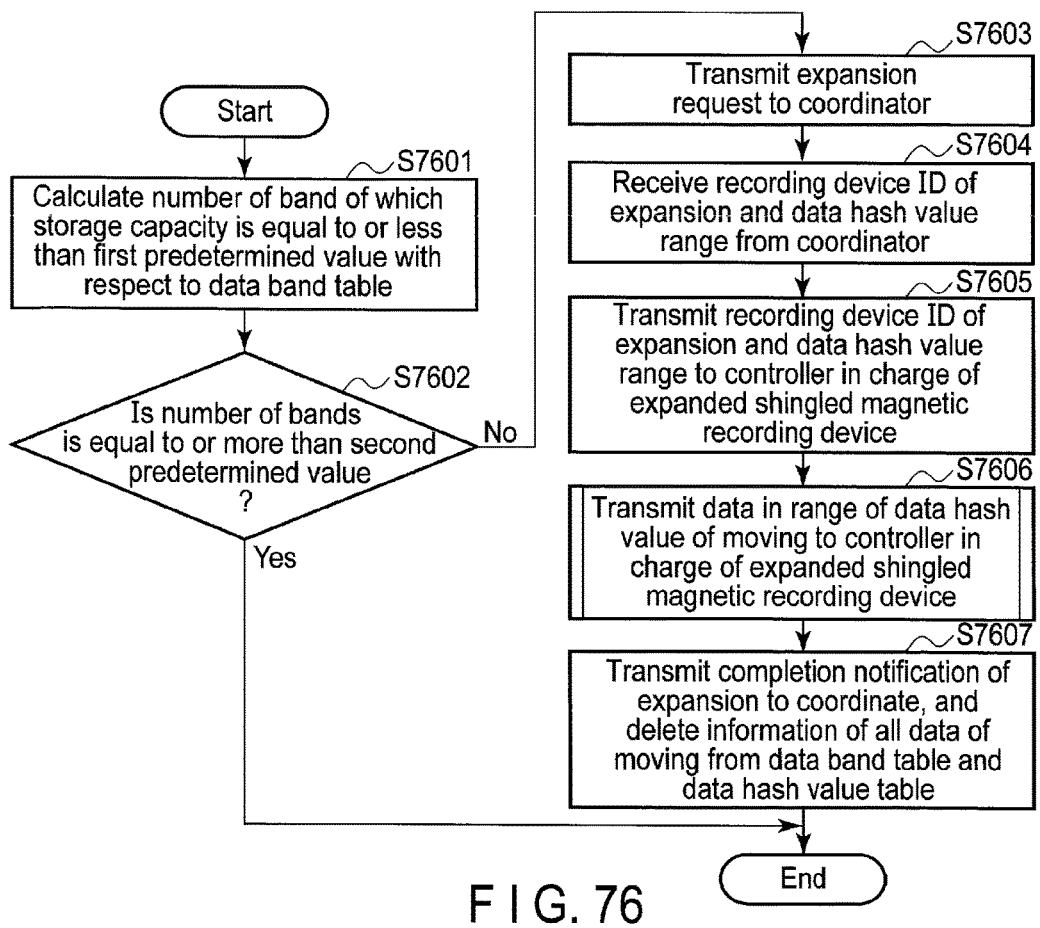
FIG. 75 is a data structural diagram illustrating an example of a data hash value range table after expansion.
FIG. 76 is a flowchart illustrating an example of processing of an expansion processing unit.

FIG. 75 is a data structural diagram illustrating an example of the data hash value range table 21 after the expansion.

The data hash value range of 10001 to 20000 before the expansion is divided into the data hash value range of 10001 to 15000 and the data hash value range of 15001 to 20000 by the expansion. The expanded shingled magnetic recording devices 8-1-9, 8-2-9, and 8-3-9 are assigned to the data hash value range of 15001 to 20000. More specifically, the data hash value range of 10001 to 20000 has been taken charge by the shingled magnetic recording devices 8-4-1, 8-5-1, and 8-6-1 before the expansion. When the shingled magnetic recording devices 8-1-9, 8-2-9, and 8-3-9 is expanded, the data hash value range of 10001 to 15000 is taken charge by the shingled magnetic recording devices 8-4-1, 8-5-1, and 8-6-1, and the data hash value range of 15001 to 20000 is taken charge by the shingled magnetic recording devices 8-1-9, 8-2-9, and 8-3-9. The data hash value range table 21 after the expansion is notified to all the coordinators. Therefore, the coordinators 2-1 and 2-2 are enabled to access the expanded shingled magnetic recording devices 8-1-9, 8-2-9, and 8-3-9.

FIG. 76 is a flowchart illustrating an example of processing of the expansion processing unit 14.

In Step S7601, the expansion processing unit 14 calculates the number of bands in which the storage capacity is equal to or less than the first predetermined value with respect to the data band table 23.

In Step S7602, the expansion processing unit 14 determines whether the calculated number of bands is equal to or more than the second predetermined value.

In a case where the number of bands is equal to or more than the second predetermined value, the processing ends.

In a case where the number of bands is less than the second predetermined value, the expansion processing unit 14 transmits the expansion request of the shingled magnetic recording device to the coordinator 2-1 in Step S7603.

In Step S7604, the expansion processing unit 14 receives the recording device ID of the expanded shingled magnetic recording device and the data hash value range of the moving from the coordinator 2-1.

In Step S7605, the expansion processing unit 14 transmits the recording device ID of the expanded shingled magnetic recording device and the data hash value range of the moving to the controller in charge of the expanded shingled magnetic recording device.

In Step S7606, the expansion processing unit 14 transmits the data in the data hash value range of the moving to the controller in charge of the expanded shingled magnetic recording device.

In Step S7607, the expansion processing unit 14 transmits the completion notification of the expansion to the coordinator 2-1, and deletes the information of all the moved data from the data band table 23 and the data hash value table 25. Then, the processing ends.

FIG. 77 is a flowchart illustrating an example of the processing of transmitting the data in the data hash value range of the moving to the controller in charge of the expanded shingled magnetic recording device (Step S7606 of FIG. 76).

In Step S7701, the expansion processing unit 14 sequentially reads out the data ID and the fragment position of the data hash value table 25.

In Step S7702, the expansion processing unit 14 determines whether the data hash value of the data fragment indicated by the read-out data ID and the read-out fragment position is in the data hash value range of the moving.

In a case where the data hash value is not in the data hash value range of the moving, the processing proceeds to Step S7705.

In a case where the data hash value is in the data hash value range of the moving, the expansion processing unit 14 reads out the data fragment at the address corresponding to the data ID and the fragment position in the hash value table 24 from the band in Step S7703.

In Step S7704, the expansion processing unit 14 transmits the read-out data fragment, the data ID and the fragment position of the hash value table 24, the update history, and the effective period to the controller in charge of the expanded shingled magnetic recording device.

In Step S7705, the expansion processing unit 14 determines whether all the data IDs and the fragment positions of the hash value table 24 are processed.

In a case where all the data IDs and the fragment positions of the hash value table 24 are not processed, the processing returns to Step S7701.

In a case where all the data IDs and the fragment positions of the hash value table 24 are processed, the expansion processing unit 14 transmits the end notification to the controller in charge of the expanded shingled magnetic recording device, and the processing ends.

FIG. 78 is a flowchart illustrating an example of processing of the controller in charge of the expanded shingled magnetic recording device.

In Step S7801, the expansion processing unit 14 receives the recording device ID of the expanded shingled magnetic recording device and the data hash value range of the moving from the controller of the issue origin of the expansion request.

In Step S7802, the expansion processing unit 14 initializes the data band table 23, the hash value table 24, and the data hash value table 25 based on the data hash value range of the moving.

In Step S7803, the expansion processing unit 14 receives the data fragment, the data ID and the fragment position, the update history, and the effective period from the controller of the issue origin of the expansion request.

In Step S7804, the expansion processing unit 14 considers the data fragment received from the controller of the issue origin of the expansion request as newly stored data, and performs POST or PUT.

In Step S7805, the expansion processing unit 14 determines whether the end notification is received from the controller of the issue origin of the expansion request.

In a case where the end notification is not received, the processing returns to Step S7803.

In a case where the end notification is received, the processing ends.

In this embodiment described above, the data is prevented from being redundantly stored, so that the capacity efficiency of the storage system 1 can be improved. The processing in a case where the shingled magnetic recording device is expanded can be efficiently performed, and the writing time can be suppressed.

Various types of components described in the respective embodiments may be appropriately combined, or may be divided. For example, the management unit 108 and the reclassification setting unit 112 may be combined. The execution unit 107, the period elimination unit 109, the expansion storage unit 110, and the expansion elimination unit 111 may be combined. A function of selecting a band among the reclassification unit 113 may be realized by the selection unit 106, and a function of storing the data may be realized by the execution unit 107. The band management information 114 and the data management information 115 may be combined.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage device comprising:
a shingled magnetic recording device that performs writing in unit of a band including tracks being adjacent to and partially overlapping with each other;
a management unit that manages management information mutually associating band identification information of the band, characteristic information indicating a possibility that user data stored in the band is not referred to, and data identification information of the user data in a case where the user data is stored in the band;
a selection unit that selects the band of the shingled magnetic recording device storing the user data based on the user data and the characteristic information in a case where the shingled magnetic recording device is requested to store the user data; and
an execution unit that stores the user data to the selected band.

2. The storage device according to claim 1,
wherein the selection unit selects the band in a case where an effective period of the user data is shorter than a data effective period indicating the characteristic information,
the storage device further comprising:
a delete unit that deletes the user data in a case where the effective period of the user data stored in the band elapses.

3. The storage device according to claim 2,
wherein the selection unit selects the band with respect to new user data in a case where the data effective period elapses, and
wherein the execution unit stores the new user data to the selected band.

4. The storage device according to claim 1,
wherein the characteristic information indicates moving in a case where an expansion shingled magnetic recording device is provided,
the storage device, further comprising:
an expansion storage unit that reads out the user data stored in the band from the shingled magnetic recording device based on the characteristic information in a case where the expansion shingled magnetic recording device is provided, and stores the user data in the expansion shingled magnetic recording device; and
an expansion elimination unit that deletes the user data from the band after the user data is read out by the expansion storage unit.

5. The storage device according to claim 4,
wherein the management unit manages expansion management information corresponding to the expansion shingled magnetic recording device in a case where the expansion shingled magnetic recording device is provided,
wherein the selection unit selects a band of the expansion shingled magnetic recording device that stores the user data based on the user data and the expansion management information in a case where the expansion shingled magnetic recording device is provided, and
wherein the expansion storage unit stores the user data in the selected band of the expansion shingled magnetic recording device.

6. The storage device according to claim 1,
wherein the management information includes an update history indicating whether the user data is updated or not,
wherein the characteristic information indicates that a condition of allowing storing to the band is updated, and
wherein the selection unit selects the band based on the update history and the characteristic information in a case where the user data is updated.

7. The storage device according to claim 1,
wherein the characteristic information indicates that a condition of allowing storing to the band is equal to or less than a predetermined data size, and
wherein the selection unit selects the band based on a size of the user data and the characteristic information in a case where the size of the user data is equal to or less than the predetermined data size.

8. The storage device according to claim 1,
wherein the characteristic information indicates any one of moving at a time of next expansion, moving at a time after next expansion, a reclassification, and other information,
the storage device, further comprising:
an expansion storage unit that reads out the user data from the band of the shingled magnetic recording device based on the management information and stores the user data to an expansion shingled magnetic recording device in a case where the expansion shingled magnetic recording device is provided and the characteristic information indicates the moving at the time of next expansion;
an expansion elimination unit that deletes the user data from the band after the user data is read out by the expansion storage unit;
a reclassification setting unit that initializes the characteristic information in a case where the characteristic information indicates the moving at the time of next expansion, sets the characteristic information to the moving at the time of next expansion in a case where the characteristic information indicates the moving at the time after next expansion, and sets the characteristic information to the reclassification in a case where the characteristic information indicates the other information, after the user data is read out by the expansion storage unit; and
a reclassification unit that reads out the user data stored in the band corresponding to the reclassification in a case where the characteristic information indicates the reclassification, selects a band to newly store the user data based on the user data and the management information, and stores the user data in the selected band.

9. The storage device according to claim 1, further comprising:
a division unit that divides the user data into a plurality of data fragments and redundant information in a case where the user data is stored;
a recovery unit that recovers the plurality of data fragments based on the redundant information in a case where the plurality of data fragments are read out and an error occurs in any one of the plurality of data fragments; and
a combining unit that combines the plurality of data fragments received from the recovery unit,
wherein the data identification information of the management information is data fragment identification information, and
wherein the characteristic information indicates a possibility that the data fragment stored in the band is not referred to.

10. The storage device according to claim 1, further comprising:
a division unit that divides the user data into a plurality of data fragments in a case where the user data is stored; and
a combining unit that combines the plurality of data fragments in a case where the plurality of data fragments are read out of the shingled magnetic recording device,
wherein the data identification information of the management information is data fragment identification information,
wherein the management information associates a value calculated based on the data fragment with the band identification information,
wherein the characteristic information indicates a possibility that the data fragment stored in the band is not referred to, and
wherein the selection unit selects the band to store the data fragment based on the management information.

11. A computer-readable nonvolatile storage medium storing a control program of a storage device, wherein the control program, when executed by a computer, causes the computer to serve as:
a management unit that manages management information for managing a shingled magnetic recording device that performs writing in unit of a band including tracks, the tracks being adjacent to and partially overlapping with each other, wherein the management information mutually associates band identification information of the band, characteristic information indicating a possibility that user data stored in the band is referred to, and data identification information of the user data in a case where the user data is stored in the band;
a selection unit that selects the band of the shingled magnetic recording device storing the user data based on the user data and the characteristic information in a case where the shingled magnetic recording device is requested to store the user data; and
an execution unit that stores the user data to the selected band.

12. A control method of a storage device, comprising:
managing management information for managing a shingled magnetic recording device that performs writing in unit of a band including tracks being adjacent to and partially overlapping with each other, wherein the management information mutually associates band identification information of the band, characteristic information indicating a possibility that user data stored in the band is referred to, and data identification information of the user data in a case where the user data is stored in the band;

selecting the band of the shingled magnetic recording device storing the user data based on the user data and the characteristic information in a case where the shingled magnetic recording device is requested to store the user data; and storing the user data to the selected band.

* * * * *